(12) United States Patent
Ogata et al.

(10) Patent No.: US 7,056,453 B2
(45) Date of Patent: Jun. 6, 2006

(54) THERMISTOR DEVICE, THERMISTOR DEVICE MANUFACTURING METHOD AND TEMPERATURE SENSOR

(75) Inventors: Itsuhei Ogata, Nishio (JP); Masanori Yamada, Nishio (JP); Eturo Yasuda, Nishio (JP); Kaoru Kuzuoka, Toyota (JP)

(73) Assignees: Denso Corporation, Aichi-Pref. (JP); Nippon Soken, Inc., Aichi (JP)

( * ) Notice: Subject to any disclaimer, the term of this patent is extended or adjusted under 35 U.S.C. 154(b) by 920 days.

(21) Appl. No.: 09/931,908

(22) Filed: Aug. 20, 2001

(65) Prior Publication Data

US 2003/0205698 A1 Nov. 6, 2003

Related U.S. Application Data

(62) Division of application No. 09/257,057, filed on Feb. 25, 1999, now Pat. No. 6,306,315.

(30) Foreign Application Priority Data

| Feb. 27, 1998 | (JP) | ............................................. | 10-47837 |
| Feb. 27, 1998 | (JP) | ............................................. | 10-47838 |
| Apr. 24, 1998 | (JP) | ........................................ | 10-115421 |
| Jan. 14, 1999 | (JP) | ............................................. | 11-8143 |

(51) Int. Cl.
 *H01B 1/08* (2006.01)

(52) U.S. Cl. ................................ 252/518.1; 252/521.1; 252/521.2; 252/519.51; 252/520.5; 338/22 R; 338/22 SD; 501/127

(58) Field of Classification Search .............. 252/518.1, 252/521.1, 521.2, 519.51, 520.5; 338/22 R, 338/22 SD; 501/127
See application file for complete search history.

(56) References Cited

U.S. PATENT DOCUMENTS 3,373,120 A  3/1968 Nitta et al.

(Continued)

FOREIGN PATENT DOCUMENTS

EP    0 623 569 A1    11/1994

(Continued)

OTHER PUBLICATIONS

Periodic Table f the Elements, no date.

*Primary Examiner*—Mark Kopec
(74) *Attorney, Agent, or Firm*—Nixon & Vanderhye PC

(57) ABSTRACT

The thermistor portion of a thermistor device consists of a mixed sintered body of $aY(Cr_{0.5}Mn_{0.5})O_3 \cdot bAl_2O_3$ made of the perovskite-type compound $Y(Cr_{0.5}Mn_{0.5})O_3$ and $Al_2O_3$, or a mixed sintered body of $aY(Cr_{0.5}Mn_{0.5})O_3 \cdot b(Al_2O_3 + Y_2O_3)$ made of $Y(Cr_{0.5}Mn_{0.5})O_3$, $Al_2O_3$ and $Y_2O_3$. The mole fractions a and b have the relationships $0.05 \leq a < 1.0$, $0 < b \leq 0.95$ and $a+b=1$. This is required to obtain a thermistor device that has stable characteristics and exhibits a small change in its resistance value, even in a heat history from room temperature to 1000° C. or the like, and also has a resistance value of 50Ω to 100 kΩ in the temperature range from room temperature to 1000° C.

The precursor compounds triethoxy yttrium, diethoxy manganese and tris (2,4-pentadiono) chromium are mixed in a mixed solvent of ethanol and isopropyl alcohol, and refluxing is performed to obtain a composite metal alkoxide solution. Then the metal salt precipitating agent of deionized water is added, the mixture is stirred and mixed and refluxing is performed to obtain a gelatinous precipitate of metallic salts containing Y, Mn and Cr. This precipitate is separated by filtration, dried and calcined to obtain powdered raw material with a composition of $38Y(Cr_{0.5}Mn_{0.5})O_3 \cdot 62Y_2O_3$, the same as that of a thermistor device. Thereafter, this powdered raw material is molded and sintered to obtain the thermistor device as a sintered body. Thereby, the dispersion of the resistance value of the thermistor can be reduced.

An anti-reducing coating made of an anti-reducing material such as $Y_2O_3$, $Al_2O_3$, $Y_3Al_5O_{12}$, $3Al_2O_3 \cdot SiO_3$, $Y_2SiO_5$ or the like is formed on the surface of a thermistor portion consisting of a mixed sintered body of $Y(CrMn)O_3 \cdot Y_2O_3$ (or $Y(CrMn)O_3 \cdot Al_2O_3$) or the like to form a thermistor device with a pair of lead wires attached. Thereby, the thermistor device exhibits resistance value stability even when subjected to a reducing atmosphere.

13 Claims, 28 Drawing Sheets

U.S. PATENT DOCUMENTS

| | | | |
|---|---|---|---|
| 3,958,209 A * | 5/1976 | Soda et al. ............... 338/22 R | |
| 4,076,894 A | 2/1978 | Langley et al. | |
| 4,952,902 A | 8/1990 | Kawaguchi et al. | |
| 5,476,822 A | 12/1995 | Iwaya et al. | |
| 5,534,194 A | 7/1996 | Borland et al. | |
| 5,610,111 A | 3/1997 | Iwaya et al. | |
| 5,637,543 A | 6/1997 | Iwaya et al. | |
| 6,184,770 B1 * | 2/2001 | Nakamura et al. ............ 338/21 | |
| 6,663,794 B1 * | 12/2003 | Ogata et al. ............. 252/518.1 | |

FOREIGN PATENT DOCUMENTS

| EP | 0 626 356 A1 | 11/1994 |
|---|---|---|
| EP | 0 795 879 A1 | 9/1997 |
| EP | 0 866 472 A2 | 9/1998 |
| JP | 49-46015 | 5/1974 |
| JP | 52-29784 | 3/1977 |
| JP | 54104599 | 8/1979 |
| JP | 5-264368 | 12/1993 |
| JP | 6-325907 | 11/1994 |
| JP | 07099102 A | 4/1995 |
| JP | 7-201528 | 8/1995 |
| JP | 9-69417 | 3/1997 |

* cited by examiner

Fig.15

```
FORMULATION 1  Y₂O₃, Cr₂O₃, Mn₂O₃, CaCO₃
             │
    MIXING (BALL MILL)
             │
        CALCINING
             │
   Y(Cr₀.₅Mn₀.₅)O₃·Y₂O₃
             │
       FORMULATION 2
             │
  MIXING AND GRINDING (BALL MILL)
             │
    GRANULATION AND DRYING
             │
         MOLDING
             │
        SINTERING
             │
     THERMISTOR DEVICE
```

THERMISTOR DEVICE, THERMISTOR DEVICE MANUFACTURING METHOD AND TEMPERATURE SENSOR

This is a Divisional of National application Ser. No. 09/257,057, filed Feb. 25, 1999 now U.S. Pat. No. 6,306,315.

BACKGROUND OF THE INVENTION

1. Field of the Invention

The present invention relates to a thermistor device that can detect temperatures in the range from room temperature to a high temperature of approximately 1000° C., namely a wide-range thermistor device, along with a method of manufacturing such a thermistor device, and is particularly suited to a temperature sensor for automobile exhaust gases.

2. Description of the Related Art

Thermistor devices for temperature sensors are used in the measurement of temperatures in the range 400–1300° C., namely from the middle to high temperature range, in the measurement of automotive exhaust gas temperatures, gas flame temperatures in gas water heaters and the like, and the temperatures of heating ovens.

The resistance value and the resistance-temperature coefficient (temperature dependence of the resistance value) indicate the characteristics of this type of thermistor device. Here, in order for the temperature detection circuits that make up a temperature sensor to correspond to a practical resistance value range, the resistance value of the thermistor device is preferably within a stipulated range. For this reason, perovskite-type materials and the like are mainly used as the materials that have the resistance value characteristics suited to a wide-range thermistor device.

Examples of proposed thermistor devices that use perovskite-type materials include those disclosed in the unexamined published Japanese patent applications JP-A-6-325907 and JP-A-7-201528. In order to achieve a thermistor device that is usable in a wide temperature range, oxides of Y, Sr, Cr, Fe, Ti and other elements are mixed in a stipulated composition ratio, ground, granulated and fired to obtain a thermistor device that is a perfect solid solution by means of the solid-phase method.

The resistance value and the resistance-temperature coefficient represent the resistance-value characteristics of a thermistor device. In consideration of the resistance-value range of the temperature detection circuit in a normal temperature sensor, the resistance value of the thermistor device must be 50Ω to 100 kΩ in the service temperature range. In addition, if a thermistor device is subjected to a heat history of room temperature to 1000° C. or the like, it is preferable that the change from the initial resistance value to the resistance value after the heat history be as small as possible.

Each of the aforementioned unexamined Japanese patent publications (Kokai) proposes thermistor devices consisting of various perfect solid solutions, but only the data on the thermistor resistance values at 300° C. or higher is disclosed. For this reason, the present inventors investigated the resistance value characteristics of the various thermistor devices in the various unexamined Japanese patent publications (Kokai) at temperatures near room temperature.

As a result, those thermistor devices that exhibited stable resistance value characteristics in a heat history from room temperature to 1000° C. or the like showed an elevated resistance value in the region from room temperature to 300° C., being undistinguishable from a resistor so the temperature could not be detected. On the other hand, those thermistor devices that satisfied the low resistance value requirement of 50Ω to 100 kΩ exhibited a change in the resistance value in the heat history that varied by 10% or more with respect to the initial resistance value so they lacked stability.

In any case, there was no thermistor device (a so-called wide-range thermistor device) that satisfied both of the two conflicting resistance characteristics of a low resistance value characteristics in the range from room temperature to 1000° C. and low resistance value stability in a heat history.

In light of the aforementioned problems, the first object of the present invention is to provide a thermistor device that has stable characteristics and exhibits a small change in its resistance value even in a heat history from room temperature to 1000° C. or the like, and also has a resistance value of 50Ω to 100 kΩ in the temperature range from room temperature to 1000° C.

On the other hand, in recent temperature sensors for automobile exhaust gas (exhaust temperature sensors), the demand for incorporating these exhaust temperature sensors into systems for detecting the exhaust gas temperature before and after the catalyst in order to detect deterioration of the catalyst used for change the exhaust gases from gasoline-powered vehicles non-toxic, and into systems for detecting the exhaust temperature before and after the catalyst in order to control the catalyst temperature for cleaning up the exhaust gases, particularly NOx, from diesel-powered vehicles, is great.

However, temperature sensors that use conventional thermistor devices have a large amount of dispersion in their resistance-temperature characteristic (R-T characteristic), for example, their temperature accuracy is ±20–30° C. (room temperature to 600° C.), which is not sufficient for high-precision system control. Thus, in order for them to be incorporated into such systems, the development of thermistor devices that can achieve higher temperature accuracy is desirable. To this end, the present inventors have performed diligent studies of the structure, manufacturing methods and other aspects of conventional thermistor devices, and as a result found the following problems with increasing the temperature accuracy.

To wit, in the aforementioned solid-phase method, the mixing and grinding of a plurality of oxide materials is performed by means of a ball mill or the like, but because of inadequate grinding capacity, the average grain size of the thermistor materials after grinding has a limit of 1–2 μm, so uniform mixing is not achieved. In addition, because of this difference in the average grain size of the oxide materials, the reactions do not proceed uniformly in the calcining, sintering and other heat treatments, so the thermistor raw material composition produced by the thermal reactions becomes non-uniform.

Moreover, in the aforementioned mixing and grinding operations performed by ball mill or the like, the constituent elements of the alumina balls or the like in the grinding media become mixed into the thermistor materials as impurities, thus causing resistance dispersion or divergence from the desired composition of the thermistor device. Therefore, the resistance-value dispersion of the thermistor device obtained becomes large and a temperature sensor that uses this thermistor device will have dispersion in its R-T characteristic, leading to degraded temperature accuracy.

In passing, in the current state, the aforementioned systems cannot be built with the temperature accuracy of temperature sensors that use conventional thermistor devices, so high-accuracy but high-cost thermocouples or platinum resistors or the like are used as the temperature sensors instead. However, in either case, as of now there are no temperature sensors that use thermistor devices that have a temperature accuracy (e.g., ±5° C. over room temperature to 600° C.) of a level that can be applied to the aforementioned systems and the like.

To this end, in light of the aforementioned problems, the second object of the present invention is to provide a method of manufacturing a thermistor device from a sintered body such that the dispersion of the resistance value of the thermistor device is reduced.

On the other hand, when the aforementioned thermistor device is used in a temperature sensor that detects the temperature of automobile exhaust gas, the thermistor device located at the detector tip of the temperature sensor is typically covered with a metallic cap for the purpose of preventing the accumulation of debris, soot or the like from the gas being monitored. Here, since the metallic cap is subjected to thermal oxidation due to the heat of the hot exhaust gas at roughly 900° C., the interior of the metallic cap is a reducing environment, and thus the thermistor device inside is subjected to a reducing action and its resistance value may change, causing problems.

For this reason, temperature sensors are typically placed in electric furnaces and subjected to thermal aging treatment at 900–1000° C. for 100 hours. However, while the temperature sensor is in service, in the event that air should enter the interior of the cap due to a hole in the cap or the cap becoming loose, there is a risk that the thermistor device itself will again be subjected to a reducing environment and the aforementioned change in the resistance will occur.

In JP-A-9-69417, even though special metallic materials, e.g. Inconel 600™ or other materials, are selected for the metallic cap and machining is performed, the problem of the change in resistance value is still not solved in the case in which the thermistor device itself is subjected to a reducing environment.

In either case, there has not been provided a thermistor device that exhibits resistance-value stability when the thermistor device itself, in a temperature sensor or the like is subjected to a reducing environment.

In light of the aforementioned problems, the third object of the present invention is to provide a device structure that has resistance-value stability even in the case when the thermistor device is subjected to a reducing environment.

SUMMARY OF THE INVENTION

Conventional thermistor devices are perfect solid solutions having a perovskite-type structure, but the present inventors considered that satisfying the resistance characteristics that tend to conflict as described above would be difficult with a perfect solution of a single compound.

To this end, the inventors attempted to achieve the aforementioned first object by using a novel thermistor material consisting of a mixed sintered body formed by mixing two types of compounds: a perovskite-type material (oxide) that has a relatively low resistance value and a material that has a relatively high resistance value.

As a result of studies into various perovskite-type materials, the inventors experimentally discovered that the materials that have the appropriate resistance characteristics to achieve the aforementioned object preferably should have the composition (M1M2)$O_3$ (where M1 is at least one or more elements selected from the elements of Group 2A or Group 3A of the periodic table excluding La, and M2 is at least one or more elements selected from the elements of Group 2B, Group 3B, Group 4A, Group 5A, Group 6A, Group 7A or Group 8 of the periodic table).

Here, La is highly hygroscopic and reacts with the moisture in the atmosphere to produce unstable hydroxides that could damage the thermistor device, so it is not used as M1.

On the other hand, as a result of study, $Al_2O_3$ (aluminum oxide), which has a relatively high resistance value and stabilizes the resistance value of the thermistor, was experimentally found to be the most preferable complementary material in the mixture.

Therefore, the first aspect of the present invention is a thermistor device made of a mixed sintered body of (M1M2)$O_3$.$Al_2O_3$ obtained by sintering a mixture of the aforementioned (M1M2)$O_3$ and $Al_2O_3$.

When this thermistor device was incorporated into a temperature sensor and the resistance-value characteristics of the device were investigated, the change in the resistance value even over a thermal history of room temperature to 1000° C. was small at several % and stable, and the resistance value was confirmed to be 50Ω to 100 kΩ in the temperature range from room temperature to 1000° C.

Therefore, with this thermistor device, it is possible to provide a so-called wide-range thermistor device that is able to detect temperatures over the wide temperature range of from room temperature to 1000° C. and that has stable characteristics in that its change in the resistance value is small over the heat history of room temperature to 1000° C. or the like.

In addition, from the studies performed by the present inventors, as the various elements in the aforementioned perovskite-type compound (M1M2)$O_3$, M1 should preferably be one or more elements selected from the group Y, Ce, Pr, Nd, Sm, Eu, Gd, Dy, Ho, Er, Yb, Mg, Ca, Sr, Ba and Sc, while M2 should preferably be one or more elements selected from the group Ti, V, Cr, Mn, Fe, Co, Ni, Zn, Al, Ga, Zr, Nb, Mo, Hf, Ta and W.

Moreover, as a result of studies on the mixing ratio of (M1M2)$O_3$ and $Al_2O_3$, it was found that as long as the mixing ratio is within a stipulated range, namely, when taking the mole fraction of the aforementioned (M1M2)$O_3$ to be a and the mole fraction of the aforementioned $Al_2O_3$ to be b, as long as the relationships among these mole fractions a and b are $0.05 \leq a < 1.0$, $0 < b \leq 0.95$ and $a+b=1$, then the aforementioned effects of the thermistor device can be achieved more reliably.

In this manner, these mole fractions a and b can be varied over a wide range, so the resistance value and resistance-temperature coefficient can be controlled over a wide range by appropriately mixing and calcining both (M1M2)$O_3$ and $Al_2O_3$.

In addition, it was experimentally determined that in the aforementioned mixed sintered body of (M1M2)$O_3$.$Al_2O_3$, $Y_2O_3$ (yttrium oxide) can be included together with $Al_2O_3$ instead of $Al_2O_3$ alone as the complement to (M1M2)$O_3$.

Based on this knowledge, a thermistor device made of a mixed sintered body of (M1M2)$O_3$.$Y_2O_3$.$Al_2O_3$ is provided. This thermistor device can achieve the same effects as the aforementioned thermistor device made of (M1M2)$O_3$.$Al_2O_3$. Moreover, it was found that as long as the mole fraction a of (M1M2)$O_3$ and the total mole fraction b of $Y_2O_3$ and $Al_2O_3$ satisfy the relationships $0.05 \leq a < 1.0$, $0 < b \leq 0.95$ and $a+b=1$, then the aforementioned effects of the thermistor device can be achieved more reliably.

In a sintered body, a sintering aid is added in order to improve the sintering characteristics of the granules, and as a result of experimental studies on various sintering aids, it was found that using a sintering aid consisting of $SiO_2$ and at least one of $CaO$, $CaCO_3$ or $CaSiO_3$ is preferable for all of the aforementioned mixed sintered bodies. By this means, a wide-range thermistor device with superior sintered density and other characteristics is obtained.

As the experimentation proceeded, it was found that temperature sensors that used thermistor devices made of the aforementioned mixed sintered body of $(M1M2)O_3 \cdot Al_2O_3$ or the aforementioned mixed sintered body of $(M1M2)O_3 \cdot Y_2O_3 \cdot Al_2O_3$ (hereinafter, both of these mixed sintered bodies taken together are called "mixed sintered bodies A") exhibited dispersion in the detected temperature accuracy among the fabricated sensors on the level of ±20–30° C. over the temperature range from room temperature to 1000° C.

Here, this mixed sintered body A is normally obtained by calcining the oxides of M1 and M2 to obtain $(M1M2)O_3$ (the first preparation step), which is then mixed with $Al_2O_3$ or $Y_2O_3$ and $Al_2O_3$ (hereinafter abbreviated as "$Al_2O_3$, etc.") and then molded and sintered (the second preparation step).

Note that in the case that Y is included in M1 in the mixed sintered body A of $(M1M2)O_3 \cdot Y_2O_3 \cdot Al_2O_3$, an excess of $Y_2O_3$ may be added in advance as the ingredient of M1 in the first preparation step to obtain $(M1M2)O_3 \cdot Y_2O_3$ instead of $(M1M2)O_3$. In this case, an appropriate amount of $Al_2O_3$ is mixed with the $(M1M2)O_3 \cdot Y_2O_3$ obtained in the calcining in order to achieve a mixed sintered body A that ultimately has the desired composition ratio.

Here, from the standpoint of further increasing the temperature accuracy (reducing the dispersion in detected temperature accuracy among sensors), investigations were performed on various conditions in the thermistor device manufacturing steps, such as the formulation, molding, firing and other conditions.

As a result, it was found that the aforementioned dispersion in temperature accuracy arises when the average grain size of the $(M1M2)O_3$ or $(M1M2)O_3 \cdot Y_2O_3$ obtained by calcining (hereinafter called "calcine A" when taken together) is larger than the average grain size of the $Al_2O_3$, etc., so the two do not mix uniformly so there is dispersion in the composition of mixed sintered body A, ultimately giving rise to dispersion in the resistance of the thermistor device. Therefore, studies were performed from the point of view that if the average grain size of calcine A can be made to be the same as the average grain size of the $Al_2O_3$, etc. in the mixed state prior to sintering, then uniform mixing of the composition can be achieved.

As a result, it was experimentally determined that when calcine A is mixed with $Al_2O_3$, etc. and ground, and the average grain size of this mixture is brought to less than the average grain size of the $Al_2O_3$, etc. prior to mixing, this is sufficient. To wit, by using a manufacturing method that includes this type of grinding (the first manufacturing method), uniform mixing of calcine A with $Al_2O_3$, etc. is achieved by grinding to fine grains, and thus fluctuations in the composition of mixed sintered body A are reduced so the dispersion in the resistance value of the thermistor device can be reduced. Therefore, a wide-range thermistor device with better temperature accuracy (lesser dispersion in the temperature accuracy between sensors) can be provided.

Moreover, from the standpoint of increasing the detected temperature accuracy of a temperature sensor that uses a thermistor device made from mixed sintered body A, investigations were performed on the thermistor device manufacturing methods. As a result, it was found that dispersion in the composition of calcine A ultimately affected the dispersion in the composition of mixed sintered body A (to wit, the dispersion in the resistance value of the thermistor devices).

Here we present one example of a study of the cause of dispersion in the composition of calcine A itself, in the case in which a calcine A of $Y(Cr_{0.5}Mn_{0.5})O_3$ is used, namely the case in which M1=Y and M2=Cr and Mn in $(M1M2)O_3$.

The preparation of $Y(Cr_{0.5}Mn_{0.5})O_3$ may be performed as follows, for example (see FIG. 4). The M1 material $Y_2O_3$ (average grain size 1 μm) and the M2 materials $Cr_2O_3$ (average grain size 4 μm) and $Mn_2O_3$ (average grain size 7 μm) are weighed out to give a molar ratio of Y:Cr:Mn= 1:0.5:0.5, and mixed and ground in a conventional ball mill or the like, and this mixture is subjected to calcining at 1000° C. or above to obtain $Y(Cr_{0.5}Mn_{0.5})O_3$.

Here, the lower limit of the average grain size after mixing and grinding that can be achieved with a ball mill or the like is approximately 2 μm, and the average grain size of $Cr_2O_3$ and $Mn_2O_3$ is larger than the average grain size of $Y_2O_3$.

Therefore, because of the differences in the grain sizes of the individual raw materials $Y_2O_3$, $Cr_2O_3$ and $Mn_2O_3$ the $Y(Cr_{0.5}Mn_{0.5})O_3$ obtained by the calcining reaction of the mixture of $Y_2O_3$ and $Cr_2O_3$ and $Mn_2O_3$ is a composition that diverges from the ideal Y:Cr:Mn=1:0.5:0.5, but rather it is a mixture of various compositions ranging from a composition of Y:Cr:Mn=1:0.6:0.4 to a composition of Y:Cr:Mn= 1:0.4:0.6.

Each of these compositions in the range from a composition of Y:Cr:Mn=1:0.6:0.4 to a composition of Y:Cr:Mn= 1:0.4:0.6 has a different resistance value and resistance-temperature coefficient (β value), so the resistance varies from device to device, becoming the cause of dispersion in the device resistance values. In addition, in the event that a portion of the starting materials of $Y_2O_3$, $Cr_2O_3$ and $Mn_2O_3$ (the portion diverging from the ideal composition ratio) remains as unreacted material, this will become the cause of dispersion in the device resistance values.

Here, as a result of studies of mixing and grinding conditions in the first preparation step to obtain calcine A, it was experimentally determined that by mixing and grinding the M2 materials together with the M1 materials in a media mixing mill or the like which has a grinding capacity greater than that of a ball mill, if the average grain size of the mixture of raw materials after mixing and grinding (the ground mixture) is brought to less than the average grain size of the M1 materials prior to mixing and also less than 0.5 μm, then the aforementioned difficulties can be suppressed, and a temperature accuracy better than the practical level of ±10° C. can be achieved. To wit, a manufacturing method that includes this type of grinding (the second manufacturing method) is characterized in that, in the mixing step wherein the M1 material and M2 material are mixed and ground, the M2 material is mixed and ground together with the M1 material, and this ground mixture is ground so that its average grain size is less than the average grain size of the M1 materials prior to mixing and also less than 0.5 μm, and then calcining is performed to obtain a calcine that is mixed with $Al_2O_3$, etc., molded into the prescribed shape and sintered.

Achieving a uniform grain size for the M1 and M2 materials in this manner is intended to achieve uniform mixing of the composition of the calcine to reduce dispersion in the composition of the calcine and suppress the presence of unreacted portions of the raw material. Therefore, by combining the first manufacturing method with the second manufacturing method, the meritorious effects of both manufacturing methods can be combined, and the dispersion in the resistance value of the thermistor device can be reduced to an even higher level.

As stated in the aforementioned Related Art, the present inventors have proceeded with studies of various steps in the manufacture of thermistor devices from the standpoint of improving the temperature accuracy of temperature sensors that use thermistor devices. They have discovered that uniform mixing of raw materials is not obtained in the conventional solid-phase method because of the large average grain size of the raw materials, and that non-uniformity of the composition after calcining, sintering and other heat treatments.

Moreover, as a result of further studies, in a thermistor device formed after the thermal reactions in the aforementioned heat treatments, the inventors found that the dispersion in composition of the crystal phases, that mainly dominates the resistance value in particular, ultimately affects the resistance-value dispersion of the thermistor devices. Regarding this matter, the case of manufacturing a thermistor device from a mixed sintered body (mixed calcine) of $38Y(Cr_{0.5}Mn_{0.5})O_3 \cdot 62Y_2O_3$ by means of the conventional solid-phase method will be described as an example.

In $38Y(Cr_{0.5}Mn_{0.5})O_3 \cdot 62Y_2O_3$, the $Y_2O_3$ (yttria) has characteristics near those of an insulator, so the crystal phase that mainly dominates the resistance value (the resistance value dominating phase) is the $Y(Cr_{0.5}Mn_{0.5})O_3$ which has a perovskite structure. Thus, the dispersion in the composition of $Y(Cr_{0.5}Mn_{0.5})O_3$ is the problem. This $38Y(Cr_{0.5}Mn_{0.5})O_3 \cdot 62Y_2O_3$ may be prepared in the following manner, for example (see FIG. 8).

First, in the aforementioned solid-phase method, the oxide raw material $Y_2O_3$ (average grain size of approximately 1 μm (micrometer)) and the other raw materials $Cr_2O_3$ (average grain size of approximately 4 μm) and $Mn_2O_3$ (average grain size of approximately 7 μm) are used as the starting materials. Next, in the formulation step, the starting materials of $Y_2O_3$, $Cr_2O_3$ and $Mn_2O_3$ are weighed out so that the ultimate composition of the thermistor device will become $38Y(Cr_{0.5}Mn_{0.5})O_3 \cdot 62Y_2O_3$. Then, the weighed materials are mixed and ground in a ball mill or the like, and the mixture of starting materials is subjected to calcining at 1000° C. or greater to obtain a calcine of $38Y(Cr_{0.5}Mn_{0.5})O_3 \cdot 62Y_2O_3$.

Here, because of the difference in grain size among the starting materials of $Y_2O_3$, $Cr_2O_3$ and $Mn_2O_3$, limitations on the mixing and grinding capacity of the ball mill or the like, the $Y(Cr_{0.5}Mn_{0.5})$ which is the resistance value dominating phase in the aforementioned calcine is a composition that diverges from the ideal composition (Y:Cr:Mn=1:0.5:0.5) and is a composition consisting of crystal grains of various compositions ranging from a composition of Y:Cr:Mn=1:0.6:0.4 to a composition of Y:Cr:Mn=1:0.4:0.6.

Each of these compositions in the range from a composition of Y:Cr:Mn=1:0.6:0.4 to a composition of Y:Cr:Mn=1:0.4:0.6 has a different resistance value and resistance-temperature coefficient (βvalue), so the resistance varies from device to device. Moreover, in the event that a portion of the starting materials of $Y_2O_3$, $Cr_2O_3$ and $Mn_2O_3$ (the portion diverging from the ideal composition ratio) remains as unreacted material, this will become the cause of dispersion in the device resistance values.

In addition, the dispersion in device resistance values due to the aforementioned dispersion in composition occurs in the $Y(Cr_{0.5}Mn_{0.5})O_3$ in the calcine, so the same could be said in the case in which the composition of the thermistor device consisted of crystal grains of $Y(Cr_{0.5}Mn_{0.5})O_3$ or the like alone.

Here, the present inventors thought that in order to reduce dispersion in the composition of the calcine, the aforementioned dispersion in composition, presence of unreacted raw materials and other problems could be solved in the steps prior to calcining. Moreover, as a result of various studies, they focused on performing the mixing of multiple raw materials not in the solid-phase state of metal oxide powder, but rather in the liquid-phase state of the precursor compounds which are easily dispersed or dissolved in solvent.

Based on this thinking, as a result of multiple experiments and studies regarding the aforementioned $38Y(Cr_{0.5}Mn_{0.5})O_3 \cdot 62Y_2O_3$ and moreover thermistor devices made of various sintered bodies, they found that by using materials obtained by adjusting the composition of the precursor compounds in a liquid-phase method to fabricate a thermistor device, the composition of the crystal grains can be made uniform, the resistance-value dispersion can be reduced and the temperature accuracy of the temperature sensor can be increased.

To wit, in the second aspect of the present invention, a plurality of precursor compounds that contain metallic elements is mixed in the liquid phase to form a liquid mixture, and a metallic salt precipitating agent is added to this liquid mixture to precipitate a gelatinous precipitate containing a plurality of metallic elements. Next, by drying and heating this precipitate, the powdered raw material which is a powder composition containing a plurality of metallic elements is formed and then this powdered raw material is sintered to obtain a thermistor device as a sintered body.

Thereby, since the plurality of precursor compounds dissolve or disperse in the liquid phase, they are not affected by the average grain size as in the case of the solid-phase method, and can be mixed in the desired composition ratio in the fine-grained state on the atomic or molecular order, as the various precursor compounds can be mixed uniformly. Therefore, the composition ultimately obtained as a powder, namely the powdered raw material contains the metallic elements mixed at the desired composition ratio on the atomic or molecular order, so that the thermal reactions in subsequent heat treatment are made uniform.

Therefore, ultimately, in a thermistor device manufactured as a sintered body, the dispersion in composition of the crystal grains that make up the thermistor device can be suppressed. Moreover, temperature sensors that use thermistor devices manufactured by means of the manufacturing method according to the present invention will have a smaller dispersion in the resistance value from device to device, so the temperature accuracy can be improved from the conventional level (e.g., ±20–30° C. from room temperature to 600° C.) to a higher level (e.g., 2–5° C. from room temperature to 600° C.).

In the process of forming the aforementioned liquid mixture, a plurality of precursor compounds is mixed in a solvent phase together with a complexing compound that contains at least two carboxyl groups as coordination sites and at least one other coordination site to form a solvent mixture. In this solvent mixture, the plurality of precursor compounds is made to react with the aforementioned complexing compound to form a composite metallic complex compound with at least one coordinated metallic element.

Thus is formed a liquid mixture in which a composite metallic complex compound dissolved or dispersed therein. Thereafter, in the same manner as the aforementioned manufacturing method, a gelatinous precipitate containing the composite metallic complex compound or a polymer thereof is obtained as a metallic salt, and the raw material is obtained from this precipitate. Here, ethylenediamenetetraacetic acid (EDTA) or citric acid is used as the aforementioned complexing compound.

Based on the results of the studies of the present inventors, the aforementioned precursor compounds used may be one or more organometallic compounds selected from the group of metal alkoxides, metal acetylacetonates or metal carboxylates, or one or more inorganic metal compounds selected from the group of nitrate compounds, oxynitrate compounds, chlorides and oxychloride compounds.

In addition, it is possible to mix a plurality of metal element-containing precursor compounds in the liquid phase to form a liquid mixture, and from this liquid mixture form powdered raw material that is a powdered composition containing a plurality of metal elements, and then sinter this powdered raw material to obtain a thermistor device as a sintered body (aspect 3). Specifically, this method can be implemented by chemical liquid-phase methods as well as spray pyrolysis methods, pyrolysis methods, freeze-drying methods, solvent combustion methods or other physical liquid-phase methods, and meritorious effects similar to those of the manufacturing method according to the above aspect 2 can be obtained.

Here, upon using a transmission electron microscope (TEM) to observe the thermistor device obtained by the manufacturing method of the second or third aspect (the liquid-phase method), the primary grain sizes of the various crystal grains (e.g., the $Y(Cr_{0.5}Mn_{0.5})O_3$ and $Y_2O_3$ crystal grains in the aforementioned example of $38Y(Cr_{0.5}Mn_{0.5})O_3 \cdot 62Y_2O_3$) were found to be smaller than 1 µm, being very fine grains on the order of several nm (nanometers) to several hundred nm which were uniformly dispersed or mixed in the composition.

A temperature sensor can be obtained using such a thermistor device whose dispersion in composition is suppressed due to such fine grains.

In particular, when the salient point of preparing the composition of precursor compounds by a liquid-phase method is applied to the method of manufacturing a thermistor device consisting of a mixed sintered body of $(M1M2)O_3 \cdot Y_2O_3$ which is a mixture of the composition $(M1M2)O_3$ and $Y_2O_3$ (where M1 is at least one or more elements selected from the elements of Group 2A or Group 3A of the periodic table excluding La, and M2 is at least one or more elements selected from the elements of Group 2B, Group 3B, Group 4A, Group 5A, Group 6A, Group 7A or Group 8 of the periodic table), a method was invented whereby a plurality of precursor compounds containing the elements that are to constitute the thermistor device and a complex-forming agent are mixed in the liquid phase to form a liquid mixture, said plurality of precursor compounds and said complex-forming agent are caused to react in said liquid mixture to form a composite complex compound, and then a polymerizing agent is added to said composite complex compound to form a polymer, said polymer is dried and heated to obtain the powdered raw materials that constitute the thermistor device, and said powdered raw materials are sintered to obtain a thermistor device as a mixed sintered body of $(M1M2)O_3 \cdot Y_2O_3$.

By means of this method, the plurality of precursor compounds are dissolved or dispersed in the liquid phase so that, in a thermistor device manufactured as a mixed sintered body, the dispersion in the composition of the crystal grains that constitute the thermistor device can be suppressed. Moreover, the temperature sensors that use thermistor devices manufactured by means of this manufacturing method will have a smaller dispersion in the resistance value from device to device, so the temperature accuracy can be improved from the conventional level (e.g., ±20–30° C. from room temperature to 600° C.) to a higher level (e.g., ±1.5–5° C. from room temperature to 600° C.).

It is preferable that citric acid be used as the aforementioned complex-forming agent and ethylene glycol used as the polymerizing agent, and if e is the number of moles of citric acid and f is the total number of moles of elements that constitute the thermistor device, then it is preferable that the relationship $1 \leq e/f \leq 30$ be satisfied.

According to this manufacturing method, in the step of forming the composite complex compound, a complexing reaction occurs wherein ions of the elements that constitute the thermistor device are coordinated at the coordination sites of citric acid in the liquid phase to form the composite complex compound. Thereafter, the composite complex compound is mixed with ethylene glycol as the polymerizing agent and heated so that they react to form a polymer, and the powdered raw materials are obtained from this polymer.

In studies, the present inventors found that by increasing the concentration of the citric acid added in order to obtain the aforementioned composite complex compound, the composition can be made more uniform. To wit, by setting the citric acid concentration to the aforementioned range of $1 \leq e/f \leq 30$, thermistor devices that have good temperature accuracy can be obtained.

Note that in the case that the citric acid concentration is greater than 30 times by weight (a concentration 30 times the total number of moles of elements constituting the thermistor device), then the phenomenon of association and agglutination of citric acid molecules occurs, and the polymer obtained thereafter becomes a colloidal sol, so a portion of the constituent elements of the thermistor device will remain undissociated in the liquid phase, giving rise to additional problems such as divergence in composition. Therefore, the citric acid concentration is preferably selected in the range up to a 30 times by weight.

Taking the mole fraction of the aforementioned (M1M2)$O_3$ to be c and the mole fraction of the aforementioned $Y_2O_3$ to be d, these mole fractions c and d should preferably satisfy the relationships $0.05 \leq c < 1.0$, $0 < d \leq 0.95$ and $c+d=1$. Moreover, the aforementioned M1 should preferably be one or more elements selected from the group Y, Ce, Pr, Nd, Sm, Eu, Gd, Dy, Ho, Er, Yb, Mg, Ca, Sr, Ba and Sc, while the aforementioned M2 should preferably be one or more elements selected from the group Ti, V, Cr, Mn, Fe, Co, Ni, Zn, Al, Ga, Zr, Nd, Mo, Hf, Ta and W. In addition, the aforementioned M1 should more preferably be Y, while the aforementioned M2 should more preferably be Cr and Mn, so the aforementioned mixed sintered body should preferably be $Y(CrMn)O_3 \cdot Y_2O_3$. These ranges were found as a result of the present inventors' own original study, and permit a thermistor device able to measure a wide temperature range from room temperature to 1000° C. to be obtained.

Temperature sensors that have thermistor devices manufactured according to any of the manufacturing methods of the aforementioned second or third aspect achieve uniformity of composition and are temperature sensors that use thermistor devices with good temperature accuracy.

Next, regarding the object of providing a device composition whereby the thermistor device has resistance-value stability even in the case of being subjected to a reducing environment, the present inventors thought that if the movement of oxygen atoms in a reducing environment could be eliminated from the thermistor device materials that constitute the thermistor device, then the thermistor device itself will not be reduced and its resistance will not change. Moreover, the inventors focused on the formation of an anti-reducing composition that discourages the reaction with oxygen on the thermistor device surface and as a result of experimental studies, confirmed that changes in the resistance of the thermistor device itself can be suppressed.

The fourth aspect of the present invention is based on the results of the aforementioned studies, and is a thermistor device characterized by a thermistor portion made of thermistor materials and an anti-reducing coating made of an anti-reducing material formed on the surface of this thermistor portion. Here, a precursor material of an organometallic compound is attached to the surface of the thermistor portion and then firing is performed to form the anti-reducing material.

By means of the aforementioned fourth aspect, a device structure is adopted in which the surface portions of the thermistor device are covered with an anti-reducing film, so a device structure that has resistance-value stability even in the case in which the thermistor device itself is exposed to a reducing environment can be provided.

Normally when a thermistor device is used in a temperature sensor, a pair of electrically conducting members (e.g., metal lead wires) is used to maintain electrical continuity with the thermistor device in order to detect the temperature from the change in resistance of the device. In the case that the thermistor device of the fourth aspect is used as the temperature sensor, a structure is adopted whereby the aforementioned pair of electrically conducting members penetrate the anti-reducing coating which is the surface layer and make contact with the thermistor portion in the interior.

For this reason, in order to prevent a short circuit between the pair of electrically conducting members, the anti-reducing coating should preferably be an electrical insulator. Based on the studies of the present inventors, the anti-reducing material that makes up the anti-reducing film should have an electrical resistance higher than the thermistor materials that make up the thermistor portion.

Based on the aforementioned studies, anti-reducing material that makes up the anti-reducing film should not allow oxygen to pass through and its resistance value is preferably high, and the results of the studies of the present inventors found that the anti-reducing material should preferably contain one or more elements selected from the group of Y (yttrium), Al (aluminum) and Si (silicon). This material is preferably a material selected from the group of $Y_2O_3$ (yttria), $Al_2O_3$ (alumina), $SiO_2$ (silica), $Y_3Al_5O_{12}$ (YAG: yttrium-aluminum-garnet), $3Al_2O_3 \cdot 2SiO_2$ (mullite) and $Y_2SiO_5$.

A specific example of the fourth aspect is, in a thermistor device used at temperatures of 900° C. and above and likely to encounter reducing environments, a thermistor device that has resistance-value stability is provided.

The aforementioned thermistor device made by forming the aforementioned anti-reducing coating made of the aforementioned anti-reducing material on the surface of this thermistor portion can be manufactured by forming a precursor of the anti-reducing material on the surface of the thermistor portion, and then firing it to form the aforementioned anti-reducing coating on the surface of the thermistor portion.

An organometallic compound can be used as the aforementioned precursor. Said organometallic compound is preferably an alcoholate (metal alkoxide) containing one or more elements selected from the group of Y, Al and Si.

By dip coating the aforementioned thermistor portion with a solution containing the aforementioned organometallic compound, the precursor can be applied to the surface of the aforementioned thermistor portion. By means of this method, the precursor can be applied more easily than by spraying or spin coating.

BRIEF DESCRIPTION OF THE DRAWINGS

FIG. 15 is a diagram of the manufacturing process for the thermistor device of Comparative Example 3.

DESCRIPTION OF THE PREFERRED EMBODIMENT

First Aspect

Embodiment 1

Figure 1:
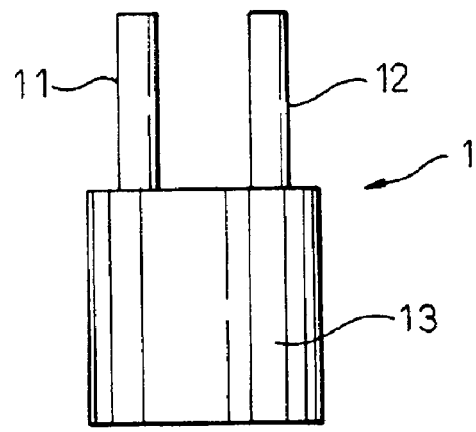
FIG. 1 is a structural diagram of the thermistor device of one example of the present invention.

In the perovskite-type material composition $(M1M2)O_3$ of the present invention, for example, the element M1 may be selected from Mg, Ca, Sr, Ba or other elements of Group 2A of the periodic table, or from Y, Ce, Pr, Nd, Sm, Eu, Gd, Dy, Ho, Er, Yb, Sc or other elements of Group 3A excluding La.

Moreover, for example, the element M2 may be selected from among Zn in Group 2B; Al and Ga in Group 3B; Ti, Zr and Hf in Group 4A; V, Nb and Ta in Group 5A; Cr, Mo and W in Group 6A; Mn, Tc and Re in Group 7A; or from among Fe, Co, Ni, Ru, Rh, Pd, Os, Ir and Pt in Group 8, respectively.

Here follows a description of the method of manufacturing the mixed sintered bodies of $(M1M2)O_3.Y_2O_3.Al_2O_3$ and $(M1M2)O_3.Al_2O_3$. The manufacturing process can be broadly divided into the first preparation step in which a calcine ($(M1M2)O_3$ or $(M1M2)O_3.Y_2O_3$) is obtained and the second preparation step in which the calcine thus obtained is then compounded with $Al_2O_3$, etc. ($Al_2O_3$ or $Y_2O_3$ and $Al_2O_3$) and then the thermistor device is obtained as a mixed sintered body of the prescribed shape.

In the first preparation step, the raw materials for M1 and M2, which are oxides of M1 (M1Ox) and oxides of M2 (M2Ox), are compounded (formulation 1), mixed and ground (mixing step) and then subjected to calcining (e.g., at about 1000° C.–1500° C.) (calcining step) to obtain a calcine.

Then, in the second preparation step, the calcine thus obtained is compounded with $Al_2O_3$, etc. so as to give the desired resistance value and resistance-temperature coefficient (formulation 2). The mixture obtained in formulation 2 (a mixture of the calcine and $Al_2O_3$, etc.) is ground (grinding step), embedded with lead wires of Pt or the like, molded into the desired shape in a mold (molding step) and sintered (e.g., at about 1400° C.–1600° C.) (sintering step) to obtain the thermistor device as a mixed sintered body.

Note that in the case that Y is included in M1 in the mixed sintered body of $(M1M2)O_3.Y_2O_3.Al_2O_3$, $Y_2O_3$ may be added in advance in formulation 1 as an oxide of M1 in the first preparation step and then passing through the mixing and calcining steps to obtain $(M1M2)O_3.Y_2O_3$. Thereafter, an appropriate amount of $Al_2O_3$, etc. is mixed with the calcine $(M1M2)O_3.Y_2O_3$ in order to achieve a mixed sintered body that ultimately has the desired composition ratio.

In passing, by adding $SiO_2$ and at least one of CaO, $CaCO_3$ or $CaSiO_3$, as a sintering aid, to the mixture of the calcine and $Al_2O_3$, etc. in the aforementioned formulation 2 step, the sintered density can be further increased. This will make the resistance value of the thermistor device more stable and reduce the dispersion of the resistance value with respect to fluctuations in the sintering temperature.

The thermistor device thus obtained is a mixed sintered body in which the perovskite-type compounds $(M1M2)O_3.Y_2O_3$ and $Al_2O_3$ (or $Al_2O_3$ and $Y_2O_3$) are mixed uniformly and bonded at their grain boundaries.

The thermistor device thus obtained was installed in a typical temperature sensor assembly to obtain a temperature sensor. Then, the temperature sensor was placed in a high-temperature furnace and the resistance value and resistance-temperature coefficient β were measured over the temperature range from room temperature (e.g., 27° C.) to 1000° C., and also the rate of change of resistance $\Delta R^1$ over the heat history from room temperature to 1000° C. or the like was measured.

Here, β is expressed as $\beta(K)=\ln(R/R_0)/(1/K-1/K_0)$. Note that ln indicates the natural logarithm, while R and $R_0$ represent the resistance value of the thermistor device at the temperatures of room temperature (300K) and 1000° C. (1273K), respectively in the atmosphere.

In addition, the rate of change of resistance $\Delta R^1$ represents the rate of change of the resistance of the temperature sensor in a high-temperature endurance test in which it is left for 100 hours at 1100° C. in the atmosphere, expressed by the formula $\Delta R^1(\%)=(R'_t/R_t)\times 100-100$. Note that $R_t$ represents the initial resistance value at a stipulated temperature t (e.g., 500° C.) and $R'_t$ is the resistance value at the stipulated temperature t after being left for 100 hours.

As a result, in the temperature range from room temperature to 1000° C., $R_t$ was found to be variable between 50Ω and 100 kΩ, and β adjustable in the range 2000–4000K, and $\Delta R^1$ was found to be stable at a level of roughly several % (see Table 1).

Here, in order to achieve the various values of $R_t$, range, β and $\Delta R^1$ more reliably, the mole fractions a and b in $a(M1M2)O_3.bAl_2O_3$ and $a(M1M2)O_3 b(Al_2O_3.Y_2O_3)$ preferably have the relationships $0.05 \leq a < 1.0$, $0 < b \leq 0.95$ and $a+b=1$.

Therefore, by means of this Embodiment, it is possible to provide a wide-range thermistor device that is able to detect temperatures over a high temperature range from room temperature to 1000° C., and has stable characteristics with a small change in its resistance value over the heat history of room temperature to 1000° C. or the like.

Moreover, the temperature-resistance coefficient β is adjustable in the range 2000–4000K, smaller than that of conventional thermistor devices, so dispersion in the resistance value accompanying fluctuations in temperature can be made smaller.

Embodiment 2

This Embodiment 2 is a method of manufacturing the mixed sintered body according to the aforementioned Embodiment 1, and has first and second preparation steps in the same manner as the aforementioned first manufacturing method in Embodiment 1, but is characterized as follows.

To wit, in the step in which the mixture of the calcine and $Al_2O_3$, etc. compounded in formulation 2 is ground (the grinding step), the average grain size of the mixture after grinding is brought to below the average grain size of the $Al_2O_3$, etc. before mixing. There follows a description mainly about this point.

The manufacturing method of this Embodiment 2 was discovered when, upon examining the sensor temperature accuracy of a temperature sensor incorporating the thermistor device made by the manufacturing method of the aforementioned Embodiment 1, the results indicated that there was dispersion in the temperature accuracy from sensor to sensor. Here, the method of evaluating the temperature accuracy was performed by the following method, for example.

Based on the resistance value-temperature data from a large number of temperature sensors (e.g., 100 units), the standard deviation σ (sigma) of the resistance value at a stipulated temperature (e.g., 500° C.) was calculated, and six times the standard deviation σ is taken as the amount of dispersion of the resistance value (both sides). The value of this amount of dispersion of the resistance value when converted to a temperature and halved becomes the value A, which is evaluated in terms of the expression "the temperature accuracy of ±A° C." As a result, the temperature accuracy of ±A° C. was found to have dispersion of ±20–30° C.

On the other hand, when the thermistor materials were observed by scanning electron microscope (SEM), electron probe microanalysis (EPMA) and other methods, in the aforementioned Embodiment 1, the average grain size of the calcine obtained from the first preparation step (e.g., 2–5 μm in the case of $(M1M2)O_3$) was found to be larger than the average grain size of the $Al_2O_3$, etc. (e.g., 0.6 μm or less in the case of $Al_2O_3$) with which it is to be mixed, so the two are not mixed uniformly so there is dispersion in the distribution of composition of the mixed sintered body.

Thus, the average diameter of the mixture (a mixture of the calcine and the $Al_2O_3$ etc.) after compounding and grinding in the second manufacturing method of the above first Embodiment, was changed variously, and the relation between the average particle size and temperature accuracy ±A° C. was examined. As a result, it was found that in the grinding step of the second manufacturing method, if the average particle size is brought to less than the average grain size of the $Al_2O_3$ etc. prior to mixing, the temperature accuracy can be decreased less than ±10° C. (refer to Table 2).

To this end, a media mixing mill or the like can be used as a means of grinding to give a finer average grain size. In addition, balls made of $ZrO_2$ (e.g., with a diameter of 0.5 mm) can be used as the grinding media in the media mixing mill.

By means of this Embodiment 2, the grinding step of the second preparation step is intended to grind the calcine and $Al_2O_3$, etc. finely to achieve uniform mixing and reduce fluctuation in the composition of the mixed sintered body, so the dispersion in the resistance value of the thermistor device can be reduced.

Therefore, in addition to the meritorious effects of the aforementioned manufacturing method in Embodiment 1, it is possible to provide a wide-range thermistor device that is able to achieve a better sensor accuracy (smaller dispersion in temperature accuracy from sensor to sensor) in the temperature range from room temperature to 1000° C.

Embodiment 3

This Embodiment 3 is a method of manufacturing the mixed sintered body according to the aforementioned first Embodiment, and has first and second preparation steps in the same manner as the aforementioned first manufacturing method in Embodiment 1, but is characterized as follows.

To wit, this Embodiment is characterized in that, in the step in which the oxide of M1 and the oxide of M2 and the like are compounded to formulation 1 and then mixed and ground (the mixing step), the M2 material is mixed and ground together with the M1 material, and the average grain size of this ground mixture is brought to be less than the average grain size of the M1 materials prior to mixing and also less than 0.5 μm, and then it is calcined to obtain a calcine.

Here, the grinding in the aforementioned mixing and grinding (mixing step) can be performed by a media mixing mill as described in the aforementioned Embodiment 2.

Then, in the second preparation step, the calcine is compounded with $Al_2O_3$, etc. and ground, embedded with lead wires of Pt or the like, molded into the desired shape in a mold and sintered to obtain the thermistor device as a mixed sintered body.

This Embodiment aims to achieve a more uniform mixing of the composition through the uniform fine grinding of the M1 and M2 materials, and thus reduce dispersion in the composition of the calcine and suppress the presence of unreacted raw materials, thereby reducing dispersion in the resistance value of the thermistor device.

Therefore, in addition to the meritorious effects of the aforementioned manufacturing method in Embodiment 1, it is possible to provide a wide-range thermistor device that is able to achieve a better sensor accuracy (smaller dispersion in temperature accuracy from sensor to sensor) in the temperature range from room temperature to 1000° C.

Note that the grinding in the grinding step of the second preparation step can be performed by a ball mill or the like, but a media mixing mill or the like can be used in the same manner as in the aforementioned Embodiment 2. If this is done, in addition to the meritorious effects of this Embodiment, there is added the meritorious effects of the aforementioned Embodiment 2, wherein the grinding step of the second preparation step is intended to grind the calcine and $Al_2O_3$, etc. finely to achieve uniform mixing and reduce fluctuation in the composition of the mixed sintered body in the subsequent molding and sintering steps, so the dispersion in the resistance value of the thermistor device can be reduced to an even greater level.

In addition, in a temperature sensor that uses a wide-range thermistor device according to Embodiments 2 and 3, the temperature accuracy is suppressed to ±10° C. or less, so they are suited for use in map controllers that require a high degree of temperature accuracy, such as in the temperature monitors for automotive exhaust oxygen sensors.

Second Aspect

Embodiment 4

The thermistor device of this Embodiment is suited to a thermistor device that is used in a temperature sensor that can detect temperatures in a wide range from room temperature to 1000° C. (a so-called wide-range thermistor device). Temperature sensors that use the thermistor device of this Embodiment may be used as temperature sensors for detecting the temperature of automobile exhaust gas, for example.

FIG. 1 is a structural diagram of the thermistor device 1 of this Embodiment. Thermistor device 1 is made of a sintered body formed in bulk of a specified shape (cylindrical in this example). This thermistor device 1 consists of a sintered body of oxides of a plurality of metals such as Y, Sr, Cr, Fe, Ti or the like, which are mixed at a prescribed composition ratio. Specific examples are $aY(Cr_{0.5}Mn_{0.5})O_3 \cdot bY_2O_3$, $aY(Cr_{0.5}Mn_{0.5})O_3 \cdot bAl_2O_3$, $(Y_{0.9}Ca_{0.1})(Cr_{0.75}Fe_{0.2}Ti_{0.05})O_3$, $(Al_{0.7}Cr_{0.2}Fe_{0.1})_2O_3 \cdot MgO \cdot CaO$ and other compositions.

Figure 11:
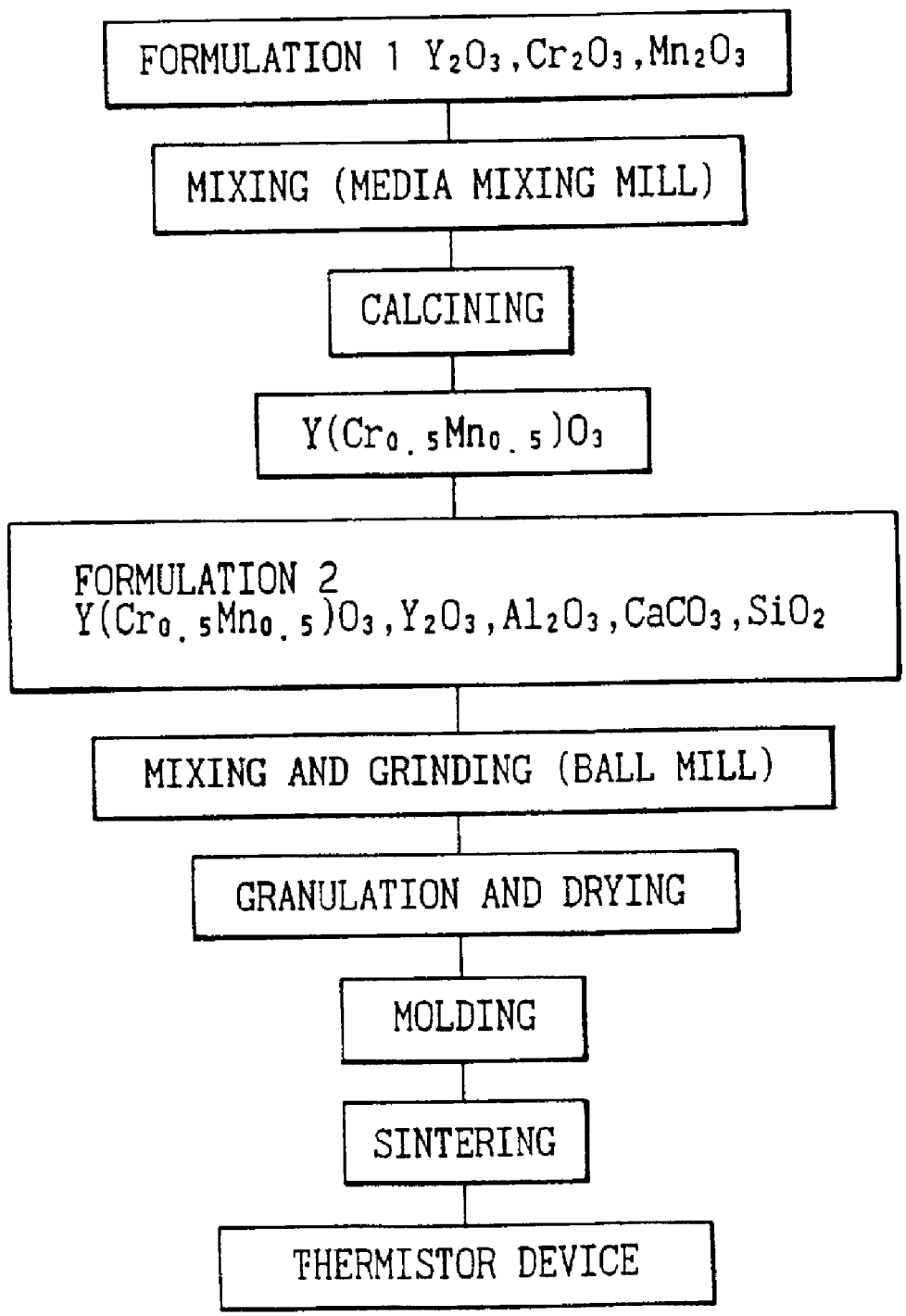
FIG. 11 is a diagram of the manufacturing process for the thermistor device of Working Example 8 of the present invention.
Figure 12:
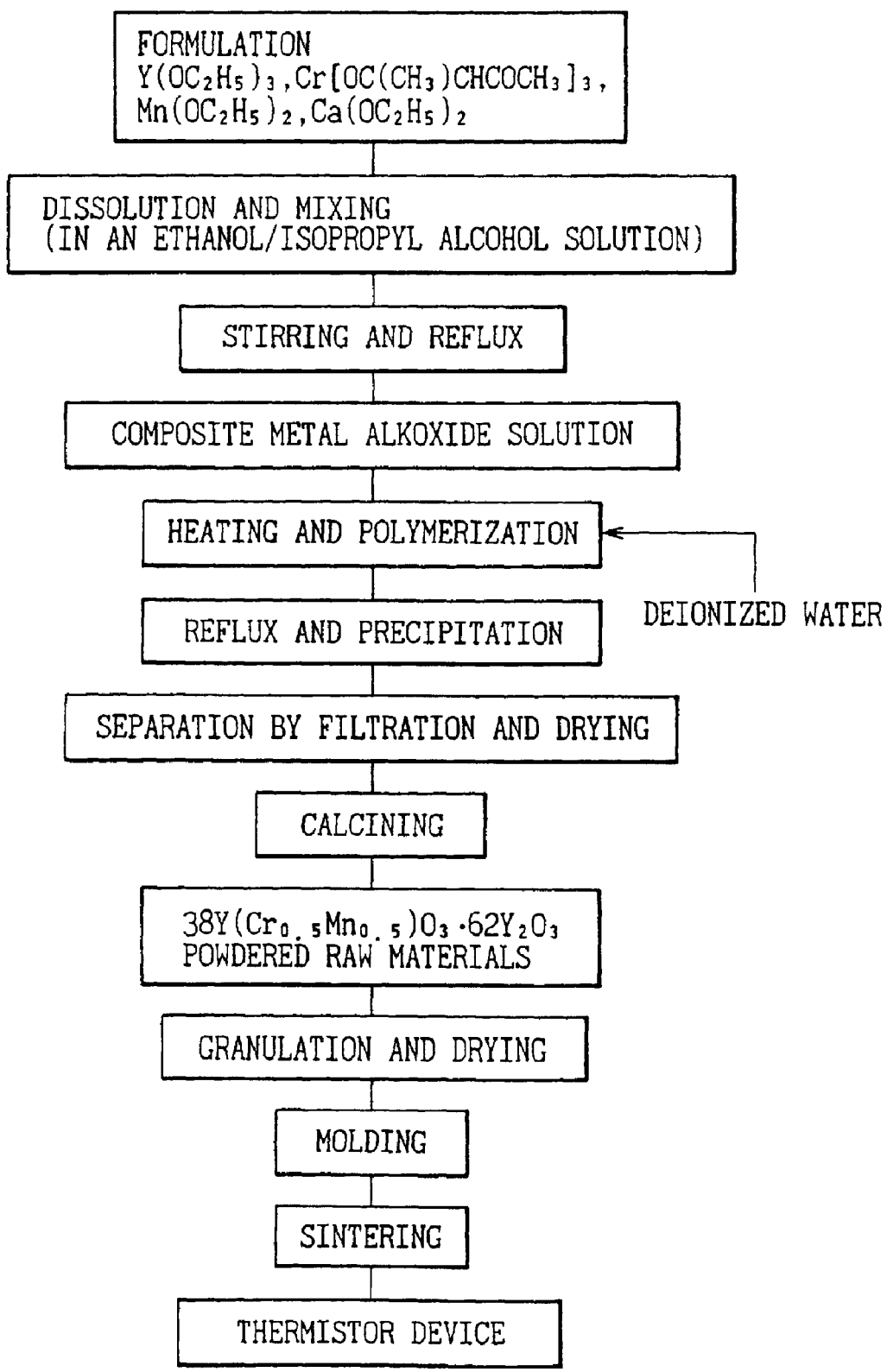
FIG. 12 is a diagram of the manufacturing process for the thermistor device of Working Example 9 of the present invention.

In FIGS. 1, 11 and 12 indicate a pair of lead wires (signal acquisition electrodes) made of platinum for detecting the temperature from the change in the resistance of this thermistor device 1. Although this portion is not shown, the two lead wires 11 and 12 are buried within the thermistor device 1 at a fixed distance away from each other roughly parallel to the longitudinal axis of the cylinder of the thermistor device 1. Moreover, their unburied portions extend outward from one end of the thermistor device 1.

Figure 2:
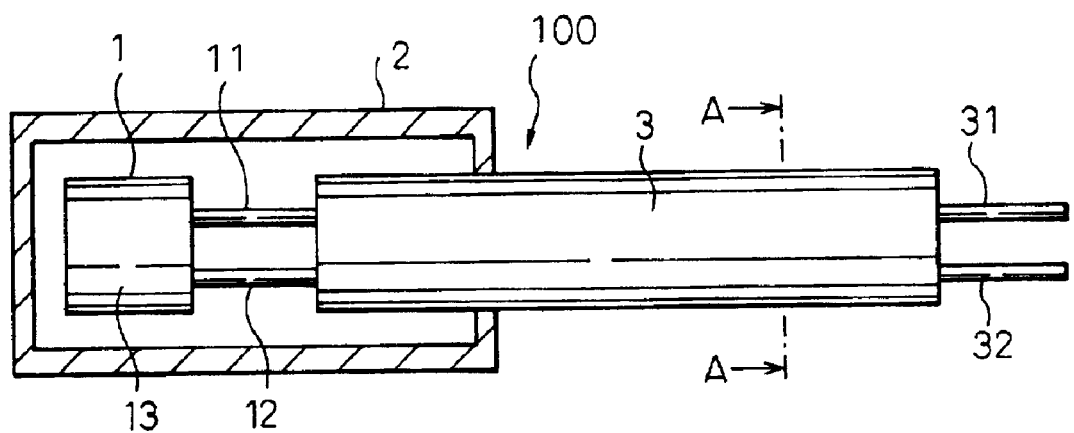
FIG. 2 is a cross-sectional structural diagram of a temperature sensor that uses the thermistor device of FIG. 1.
Figure 3:
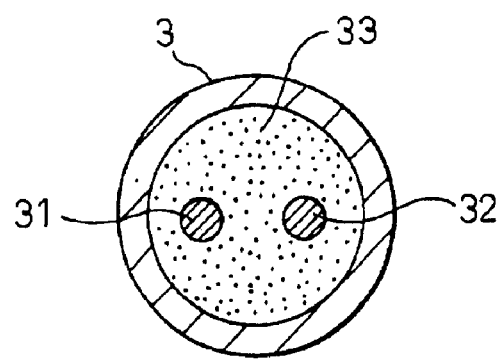
FIG. 3 is a cross section at A—A of FIG. 2.

Then, the thermistor device 1 with lead wires 11 and 12 attached is assembled into a temperature sensor 100 as shown in FIG. 2. FIG. 2 is a cross section of temperature sensor 100. FIG. 3 is a cross section at A—A of FIG. 2. Here, 2 is a metal cap having the shape of a cylinder with a bottom, and 3 is a cylindrical metal pipe. Metal cap 2 is secured to the outside edge of metal pipe 3 by means of crimping or the like, so that the interior of metal cap 2 is a sealed space. Moreover, the thermistor device 1 with lead wires 11 and 12 attached is disposed within the metal cap 2.

In addition, the outside ends of lead wires 11 and 12 are electrically connected to lead wires 31 and 32 in order to exchange signals with external circuitry (e.g., an automobile's exhaust control unit (ECU); not shown). The locations of the connections among the lead wires 11, 12, 31 and 32 may be either inside or outside of the metal pipe 3. Note that as shown in FIG. 3, the interior of the metal pipe 3 is filled with magnesia powder 33 in order to ensure the insulation of the lead wires 31 and 32 within the metal pipe 3.

The temperature sensor 100 may be disposed with the tip of the metal cap 2 in the exhaust passage of an automobile exhaust device, to detect the temperature of the exhaust gas. Specifically, the exhaust gas temperature can be determined using the R-T characteristic of the thermistor device and the electrical signal indicating the temperature of the exhaust gas which is acquired through the lead wires 11, 12, 31 and 32 by the aforementioned external circuitry.

Next, we will describe the method of manufacturing thermistor device 1. Note that details will be provided in the Examples given later. The manufacturing method of this Embodiment can be broadly divided into the first step (the powdered raw material manufacturing step) in which the powdered raw material containing the metal elements in the stipulated composition that constitute the thermistor device 1 is obtained by means of a liquid-phase method and the second step (the thermistor molding step) in which the powdered raw material thus obtained is granulated, dried, molded, sintered and such to obtain the thermistor device 1.

First, in the first step, a plurality of precursor compounds that contain metallic elements that constitute the thermistor device 1 is mixed in the liquid phase to form a liquid mixture of the stipulated composition, and a metallic salt precipitating agent is added to this liquid mixture to precipitate a gelatinous precipitate containing a plurality of metallic elements. Next, by drying and heating this precipitate, the powdered raw material which is a powder composition containing a plurality of metallic elements is formed.

Here, the aforementioned precursor compounds may be metal alkoxides, metal acetylacetonates, metal carboxylates or other organometallic compounds, and examples of which include: triethoxy yttrium $(Y(OC_2H_5)_3)$, diethoxy manganese $(Mn(OC_2H_5)_2)$, tris (2,4-pentadiono) chromium $(Cr[OC(CH_3)CHCOCH_3]_3)$ or the like.

Moreover, the precursor compounds may also be nitrate compounds, oxy-nitrate compounds, chlorides, oxy-chlorides or other inorganic metallic compounds, and examples of which include: yttrium nitrate $(Y(NO_3)_3 \cdot 6H_2O)$, calcium nitrate $(Ca(NO_3)_2 \cdot 4H_2O)$, chromium nitrate $(Cr(NO_3)_3 \cdot 9H_2O)$, iron nitrate $(Fe(NO_3)_3 \cdot 9H_2O)$, titanium oxynitrate $(5TiO_2 \cdot N_2O_5 \cdot 6H_2O)$ or the like.

The solvent in which these precursor compounds are dissolved or dispersed in can be selected in consideration of solubility and subsequent treatment (drying, etc.), and examples of solvents that can be used include solvent mixtures of ethanol and isopropyl alcohol or other organic solvents, or deionized water or the like. Moreover, the metallic salt precipitating agent can be selected appropriately in consideration of the solubility of the precursor compounds in the solvent mixture, the concentration, pH value, and other conditions in order that the precipitate is efficiently precipitated. Examples of the precipitating agent include deionized water, sodium bicarbonate, ethylene glycol or the like.

Moreover, in the formation of the aforementioned liquid mixture of precursor compounds, the aforementioned precursor compounds may be mixed in the liquid together with a complexing compound to form a liquid mixture. Thereby, this complexing compound reacts with the aforementioned plurality of precursor compounds to form a composite metallic complex compound in which at least one or more metallic elements is coordinated, and after polymerizing the composite metallic complex compound, a precipitate of this composite metallic complex compound and its polymer can be obtained as a metallic salt.

Here, the aforementioned complexing compound should preferably contain at least two carboxyl groups as coordination sites and at least one other coordination site. To wit, by having three or more coordination sites, it is able to coordinate at least one metallic element and the remaining coordination sites can be used to form chains in the polymerization reaction. Examples of such complexing compounds include ethylenediaminetetraacetic acid (EDTA) and citric acid.

Moreover, the gelatinous precipitate of metallic salts precipitated from the liquid mixture of precursor compounds can be dried and heated (calcined) to remove any moisture or impurities (organic compounds or gases, etc.) that may be present. In this manner, it is possible to obtain powdered raw material which is a powdered composition containing the stipulated composition of metallic elements to constitute the thermistor device 1. Next, in the second step, this powdered raw material is used to complete the thermistor device 1.

In the second step, the powdered raw material thus obtained is granulated, assembled with the lead wires 11 and 12 of Pt or the like, molded into the desired shape and sintered (at a temperature of roughly 1400° C.–1600° C.). Thus, as shown in FIG. 1, a thermistor device 1 consisting of a sintered body with the lead wires 11 and 12 attached is obtained. Then, this thermistor device 1 is assembled into the temperature sensor 100 as shown in FIG. 2.

Evaluation of the resistance characteristics of thermistor device 1 is performed in the state when assembled into the temperature sensor 100. The dispersion of the resistance value of thermistor device 1 is evaluated as the temperature accuracy of the temperature sensor 100. The temperature sensor 100 is placed into a furnace and the resistance value and resistance-temperature coefficient β were measured over the temperature range from room temperature (e.g., 27° C.) to 1000° C. Here, β has the same meaning as in Embodiment 1.

The method of evaluating the temperature accuracy is as follows. Based on the resistance value-temperature data from 100 temperature sensors, the standard deviation σ (sigma) of the resistance value at the temperature of 600° C. was calculated, and six times the standard deviation σ is taken as the amount of dispersion of the resistance value (both sides). The value of this amount of dispersion of the resistance value when converted to a temperature and halved becomes the value A, which is evaluated as the temperature accuracy of ±A° C. As a result of evaluating this for 100 units of thermistor device 1, the temperature accuracy was found to be stable at a level of ±2–5° C. in the range from room temperature to 600° C. (refer to FIG. 5).

This level of temperature accuracy is within a range suitable for the systems that require a high degree of precision as those given in the description of the second object of the present invention. Therefore, by means of this Embodiment, the resistance-value dispersion of the thermistor device can be reduced to below the conventional level of temperature accuracy (±20–30° C. over room temperature to 600° C.; see Table 6). Moreover, the temperature sensor 100 which uses the thermistor device 1 of this Embodiment is able to achieve a temperature accuracy better than the conventional level in the range from room temperature to 1000° C.

In passing, by means of this Embodiment, since the plurality of precursor compounds dissolve or disperse in the liquid phase, they can be mixed in the desired composition ratio in the fine-grained state on the atomic or molecular order, as the various precursor compounds can be mixed uniformly. Therefore, the powdered raw material contains the metallic elements mixed at the desired composition ratio on the atomic or molecular order, so that the thermal reactions in subsequent heat treatment are made uniform. Therefore, ultimately, in a thermistor device manufactured as a sintered body, the dispersion in composition of the crystal grains that make up the thermistor device can be suppressed.

Here, when an analytical electron microscope (AEM) was used to examine the crystal phases of the grains of crystal phases that mainly dominate the resistance value, and an analysis of the composition was performed, almost none of the conventional dispersion in composition from the ideal composition was seen, so uniformity of composition on the atomic and molecular order was found. In addition, upon using a transmission electron microscope (TEM) to observe the thermistor device 1, the average grain sizes of the various crystal grains were found to be smaller than 1 μm, being very fine grains on the order of several nm (nanometers) to several hundred nm which were uniformly dispersed/mixed in the composition.

Embodiment 5

This Embodiment presents the method of manufacturing the aforementioned thermistor device 1, and specifically a thermistor device consisting of a mixed sintered body of $(M1M2)O_3 \cdot Y_2O_3$ which is a mixture of the composition $(M1M2)O_3$ and $Y_2O_3$ (where M1 is at least one or more elements selected from the elements of Group 2A or Group 3A of the periodic table excluding La, and M2 is at least one or more elements selected from the elements of Group 2B, Group 3B, Group 4A, Group 5A, Group 6A, Group 7A or Group 8 of the periodic table).

In this mixed sintered body of $(M1M2)O_3 \cdot Y_2O_3$, taking the mole fraction of $(M1M2)O_3$ to be c and the mole fraction of the aforementioned $Y_2O_3$ to be d, these mole fractions c and d should preferably satisfy the relationships $0.05 \leq c < 1.0$, $0 < d \leq 0.95$ and $c+d=1$.

By adopting these relationships, the temperature-resistance coefficient β described in Embodiment 1 above can be made adjustable in the range 2000–4000K, so dispersion in the resistance value accompanying fluctuations in temperature can be made smaller, and thus a thermistor device 1 that is able to measure temperatures over a wide range from room temperature to 1000° C. can be obtained.

Moreover, in order to obtain a thermistor device 1 that is able to measure temperatures over a wide range from room temperature to 1000° C., M1 should preferably be one or more elements selected from the group Y, Ce, Pr, Nd, Sm, Eu, Gd, Dy, Ho, Er, Yb, Mg, Ca, Sr, Ba and Sc, while M2 should preferably be one or more elements selected from the group Ti, V, Cr, Mn, Fe, Co, Ni, Zn, Al, Ga, Zr, Nb, Mo, Hf, Ta and W.

Moreover, the manufacturing method of this Embodiment comprises the steps of: a first step (the powdered raw material manufacturing step) wherein a plurality of precursor compounds containing the elements M1, M2 and Y that constitute the thermistor device 1 (hereinafter called the "constituent elements") and a complex-forming agent are mixed in the liquid phase to form a liquid mixture, said plurality of precursor compounds and said complex-forming agent are caused to react in said liquid mixture to form a composite complex compound in which said constituent elements are coordinated, and then a polymerizing agent is added to said composite complex compound to obtain a polymer containing said constituent elements, and said polymer is dried and heated to obtain the powdered raw materials that contain said constituent elements.

Citric acid can be used as the aforementioned complex-forming agent and ethylene glycol can be used as the polymerizing agent.

The complex-forming agent citric acid has a high solubility so the composite complex compound can be prepared at a high concentration and thus the water content of the liquid mixture can be lowered, thereby reducing the heat energy requirements for drying and heat treatment in subsequent steps.

In addition, by increasing the citric acid concentration, the thermistor composition can be made even more uniform.

This is because disassociation of the elements of the composite complex compound back into the liquid mixture can be suppressed, and dispersion of the composition of the thermistor device thus obtained can be reduced.

According to studies by the present inventors, it was found that if the number of moles of citric acid is taken as e and the total number of moles of the elements M1, M2 and Y that constitute the thermistor device is taken as f, then by synthesizing the raw materials so as the number of moles e and f such that the relationship $1 \leq e/f \leq 30$ is satisfied, a thermistor device 1 that has a good temperature accuracy can be obtained.

Note that up to a citric acid concentration of 20 times by weight, the polymer obtained is a gelatinous viscous liquid, but if the citric acid concentration is increased to 30 times by weight, then the polymer does not become a gelatinous viscous liquid, but rather a colloidal sol dispersed in the liquid.

This is because, if the citric acid concentration is greater than 30 times by weight, then the phenomenon of association and agglutination of citric acid molecules occurs, and the polymer obtained thereafter becomes a colloidal sol, and the added citric acid cannot be used effectively in complex formation, so a portion of the constituent elements of the thermistor device will remain undissociated in the liquid phase. For this reason, this gives rise to additional problems such as divergence in composition from the ideal composition and the divergence in composition may even tend to become larger. Therefore, the citric acid concentration should satisfy the aforementioned relationship.

Moreover, in the same manner as in Embodiment 1 above, this thermistor device 1 is assembled into temperature sensor 100 and its resistance characteristics (resistance value from room temperature to 1000° C., resistance-temperature coefficient β, temperature accuracy ±A° C.) were evaluated. As a result of evaluating the temperature sensor 100 of this Embodiment, the temperature accuracy from room temperature to 600° C. was found to be stable at a level of ±1.5–8° C. (see Table 7), and the temperature accuracy in the range from room temperature to 1000° C. was found to be better than conventional levels.

In passing, in this Embodiment also, since the plurality of precursor compounds dissolve or disperse in the liquid phase, the same meritorious effects as in Embodiment 4 above are obtained and, as a result, in a thermistor device manufactured as sintered body the dispersion in composition of the crystal grains that constitute the thermistor device can be suppressed. Also, in observations by AEM and TEM, results similar to those in Embodiment 4 above were obtained.

Fourth Aspect

Here follows a description of the fourth aspect of the present invention as embodied by a thermistor device that has a resistance value of 50Ω–100 kΩ in the temperature range from room temperature to 1000° C. (hereinafter referred to as a wide-range thermistor device). The thermistor device of this Embodiment can be used in a temperature sensor for detecting the temperature of automobile exhaust gas, for example.

Figure 26:
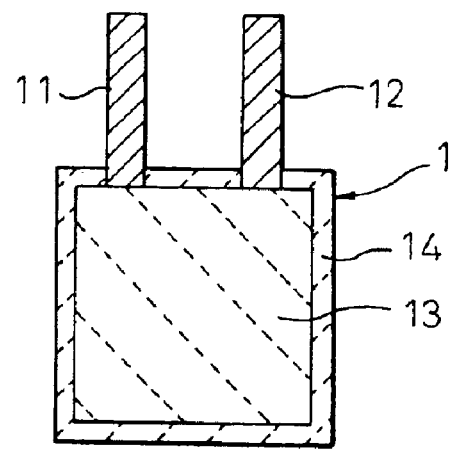
FIG. 26 is a schematic cross section of the thermistor device of one preferred embodiment of the present invention.

FIG. 26 is an explanatory diagram showing the schematic cross-sectional constitution of the thermistor device 1 of this Embodiment. Thermistor device 1 consists of a thermistor portion 13 made up of thermistor materials formed in bulk of a specified shape and an anti-reducing coating 14 made of an anti-reducing material formed on the surface of this thermistor portion 13.

Here, as the thermistor materials that make up the thermistor portion 13, based on studies by the present inventors, a mixed sintered body formed by mixing two types of compounds: a perovskite-type material (oxide) that has a relatively low resistance value and a material that has a relatively high resistance value is preferable in order to obtain a wide-range thermistor device.

The present inventors' studies into various perovskite-type materials found that the materials should preferably have the composition $(M1M2)O_3$ (where M1 is at least one or more elements selected from the elements of Group 2A or Group 3A of the periodic table excluding La, and M2 is at least one or more elements selected from the elements of Group 2B, Group 3B, Group 4A, Group 5A, Group 6A, Group 7A or Group 8 of the periodic table).

Note that La is highly hygroscopic and reacts with the moisture in the atmosphere to produce unstable hydroxides that could damage the thermistor device, so it is not used as M1.

In addition, as the various elements in $(M1M2)O_3$, M1 is preferably one or more elements selected from Mg, Ca, Sr, Ba (Group 2A of the periodic table), Y, Ce, Pr, Nd, Sm, Eu, Gd, Dy, Ho, Er, Yb, Sc (Group 3A), while M2 is preferably one or more elements selected from Zn (Group 2B), Al, Ga (Group 3B) Ti, Zr, Hf (Group 4A), V, Nb, Ta (Group 5A), Cr, Mo, W (Group 6A), Mn, Tc, Re (Group 7A), Fe, Co, Ni, Ru, Rh, Pd, Os, Ir or Pt (Group 8).

As the material that has a relatively high resistance value, according to the present inventors' studies, $Y_2O_3$ (yttrium oxide) or $Al_2O_3$ (aluminum oxide), which have a relatively high resistance value and stabilize the resistance value of the thermistor, were found to be preferable.

The thermistor portion 13 may be made of a mixed sintered body of $(M1M2)O_3 \cdot Y_2O_3$ obtained by sintering a mixture of the aforementioned $(M1M2)O_3$ and $Y_2O_3$, or the thermistor portion 13 may be made of a mixed sintered body of $(M1M2)O_3 \cdot Al_2O_3$ obtained by sintering a mixture of the aforementioned $(M1M2)O_3$ and $Al_2O_3$.

On the other hand, the anti-reducing coating 14 should not allow oxygen to pass through and should be made of an anti-reducing material that has a resistance value higher than that of the thermistor material that makes up the thermistor portion 13 (namely the aforementioned mixed sintered body). The aforementioned anti-reducing material should preferably contain one or more elements selected from the group of Y, Al and Si. This composition is preferably a composition selected from the group of $Y_2O_3$ (yttria), $Al_2O_3$ (alumina), $SiO_2$ (silica), $Y_3Al_5O_{12}$ (YAG), $3Al_2O_3 \cdot 2SiO_2$ (mullite) and $Y_2SiO_5$.

As shown in FIG. 26, a pair of lead wires made of platinum or the like (electrically conducting members) 11, 12 is provided on the thermistor device 1 in order to detect the temperature from the change in resistance of the device. The two lead wires 11 and 12 penetrate the anti-reducing coating 14 with one end buried in the thermistor portion 13. Note that although not shown, the portion of two lead wires 11 and 12 buried in the thermistor portion 13 are disposed at a fixed distance away from each other. As described above, the anti-reducing material has an electrical resistance higher than the thermistor materials that make up the thermistor portion 13 and is a resistor, so the anti-reducing coating 14 can prevent a short circuit between the two lead wires 11 and 12.

Figure 27:
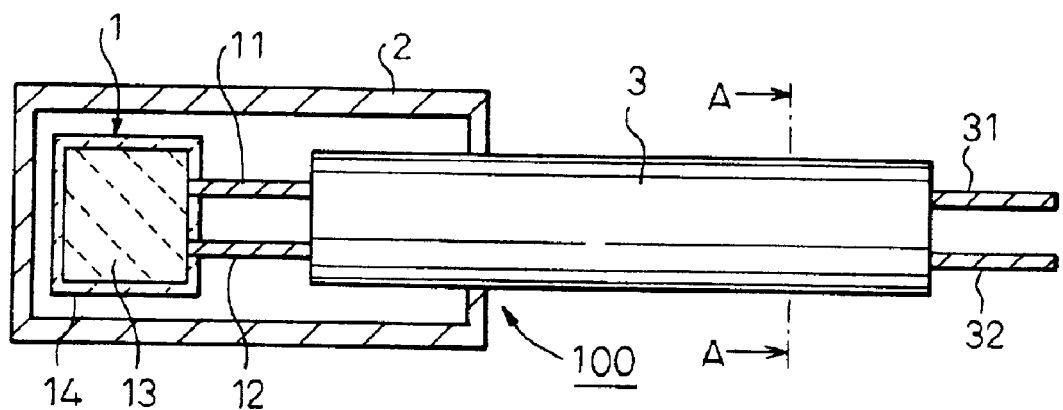
FIG. 27 is a cross section of a temperature sensor that uses the thermistor device of FIG. 26.
Figure 28:
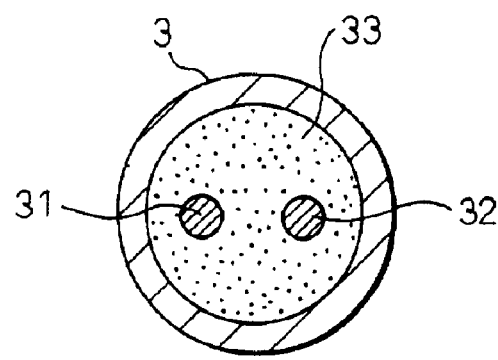
FIG. 28 is a cross section at A—A of FIG. 27.

The aforementioned thermistor device 1 with lead wires 11 and 12 attached is assembled into a temperature sensor 100 as shown in FIG. 27. FIG. 27 is an explanatory diagram showing the interior of the metal cap of temperature sensor 100 in perspective. FIG. 28 is a cross section at A—A of FIG. 27. In FIGS. 27 and 28, 2 is a cylindrical metal cap and 3 is a metal pipe. The ends of lead wires 11 and 12 opposite the ends buried in the thermistor portion 13 are electrically connected to lead wires 31 and 32 in order to exchange signals with external circuitry (e.g., an automobile's exhaust control unit (ECU). The locations of the connections among the lead wires 11, 12, 31 and 32 may be either inside or outside of the metal pipe 3. As shown in FIG. 28, the interior of the metal pipe 3 is filled with magnesia powder 33 in order to ensure the insulation of the lead wires 31 and 32 within the metal pipe 3. Metal cap 2 is secured to the outside edge of metal pipe 3 by means of crimping or the like, so that the interior of metal cap 2 is a sealed space.

Next, the method of manufacturing thermistor device 1 will be described. First, the case of using a mixed sintered body of $(M1M2)O_3 \cdot Y_2O_3$ as the thermistor portion 13 will be described. The manufacturing method in this case can be broadly divided into the first and second steps.

First, the raw materials for M1 and M2, which are oxides of M1 (M1Ox) and oxides of M2 (M2Ox) and $Y_2O_3$ (which may be the same as M1Ox), are compounded (formulation 1), mixed and ground using a media mixing mill or the like (mixing step) and then subjected to calcining at a temperature of approximately 1100° C. to approximately 1300° C. (calcining step). A composition of $(M1M2)O_3 \cdot Y_2O_3$ is obtained as calcine. This is the end of the first preparation step.

Then, the appropriate amount of this calcine thus obtained is weighed out (formulation 2) and the weighed calcine is ground (grinding step), embedded with lead wires of Pt or the like, molded into the desired shape in a mold (molding step) and sintered at a temperature of approximately 1400° C. to approximately 1600° C. (sintering step). In this manner a mixed sintered body (thermistor portion 13) with lead wires 11 and 12 attached is obtained.

Next, the surface of the thermistor portion 13 is dip coated with the precursors of the anti-reducing material in the liquid state (dip coating step) and sintering is performed at a temperature of approximately 1400° C. to approximately 1600° C. (sintering step). Thus, a thermistor device 1 with an anti-reducing coating 14 formed on its surface is obtained. This is the end of the second preparation step.

Next, the case of using a mixed sintered body of $(M1M2)O_3 \cdot Al_2O_3$ as the thermistor portion 13 will be described. The manufacturing method in this case can also be broadly divided into the first and second steps. However, the difference lies in that, after the calcine is obtained in the first preparation step, the calcine is compounded with $Al_2O_3$ in formulation 2 so that the desired resistance value and resistance-temperature coefficient is obtained.

First, in the first preparation step, starting with the raw materials for M1 and M2, the formulation 1, mixing step and calcining step are performed to obtain the composition $(M1M2)O_3$ as a calcine.

Then, the appropriate amount of this calcine thus obtained is weighed out and compounded with $Al_2O_3$ so that the desired resistance value and resistance-temperature coefficient is obtained (formulation 2). The weighed calcine is subjected to the grinding step, molding step and sintering step to obtain a mixed sintered body (thermistor portion 13) with lead wires 11 and 12 attached is obtained. Next, the dip-coating step and coating formation step are performed to obtain thermistor device 1.

Note that in the case of $(M1M2)O_3 \cdot Y_2O_3$ also, it is possible to obtain $(M1M2)O_3$ as a calcine in the first preparation step, and compound the calcine $(M1M2)O_3$ with $Y_2O_3$ to formulation 2 in the second preparation step so that the desired resistance value and resistance-temperature coefficient is obtained., and by continuing to the sintering step to obtain a mixed sintered body of $(M1M2)O_3 \cdot Y_2O_3$.

In the aforementioned dip-coating step, a liquid containing an organometallic compound can be used. An alcoholate (metal alkoxide) containing one or more elements selected from the group of Y, Al and Si can be used as the organometallic compound.

By performing the dip coating using the liquid containing these organometallic compounds, the organometallic compounds which are the precursors of the anti-reducing material can be applied to the surface of the thermistor portion 13. Thus, the anti-reducing coating 14 made from $Y_2O_3$, $Al_2O_3$, $Y_3Al_5O_{12}$, mullite, $Y_2SiO_5$ or the like in the film-forming step is formed as the anti-reducing material.

In the aforementioned formulation 1 and formulation 2, it is preferable to add a sintering aid in order to improve the sintering characteristics and the like of the mixed sintered body. As a result of the present inventors' studies on various sintering aids, it was found that using at least one sintering aid selected from the group CaO, $CaCO_3$, $CaSiO_3$ or $SiO_2$ is preferable in order to obtain a thermistor device with superior sintered density, stabilize the resistance value of the thermistor device, and reduce the dispersion in resistance values with respect to fluctuations in the sintering temperature.

In the thermistor portion 13 of the thermistor device 1 obtained in this manner, the perovskite-type compounds $(M1M2)O_3$ and $Y_2O_3$ (or $Al_2O_3$) are mixed uniformly via their grain boundaries.

A temperature sensor 100 using thermistor device 1 was placed in a high-temperature furnace and the resistance value and resistance-temperature coefficient β were measured over the temperature range from room temperature (e.g., 27° C.) to 1000° C., along with the rate of change of resistance $\Delta R^2$ during thermal aging at 900° C. Here, this thermal aging will cause the thermistor device 1 to be subjected to the effects of a reducing atmosphere inside the metal cap 2, so the aforementioned rate of change of resistance $\Delta R^2$ becomes an index for evaluating the resistance-value stability of the thermistor device 1 in this Embodiment.

Here, β has the same meaning as in Embodiment 1 above. In addition, the rate of change of resistance $\Delta R^2$ represents the rate of change of the resistance of the temperature sensor in a reducing atmosphere as given above, expressed with the formula $\Delta R^2(\%) = (Rmax_t/R_t) \times 100 - 100$. Here, $R_t$ represents the initial resistance value at a stipulated temperature t (e.g., 600° C.) and $Rmax_t$ is the maximum resistance value of $R_t$ during thermal aging at 900° C.

As a result, in the temperature range from room temperature to 1000° C., $R_t$ was found to be variable between 50Ω and 100 kΩ, and β adjustable in the range 2000–4000K, and $\Delta R^2$ was found to be stable at a level of + (plus) several % (see Tables 9 and 10).

Thus, according to this Embodiment, by adopting a device structure in which the anti-reducing coating 14 is formed, it is possible to provide a thermistor device 1 that has a small value of the rate of change of resistance $\Delta R^2$ and stable characteristics (resistance-value stability) even if the device itself is subjected to a reducing environment.

In addition, according to this Embodiment, since there is no need to perform the thermal aging treatment at high temperature (roughly 900° C.) for a long time (roughly 100 hours), it is possible to reduce the manufacturing steps and lower sensor costs.

In addition, by making the thermistor portion 13 the aforementioned mixed sintered body, the sensor has excellent resistance-temperature characteristics whereby its resistance value is 50Ω to 100 kΩ over the temperature range from room temperature to 1000° C., so it is possible to provide a thermistor device that is able to detect temperatures over a wide temperature range from room temperature to 1000° C.

In order to achieve the various values of the resistance value ($R_t$), range and β more reliably, the mole fractions a and b in a(M1M2)$O_3$.b$Y_2O_3$ and a(M1M2)$O_3$.b$Al_2O_3$ preferably have the relationships 0.05≦a<1.0, 0<b≦0.95 and a+b=1. In a mixed sintered body, the mole fractions can be varied over a wide range so that, by appropriately mixing and sintering both (M1M2)$O_3$ and $Y_2O_3$ (or $Al_2O_3$), the resistance value and resistance-temperature coefficient can be controlled variously over a wide range of compositions.

Next, the present invention will be described in more detail by means of the following working examples 1–33 and comparative examples 1–2, but the present invention is in no way limited by these working examples.

Note that working examples 9–17 are used to explain the aforementioned Embodiment 4, while working examples 18–23 are used to explain the aforementioned Embodiment 5.

In addition, in working examples 24–28, thermistor portion 13 is made of the mixed sintered body (M1M2)$O_3$.$Y_2O_3$ where M1 is Y and M2 is Cr and Mn, so this is performed on the mixed sintered body Y(CrMn)$O_3$.$Y_2O_3$. In working examples 29–33, thermistor portion 13 is made of the mixed sintered body (M1M2)$O_3$.$Al_2O_3$ where M1 is Y and M2 is Cr and Mn, so this is performed on the mixed sintered body Y(CrMn)$O_3$.$Al_2O_3$.

WORKING EXAMPLES

Working Example 1

Working example 1 is an example of (M1M2)$O_3$ where M1 is Y, M2 is Cr and Mn so that Y($Cr_{0.5}Mn_{0.5}$)$O_3$ and $Al_2O_3$ are used to obtain the mixed sintered body Y($Cr_{0.5}Mn_{0.5}$)$O_3$.$Al_2O_3$.

Figure 4:
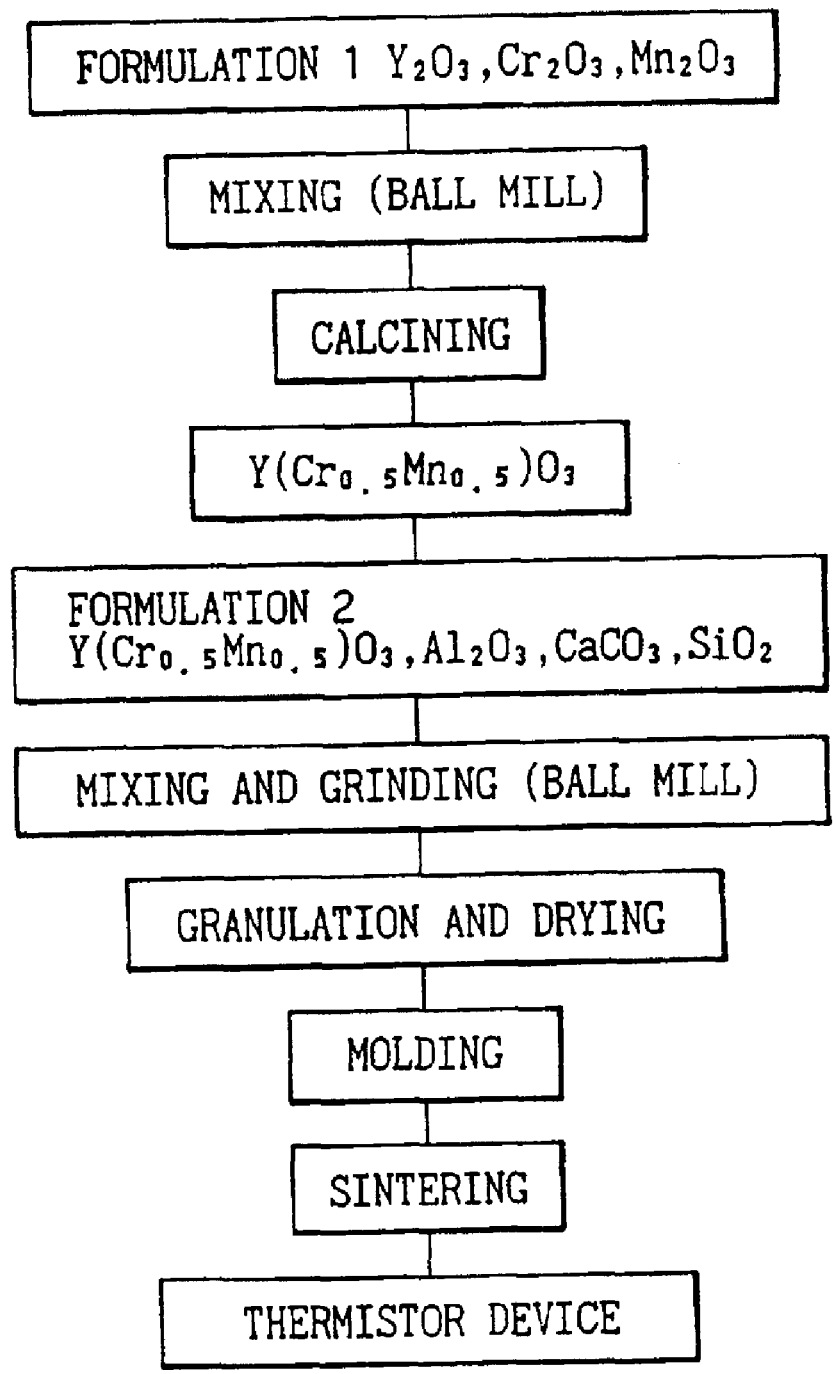
FIG. 4 is a diagram of the manufacturing process for the thermistor device of Working Example 1 of the present invention.

FIG. 4 shows the manufacturing process of the thermistor device of working example 1. This manufacturing process can be broadly divided into the first preparation step from formulation 1 until Y($Cr_{0.5}Mn_{0.5}$)$O_3$ is obtained and the second preparation step from the compounding of the Y($Cr_{0.5}Mn_{0.5}$)$O_3$ thus obtained with $Al_2O_3$, etc. (formulation 2) until the thermistor device is obtained.

In the first preparation step, first, $Y_2O_3$, $Cr_2O_3$ and $Mn_2O_3$ each with a purity of 99.9% or greater are prepared, and the $Y_2O_3$, $Cr_2O_3$ and $Mn_2O_3$ are each weighed out so that the molar ratio of Y:Cr:Mn: becomes 2:1:1 in a total weight of 500 g (formulation 1).

In order to mix the material thus weighed out, a ball mill is prepared by placing 2.5 kg of 15-mm diameter balls and 2.5 kg of 20-mm diameter balls made of $Al_2O_3$ or $ZrO_2$ in a plastic pot (5-liter capacity). The entire amount of the $Y_2O_3$, $Cr_2O_3$ and $Mn_2O_3$ is placed in this pot and 1500 cc of deionized water is added and then mixing is performed at 60 rpm for 6–12 hours (mixing step). Here, the slurry mixture after the mixing process was evaluated using a laser granulometer, and the results indicated that the average grain size was 1.7 μm (see Table 2).

The slurry mixture of $Y_2O_3$, $Cr_2O_3$ and $Mn_2O_3$ obtained after the mixing process was transferred to a porcelain evaporating dish and dried for 12 hours at 150° C. using a hot-air dryer to obtain a solid mixture of $Y_2O_3$, $Cr_2O_3$ and $Mn_2O_3$. Next, this solid mixture was given a rough grinding in a mixing and grinding machine and passed through a #30 mesh sieve to obtain a powdered mixture of $Y_2O_3$, $Cr_2O_3$ and $Mn_2O_3$.

In the calcining step, this powder mixture was placed in a crucible of 99.3% $Al_2O_3$ and calcined for 1–2 hours at 1100–1300° C. in a high-temperature furnace in air to obtain Y($Cr_{0.5}Mn_{0.5}$)$O_3$. The Y($Cr_{0.5}Mn_{0.5}$)$O_3$ that had become a clump-like solid in calcining was given a rough grinding in a mixing and grinding machine and passed through a #30 mesh sieve to obtain a powder.

When this Y($Cr_{0.5}Mn_{0.5}$)$O_3$ is used alone as the thermistor materials, it exhibits low resistance and a low resistance-temperature coefficient of 1000–4000K. In order to obtain a wide-range thermistor material, this Y($Cr_{0.5}Mn_{0.5}$)$O_3$ is used with $Al_2O_3$, which is a material that stabilizes the low resistance of the thermistor.

In the second preparation step, first, the powdered Y($Cr_{0.5}Mn_{0.5}$)$O_3$ and commercial powdered $Al_2O_3$ (purity of 99.9% or greater, average grain size of 0.6 μm) are weighed out to achieve the Y($Cr_{0.5}Mn_{0.5}$)$O_3$:$Al_2O_3$ formulation molar ratio of 40:60 in a total weight of 500 g.

Here, if the molar fractions of Y($Cr_{0.5}Mn_{0.5}$)$O_3$ and $Al_2O_3$ are given as a and b, respectively (a+b=1), then these values become a=0.38 and b=0.62 to match the formulation molar ratio given above.

In addition, $SiO_2$ and $CaCO_3$, which assume the liquid phase in the temperature range of 1500–1650° C. during sintering, are used as sintering aids. $SiO_2$ is added in the amount of 3 wt. % and $CaCO_3$ in the amount of 4.5 wt. % of the entire weight (500 g) of the aforementioned Y($Cr_{0.5}Mn_{0.5}$)$O_3$ and $Al_2O_3$ (formulation 2).

Next, in the grinding step ("Mixing and grinding" in the Fig.), the aforementioned Y($Cr_{0.5}Mn_{0.5}$)$O_3$, $Al_2O_3$, $SiO_2$ and $CaCa_3$ are placed in a ball mill prepared by placing 2.5 kg of 15-mm diameter balls and 2.5 kg of 20-mm diameter balls made of $Al_2O_3$ or $ZrO_2$ in a plastic pot (5-liter capacity). After 1500 cc of deionized water is added, mixing is performed at 60 rpm for 4 hours.

In addition, in the aforementioned grinding process, to the solid portion of the Y($Cr_{0.5}Mn_{0.5}$)$O_3$ and $Al_2O_3$ is added a binder of polyvinyl alcohol (PVA) in the amount of 1 g per 100 g of the powder mixture of Y($Cr_{0.5}Mn_{0.5}$)$O_3$ and $Al_2O_3$ while the mixture is mixed and ground. Here, the slurry mixture after the mixing process was evaluated using a laser granulometer, and the results indicated that the average grain size was 2.5 μm (see Table 2).

The ground slurry mixture of Y($Cr_{0.5}Mn_{0.5}$)$O_3$ and $Al_2O_3$ obtained after mixing and grinding was granulated and dried in a spray dryer to obtain a powdered mixture of Y($Cr_{0.5}Mn_{0.5}$)$O_3$ and $Al_2O_3$. This powdered mixture becomes the thermistor raw material.

Next, in the molding step (mold molding), this thermistor raw material was used in a mold with an inside diameter of 1.74 mm, into which were inserted lead wires made of Pt 100 (pure platinum) with dimensions (outside diameter× length) of 0.3 mm×10.5 mm. The molding was performed at a pressure of approximately 1000 kgf/cm² to obtain a molded thermistor device with an outside diameter of 1.75 mm with lead wires attached.

In the sintering step, this molded thermistor device was placed on a corrugated setter made of $Al_2O_3$ and sintered for 1–2 hours at 1400–1600° C. in air to obtain a thermistor device made of $aY(Cr_{0.5}Mn_{0.5})O_3.bAl_2O_3$ with an outside diameter of 1.60 mm.

FIG. 1 shows the thermistor device 1 thus obtained. The ends of two parallel lead wires 11 and 12 are buried in the cylindrical thermistor portion 13 with an outside diameter of 1.60 mm. This thermistor device 1 is assembled into a typical temperature sensor 100 as shown in FIGS. 2 and 3.

As shown in FIG. 2, thermistor device 1 is disposed within a tubular heat-resistant metal case 2. Although not shown, the lead wires 11 and 12 are connected to the lead wires 31 and 32 of metal pipe 3 that pass through the interior of metal pipe 3. As shown in FIG. 3, the interior of the metal pipe 3 is filled with magnesia powder 33 in order to ensure the insulation of the lead wires 31 and 32 within the metal pipe 3. This completes the temperature sensor.

Note that, in this working example and the other working examples 2–8 and comparative examples 1 and 2, the thermistor device and temperature sensor thus fabricated have the same structure as those shown in FIGS. 1–3, so the explanation is omitted. However, the composition of the materials for the mixed sintered body is naturally that given in each example.

Moreover, in the aforementioned second preparation step, the materials are also weighed out to give a $Y(Cr_{0.5}Mn_{0.5})O_3:Al_2O_3$ formulation molar ratio of 95:5 and 5:95, and thermistor devices are fabricated thereafter by the same procedure and assembled into the temperature sensor. Here, the individual devices in which the $Y(Cr_{0.5}Mn_{0.5})O_3:Al_2O_3$ formulation molar ratio is 40:60, 95:5 and 5:95 are called device number 1, device number 2 and device number 3, respectively.

A temperature sensor 100 using thermistor device 1 was placed in a high-temperature furnace and the temperature characteristics of the resistance value were measured over the temperature range from room temperature (e.g., 27° C.) to 1000° C. in the same manner as in Embodiment 1 above. Table 1 shows the results of evaluation.

Here, Table 1 shows the results of evaluation of the resistance-temperature characteristics of the thermistor devices of working examples 2–4 to be given below. As described above, working examples 1–4 show the same mixed sintered body manufactured by different manufacturing methods but, as is evident from Table 1, even if different manufacturing methods are used, a similar resistance-temperature characteristic is obtained for each formulation molar ratio of a:b.

As shown in Table 1, with the thermistor device of this working example 1, when the mole fractions (a+b=1) of $a(M1M2)O_3.bAl_2O_3$ lie in the ranges $0.05 \leq a < 1.0$ and $0 < b \leq 0.95$, the sensor has the required low resistance value of 50Ω to 100 kΩ and the temperature-resistance coefficient β exhibits the range 2000–4000K, so the resistance value and temperature-resistance coefficient can be controlled over a wide range. Therefore, the sensor is able to detect temperatures over the wide temperature range from room temperature to 1000° C.

In addition, from the results of the high-temperature endurance test (rate of change of resistance $\Delta R^1$) also, it was found that it is possible to provide a wide-range thermistor material that has stable characteristics where the change in the resistance value is small. Therefore, the thermistor device of this working example 1 achieves the object of the present invention.

Working Example 2

Figure 5:
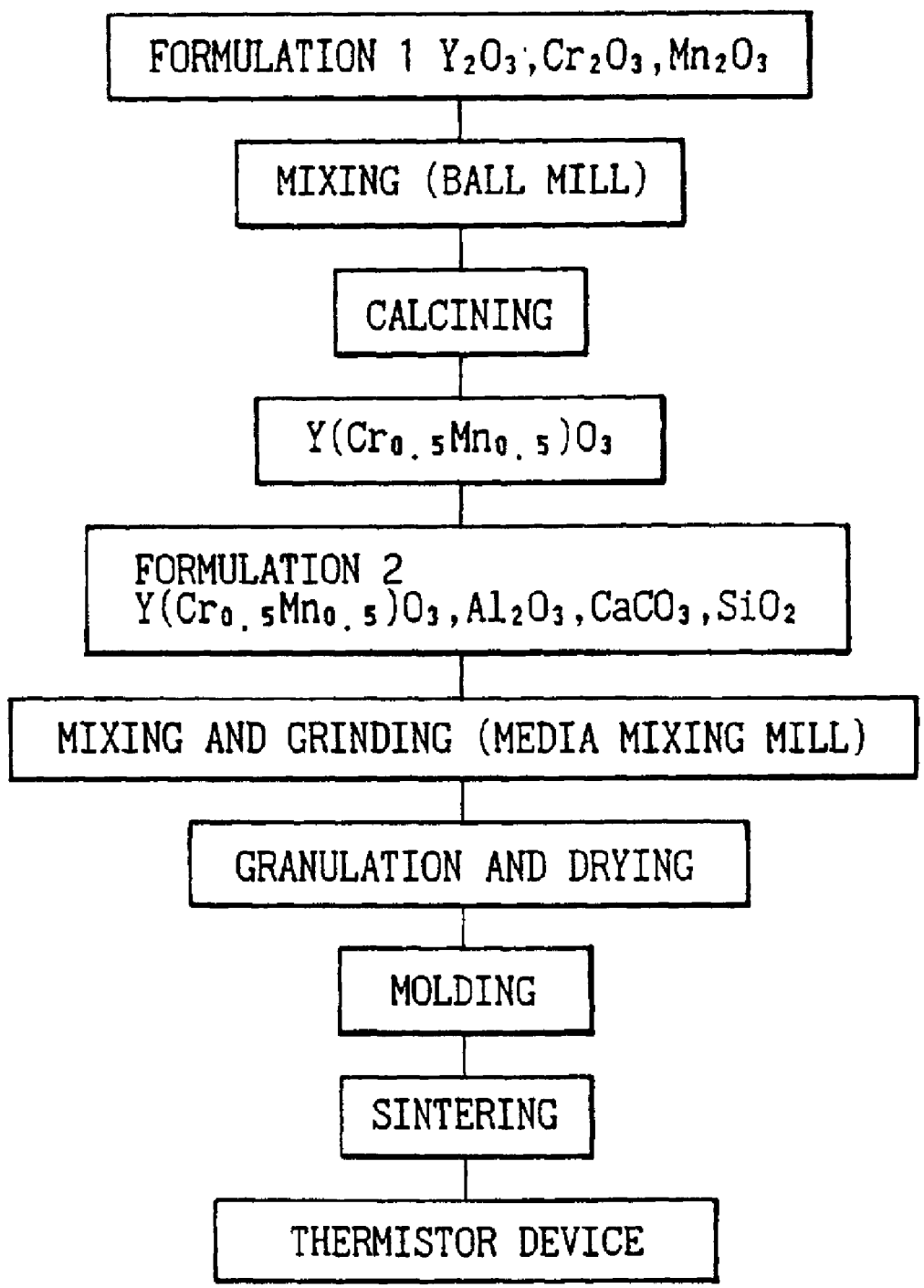
FIG. 5 is a diagram of the manufacturing process for the thermistor device of Working Example 2 of the present invention.

In working example 2, as the raw material used to obtain the mixed sintered body $Y(Cr_{0.5}Mn_{0.5})O_3.Al_2O_3$ (M1=Y, M2=Cr, Mn), first $Y(Cr_{0.5}Mn_{0.5})O_3$ is prepared. FIG. 5 shows the manufacturing process of the thermistor device of working example 2. This example is a manufacturing method based on the first manufacturing method described in the aforementioned Embodiment 2, but the grinding step in the second preparation step is performed in a media mixing mill instead of a ball mill.

As the starting materials of $Y_2O_3$, $Cr_2O_3$ and $Mn_2O_3$, materials with a high purity of 99.9% or greater are used for each. Note that the average grain sizes of the $Y_2O_3$, $Cr_2O_3$ and $Mn_2O_3$ are 1.0 μm, 2.0–4.0 μm and 7.0–15.0 μm, respectively. The average grain size of each of the raw materials are the same as in the aforementioned working example 1, and in working examples 3–8 and comparative examples 1 and 2 presented below.

In the first preparation step (in FIG. 5, from formulation 1 until $Y(Cr_{0.5}Mn_{0.5})O_3$), first the $Y(Cr_{0.5}Mn_{0.5})O_3$ is prepared by weighing out the $Y_2O_3$, $Cr_2O_3$ and $Mn_2O_3$ so that the molar ratio of Y:Cr:Mn: becomes 2:1:1 in a total weight of 500 g (formulation 1).

In order to mix the material thus weighed out, a ball mill is prepared by placing 2.5 kg of 15-mm diameter balls and 2.5 kg of 20-mm diameter balls made of $Al_2O_3$ or $ZrO_2$ in a plastic pot (5-liter capacity), 1500 cc of deionized water is added and then mixing is performed at 60 rpm for 4 hours (mixing step). Here, the slurry mixture after the mixing process was evaluated using a laser granulometer, and the results indicated that the average grain size was 1.7 μm (micrometer) (see Table 2). This is larger than the average grain size of 1.0 μm for the $Y_2O_3$ prior to mixing.

The slurry mixture of $Y_2O_3$, $Cr_2O_3$ and $Mn_2O_3$ obtained after the mixing process was transferred to a porcelain evaporating dish and dried for 12–17 hours at 100–150° C. using a hot-air dryer to obtained a solid mixture of $Y_2O_3$, $Cr_2O_3$ and $Mn_2O_3$. Next, this solid mixture was given a rough grinding in a mixing and grinding machine and passed through a #30 mesh sieve to obtain a powdered mixture of $Y_2O_3$, $Cr_2O_3$ and $Mn_2O_3$.

In the calcining step, this powdered mixture of $Y_2O_3$, $Cr_2O_3$ and $Mn_2O_3$ was placed in a crucible of 99.3% $Al_2O_3$ and calcined for 2 hours at 1100° C. in a high-temperature furnace in an atmospheric-pressure environment (in air) to obtain $Y(Cr_{0.5}Mn_{0.5})O_3$. The $Y(Cr_{0.5}Mn_{0.5})O_3$ that had become a clump-like solid in calcining was given a rough grinding in a mixing and grinding machine and passed through a #30 mesh sieve to obtain a powder.

The aforementioned $Y(Cr_{0.5}Mn_{0.5})O_3$ was used with $Al_2O_3$ as the materials for this thermistor.

In the second preparation step (in FIG. 5, from formulation 2 on), first, the powdered $Y(Cr_{0.5}Mn_{0.5})O_3$ (average grain size of 2–5 μm) and $Al_2O_3$ (average grain size of 0.6 μm) are weighed out to achieve the $Y(Cr_{0.5}Mn_{0.5})O_3:Al_2O_3$ formulation molar ratio of 40:60 in a total weight of 2000 g.

In addition, $SiO_2$ and $CaCO_3$, which assume the liquid phase in the temperature range of 1500–1650° C. during sintering, are used as sintering aids. $SiO_2$ is added in the amount of 3 wt. % and $CaCO_3$ in the amount of 4.5 wt. % of the entire weight (2000 g) of the aforementioned $Y(Cr_{0.5}Mn_{0.5})O_3$ and $Al_2O_3$ (formulation 2).

Therefore, the total weight of the $Y(Cr_{0.5}Mn_{0.5})O_3$, $Y_2O_3$, $SiO_2$ and $CaCO_3$ gives 2150 g of crushed raw materials.

Next, in the grinding step ("Mixing and grinding" in FIG. 5), in order to perform fine grinding of the thermistor raw materials, a pearl mill (manufactured by Ashizawa Co., Ltd., model RV1V, effective capacity: 1.0 liter, actual capacity:

0.5 liter) was used as the media mixing mill. The operating conditions for this pearl mill require the use of 3.0 kg of zirconia balls 0.5 mm in diameter as the grinding media, and that 80% of the volume of the mixing chamber be filled with zirconia balls.

The operating conditions are set to a peripheral speed of 12 m/sec and a rotation speed of 3110 rpm. Note that 4.5 liters of distilled water were used as the dispersion agent for the 2150 g of raw material to be ground, and the binder and dispersion agent were added simultaneously and then mixing and grinding were performed for 10 hours. A binder of polyvinyl alcohol (PVA) was added in the amount of 1 g per 100 g of the raw material to be ground.

The raw material slurry after the mixing process was evaluated using a laser granulometer, and the results indicated that the average grain size was 0.4 µm (see Table 2). This is smaller than the average grain size of the $Al_2O_3$ prior to mixing, which was 0.6 µm.

The raw material slurry thus obtained was granulated and dried in a spray dryer under conditions of a drying chamber inlet temperature of 200° C. and an outlet temperature of 120° C. The granules of thermistor materials thus obtained were spherical with an average grain size of 30 µm, and these granules were used to mold the thermistor device.

The molding step was performed by a mold molding method, wherein lead wires of Pt 100 with dimensions (outside diameter×length) of 0.3 mm×10.5 mm were inserted into a male mold, and the granules were placed in a female mold with an inside diameter of 1.74 mm and molding was performed at a pressure of approximately 1000 kgf/cm² to obtain a molded thermistor device with lead wire attached. In the sintering step, this molded thermistor device was placed on a corrugated setter made of $Al_2O_3$ and sintered for 1–2 hours at 1500–1600° C. to obtain a thermistor device.

The thermistor device thus obtained and a temperature sensor that incorporates this thermistor device have the same structure as those shown in FIGS. 1–3. Moreover, in the aforementioned second preparation step, the materials are also weighed out to give a $Y(Cr_{0.5}Mn_{0.5})O_3:Al_2O_3$ formulation molar ratio of 95:5 and 5:95, and thermistor devices are fabricated thereafter by the same procedure and assembled into temperature sensors.

Here, the individual devices of this working example 1 in which the $Y(Cr_{0.5}Mn_{0.5})O_3:Al_2O_3$ formulation molar ratio a:b is 40:60, 95:5 and 5:95 are called device number 4, device number 5 and device number 6, respectively. Table 1 shows the results of evaluation of the resistance-temperature characteristics of the temperature sensors with the thermistor devices of device numbers 4–6. Thus, this working example 2 can also provide thermistor devices that have the same meritorious effects of those of working example 1 with respect to the resistance value-temperature characteristics of the thermistor device.

In addition, the thermistor devices of this working example 2 were subjected to evaluation of the temperature accuracy by the method described in Embodiment 2 above. Here, Table 2 shows the temperature accuracy (±A° C.) found by means of the method described in Embodiment 2 above for the thermistor devices of working examples 1–8 (a:b=40:60).

Note that in Table 2, Y(CrMn)O₃ indicates $Y(Cr_{0.5}Mn_{0.5})O_3$. In addition, in Table 2, the raw material composition at the time of grinding indicates the raw material composition in the grinding step of the second preparation step (in this example, $Y(Cr_{0.5}Mn_{0.5})O_3$ and $Y_2O_3$). In addition, the average grain size after mixing (µm) indicates the average grain size in the slurry mixture after the mixing process in the mixing step of the first preparation step (in this example, the 1.7 µm given above). The average grain size after grinding (µm) indicates the average grain size in the raw material slurry after grinding in the grinding step of the second preparation step (in this example, the 0.4 µm given above). The same applies to working example 1 and working examples 3–8.

The thermistor device of device number 4 (a:b=40:60) of this working example 2 exhibited a temperature accuracy of ±10° C., which was an excellent value compared to that (±23° C.) of the thermistor device of device number 1 (a:b=40:60) of working example 1 prepared by the conventional method.

Working Example 3

Figure 6:
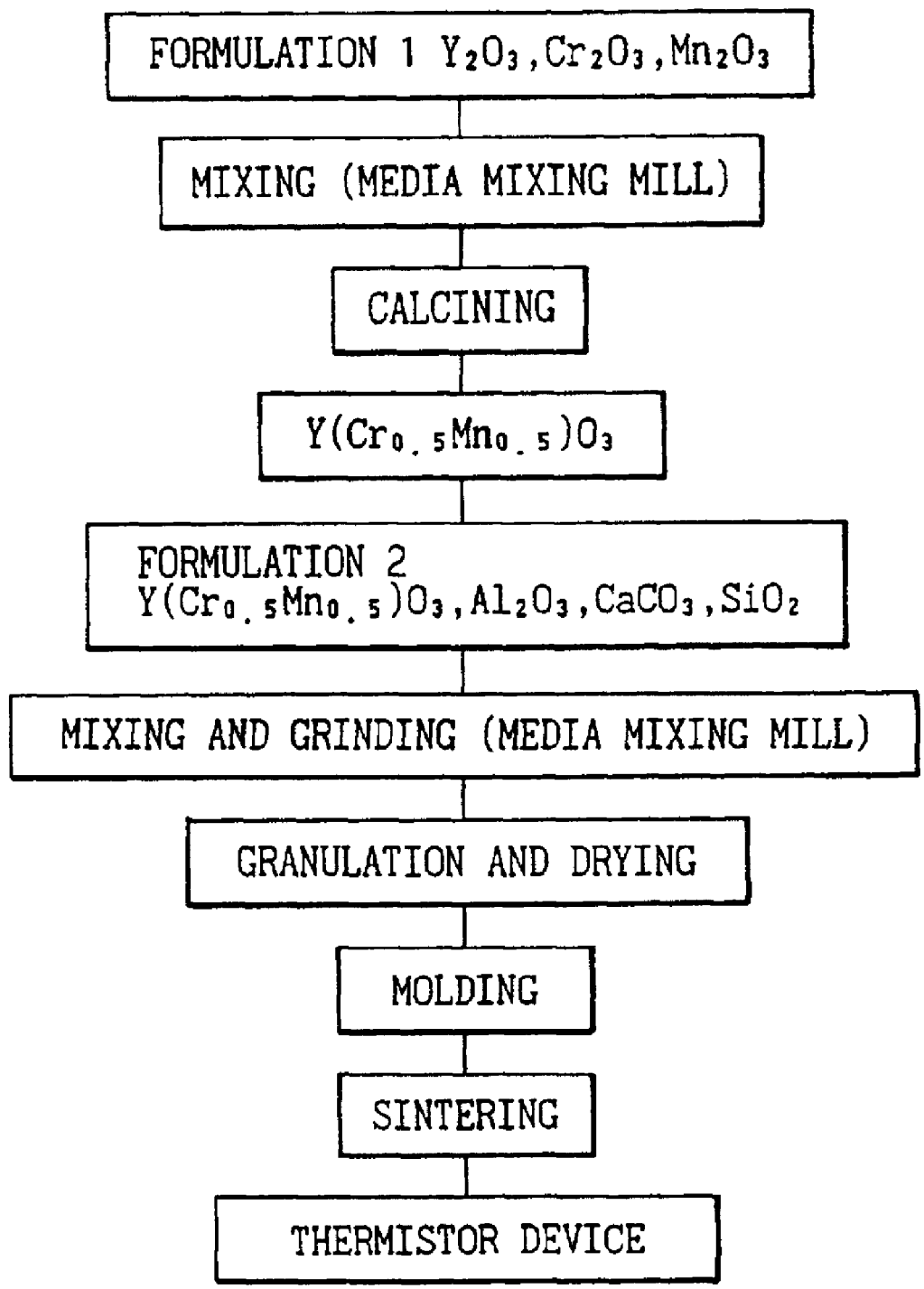
FIG. 6 is a diagram of the manufacturing process for the thermistor device of Working Example 3 of the present invention.

In working example 3, the raw materials $Y_2O_3$, $Cr_2O_3$, $Mn_2O_3$ and $CaCO_3$ are used to obtain the mixed sintered body $Y(Cr_{0.5}Mn_{0.5})O_3 \cdot Al_2O_3$ (M1=Y, M2=Cr, Mn). FIG. 6 shows the manufacturing process of the thermistor device of working example 3.

This working example is a combination of the first manufacturing method and the second manufacturing method described in the aforementioned Embodiments 2 and 3. In this example, a media mixing mill is used for both the mixing step of the first preparation step (in FIG. 6, from formulation 1 to $Y(Cr_{0.5}Mn_{0.5})O_3 \cdot Al_2O_3$) and the grinding step of the second preparation step (in FIG. 6, from formulation 2 on).

First, the materials of $Y_2O_3$, $Cr_2O_3$, $Mn_2O_3$ and $CaCO_3$, each of which with a purity of 99.9% or greater, are prepared. In formulation 1, these ingredients are weighed out in order to obtain the desired resistance value and resistance-temperature coefficient in the thermistor device.

In the same manner as in working example 1 above, the $Y_2O_3$, $Cr_2O_3$, $Mn_2O_3$ and $CaCO_3$ are weighed out so that the molar ratio of Y:Cr:Mn: becomes 2:1:1 in a total weight of 2000 g (formulation 1).

Next, a media mixing mill is used in the mixing step to grind the raw material finely. The media mixing mill used in this working example is the same pearl mill as in the aforementioned working example 2, and the mixing conditions are also the same.

The operating conditions are set to a peripheral speed of 12 m/sec and a rotation speed of 3110 rpm. Note that 4.5 liters of distilled water were used as the dispersion agent for the 2036 g of raw material to be ground, and the binder and dispersion agent were added simultaneously and then mixing and grinding were performed for 10 hours. A binder of polyvinyl alcohol (PVA) was added in the amount of 20 g per 2036 g of the raw material to be ground.

The raw material slurry after the mixing process was evaluated using a laser granulometer, and the results indicated that the average grain size was 0.3 µm (see Table 2). This is smaller than the average grain size of the $Y_2O_3$ prior to mixing (1.0 µm) and it is also smaller than 0.5 µm.

The raw material slurry thus obtained was granulated and dried in a spray dryer under conditions of a drying chamber inlet temperature of 200° C. and an outlet temperature of 120° C. The granules of thermistor materials thus obtained were spherical with an average grain size of 30 µm, and these powdered raw materials were placed in a crucible of 99.3% $Al_2O_3$ and calcined for 1–2 hours at 1100–1300° C. in a high-temperature furnace in air to obtain $Y(Cr_{0.5}Mn_{0.5})O_3$ (calcining step).

The Y($Cr_{0.5}Mn_{0.5}$)$O_3$ that had become a clump-like solid in calcining was given a rough grinding in a mixing and grinding machine and passed through a #30 mesh sieve to obtain a powder of Y($Cr_{0.5}Mn_{0.5}$)$O_3$.

Next, in the same manner as in working example 1, in formulation 2, the aforementioned powdered Y($Cr_{0.5}Mn_{0.5}$)$O_3$ and $Al_2O_3$ (average grain size of 0.6 μm) are prepared. The formulation molar ratio of Y($Cr_{0.5}Mn_{0.5}$)$O_3$ and $Al_2O_3$ was set to 40:60 and the total weight was 2000 g.

In the same manner as in the mixing step above, a pearl mill is also used in the grinding step. Moreover, to the precursors prepared in formulation 2 are added a dispersing agent, binder and mold release agent, and the mixture is mixed, ground and granulated. The grinding conditions for this pearl mill are set to the same as in the mixing step above.

The raw material slurry of thermistor materials thus ground was evaluated using a laser granulometer, and the results indicated that the average grain size was 0.3 μm (see Table 2). This is smaller than the average grain size of the $Al_2O_3$ prior to compounding in formulation 1, which was 0.6 μm.

The slurry of Y($Cr_{0.5}Mn_{0.5}$)$O_3$·$Al_2O_3$ thus obtained after grinding was granulated in a spray dryer under the same conditions given in the drying step above to obtain granules of Y($Cr_{0.5}Mn_{0.5}$)$O_3$·$Al_2O_3$. These granules were used to mold the thermistor device.

The molding step was performed by a mold molding method, wherein lead wires of Pt 100 with dimensions (outside diameter×length) of 0.3 mm×10.5 mm were inserted into a male mold, the granules were placed in a female mold with an inside diameter of 1.89 mm and molding was performed at a pressure of approximately 1000 kgf/cm$^2$ to obtain a molded thermistor device with lead wires attached.

This molded thermistor device was placed on a corrugated setter made of $Al_2O_3$ and sintered for 1–2 hours at 1400–1600° C. to obtain a thermistor device with an outside diameter of 1.60 mm (mixed sintered body).

This thermistor device was assembled into a temperature sensor assembly to form a temperature sensor. The thermistor device and temperature sensor have the same structure as those shown in FIGS. 1–3.

Moreover, the materials are also weighed out to give a Y($Cr_{0.5}Mn_{0.5}$)$O_3$:$Al_2O_3$ formulation molar ratio (a:b) in formulation 2 of 95:5 and 5:95, and thermistor devices are fabricated thereafter by the same procedure and assembled into temperature sensors. The individual devices of this working example 3 in which the aforementioned formulation molar ratio a:b is 40:60, 95:5 and 5:95 are called device number 7, device number 8 and device number 9, respectively. Table 1 shows the results of evaluation of the resistance value-temperature characteristics of these units. Thus, this working example 3 can also provide thermistor devices that have the same meritorious effects of those of working example 1 with respect to the resistance value-temperature characteristics of the thermistor device.

In addition, Table 2 shows the results of evaluating the temperature accuracy found by means of the method described in Embodiment 2 above for the thermistor device of device number 7 of this working example 3 (a:b=40:60). A thermistor device according to this working example exhibited a temperature accuracy of ±5° C., which was an excellent value compared to that (±23° C.) of working example 1 prepared by the conventional method and that (±10° C.) according to working example 2 above.

Working Example 4

Figure 7:
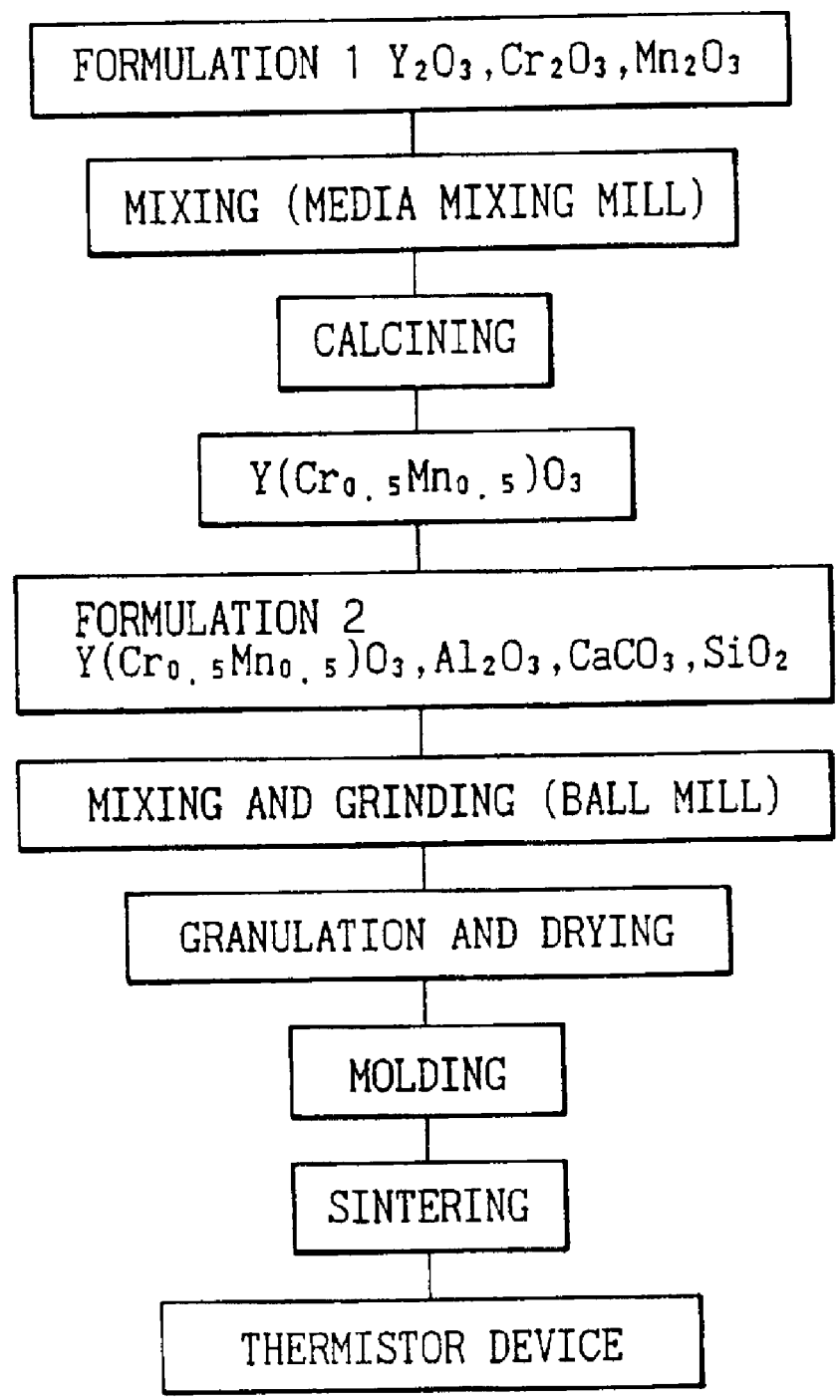
FIG. 7 is a diagram of the manufacturing process for the thermistor device of Working Example 4 of the present invention.

In working example 4, the materials Y($Cr_{0.5}Mn_{0.5}$)$O_3$ and $Al_2O_3$ are used to obtain the mixed sintered body Y($Cr_{0.5}Mn_{0.5}$)$O_3$·$Al_2O_3$ (M1=Y, M2=Cr, Mn). FIG. 7 shows the manufacturing process of the thermistor device of working example 4.

This working example is an example of the second manufacturing method described in the aforementioned Embodiment 3. In this example, a media mixing mill is used for the mixing step of the first preparation step (in FIG. 7, from formulation 1 to Y($Cr_{0.5}Mn_{0.5}$)$O_3$), while a ball mill is used for the grinding step of the second preparation step (in FIG. 7, from formulation 2 on). To wit, a ball mill is used instead of a media mixing mill in the grinding step of working example 3 above.

The first preparation step of this working example is identical to that of working example 3 above, so its explanation is omitted. Note that in working example 4 also, the raw material slurry after the mixing and grinding process in the mixing step was evaluated using a laser granulometer, and the results indicated that the average grain size was 0.3 μm (see Table 2).

Moreover, from the first preparation step, calcined powder of Y($Cr_{0.5}Mn_{0.5}$)$O_3$ was obtained.

In formulation 2, this Y($Cr_{0.5}Mn_{0.5}$)$O_3$ (powder) and $Al_2O_3$ (average grain size of 0.6 μm) were weighed out such that the a and b of aY($Cr_{0.5}Mn_{0.5}$)$O_3$·b$Al_2O_3$ become 40:60 and the total weight was 2000 g.

Next, in the grinding step, in order to mix and grind the Y($Cr_{0.5}Mn_{0.5}$)$O_3$ and $Al_2O_3$ weighed out in formulation 2, a ball mill is used. The grinding conditions are as follows: 10 kg of 15-mm diameter balls and 10 kg of 20-mm diameter balls made of $Al_2O_3$ are placed in a plastic pot (20-liter capacity), 2000 g of the aforementioned weighed-out mixture and 6000 cc of deionized water are added and then mixing and grinding are performed at 60 rpm for 6 hours.

The raw material slurry after the grinding process was evaluated using a laser granulometer, and the results indicated that the average grain size was 1.6 μm (see Table 2). This is larger than the average grain size of the $Al_2O_3$ prior to compounding in formulation 2, which was 0.6 μm. Moreover, a dispersing agent, binder and mold release agent are added in the grinding step and these are also ground together.

The slurry of Y($Cr_{0.5}Mn_{0.5}$)$O_3$·$Al_2O_3$ thus obtained after grinding was granulated, molded and sintered in the same manner as in working example 2 to obtain a thermistor device. This thermistor device was assembled into a temperature sensor assembly in the same manner as in working example 2 to form a temperature sensor. The thermistor device and temperature sensor have the same structure as those shown in FIGS. 1–3.

Moreover, the materials are also weighed out to give a Y($Cr_{0.5}Mn_{0.5}$)$O_3$:$Al_2O_3$ formulation molar ratio (a:b) in formulation 2 of 95:5 and 5:95, and thermistor devices are fabricated thereafter by the same procedure and assembled into temperature sensors. The individual devices of this working example 4 in which the aforementioned formulation molar ratio a:b is 40:60, 95:5 and 5:95 are called device number 10, device number 11 and device number 12, respectively. Table 1 shows the results of evaluation of the resistance value-temperature characteristics of these units. Thus, this working example 4 can also provide thermistor devices that have the same meritorious effects of those of working example 1 with respect to the resistance value-temperature characteristics of the thermistor device.

In addition, Table 2 shows the results of evaluating the temperature accuracy found by means of the method described in Embodiment 2 above for the thermistor device of device number 10 of this working example 4 (a:b=40:60). A thermistor device according to this working example exhibited a temperature accuracy of ±9° C., which was an excellent value compared to that (±23° C.) of working example 1 prepared by the conventional method.

TABLE 1

| Device number | Raw material composition (mole %) | | Resistance value (kΩ) | | Resistance-temperature coefficient | Resistance rate of change |
|---|---|---|---|---|---|---|
| | $Y(Cr_{0.5}Mn_{0.5})O_3$ | $Al_2O_3$ | Room temperature (27° C.) | 1000° C. | β (K) | $\Delta R^1$ (%) |
| 1, 4, 7, 10 | 40 | 60 | 50 | 0.07 | 2580 | −5.0 |
| 2, 5, 8, 11 | 95 | 5 | 30 | 0.05 | 2510 | −5.0 |
| 3, 6, 9, 12 | 5 | 95 | 100 | 0.1 | 2710 | −5.0 |

TABLE 2

| | Raw material composition at the time of grinding | Average grain size after mixing (μm) | Average grain size after grinding (μm) | Temperature accuracy (° C.) |
|---|---|---|---|---|
| Working example 1 | $Y(CrMn)O_3$, $Al_2O_3$ | 1.7 | 2.5 | ±23 |
| Working example 2 | $Y(CrMn)O_3$, $Al_2O_3$ | 1.7 | 0.4 | ±10 |
| Working example 3 | $Y(CrMn)O_3$, $Al_2O_3$ | 0.3 | 0.3 | ±5 |
| Working example 4 | $Y(CrMn)O_3$, $Al_2O_3$ | 0.3 | 1.6 | ±9 |
| Working example 5 | $Y(CrMn)O_3$, $Al_2O_3$, $Y_2O_3$ | 1.7 | 2.3 | ±22 |
| Working example 6 | $Y(CrMn)O_3$, $Al_2O_3$, $Y_2O_3$ | 1.7 | 0.3 | ±9 |
| Working example 7 | $Y(CrMn)O_3$, $Al_2O_3$, $Y_2O_3$ | 0.3 | 0.3 | ±5 |
| Working example 8 | $Y(CrMn)O_3$, $Al_2O_3$, $Y_2O_3$ | 0.3 | 1.5 | ±9 |

Comparative Example 1

As comparative example 1, we shall describe a temperature sensor that uses a thermistor device having the composition of $Y(Cr_{0.5}Mn_{0.5})O_3$ alone without using the $Al_2O_3$ or $(Y_2O_3+Al_2O_3)$ which stabilize the resistance value.

$Y(Cr_{0.5}Mn_{0.5})O_3$ is obtained by the same manufacturing method as in working example 1 above. Table 3 shows the results of evaluation of a temperature sensor fabricated using the $Y(Cr_{0.5}Mn_{0.5})O_3$ thus prepared as the raw materials. The method of evaluating the resistance value characteristics is the same as in working example 1.

As is clear from Table 3, in the case that the $Al_2O_3$ which stabilizes the resistance value is not used, the resistance value in the high-temperature region of 1000° C. (40Ω) is too low, so the temperature cannot be detected. In addition, from the results of the high-temperature endurance test (rate of change of resistance), the rate of change of resistance $\Delta R^1$ exceeded ±20%, so it is not possible to provide a thermistor device that has a stable resistance value-temperature characteristic.

Therefore, a thermistor device having the composition of $Y(Cr_{0.5}Mn_{0.5})O_3$ alone cannot be used as a device for the temperature sensor, which is the object of the present invention.

Comparative Example 2

As comparative example 2, we shall describe a temperature sensor that uses a thermistor device having the composition of $YTiO_3$ alone without using the $Al_2O_3$ or $(Y_2O_3+Al_2O_3)$ which stabilize the resistance value. Table 3 shows the results of evaluation of this temperature sensor. The method of evaluating the resistance value characteristics is the same as in working example 1.

As is clear from Table 3, in the case of a thermistor device having the composition of $YTiO_3$ alone, the resistance value in the low-temperature region of room temperature (27° C.) is markedly high at greater than 1000 kΩ, so the temperature cannot be detected. In addition, from the results of the high-temperature endurance test, the rate of change of resistance $\Delta R^1$ exceeded ±20%, so it is not possible to provide a thermistor device that has a stable resistance value-temperature characteristic.

TABLE 3

| Composition of device portion | Resistance value (kΩ) | | Resistance-temperature coefficient β (K) | Resistance rate of change $\Delta R^1$ (%) | |
|---|---|---|---|---|---|
| | Room temperature (27° C.) | 1000° C. | | | |
| $Y(Cr_{0.5}Mn_{0.5})O_3$ | 10 | 0.04 | 2170 | −20.0 | Comparative example 1 |
| $YTiO_3$ | >1000 | 0.2 | 12200 | −40.0 | Comparative example 2 |

Therefore, a thermistor device having the composition of $YTiO_3$ alone cannot be used as a device for the temperature sensor that is the object of the present invention.

In passing, upon comparing working examples 1–4 above, all of the thermistor devices exhibited good resistance value-temperature characteristics, which is the object of the present invention. However, regarding the temperature accuracy of the sensor, working examples 2–4, or namely the manufacturing methods presented in Embodiments 2 and 3 above, can be said to be superior to the conventional manufacturing methods.

To wit, in the manufacturing methods taught in working examples 2–4, excellent resistance value-temperature characteristics were achieved through the uniform mixing of the composition by means of finely grinding the thermistor materials, so by reducing the fluctuation in the composition of the mixed sintered body (M1M2)$O_3$.$Al_2O_3$, the dispersion in the resistance value from sensor to sensor can be reduced.

While working examples 1–4 above provide a mixed sintered body of Y($Cr_{0.5}Mn_{0.5}$)$O_3$.$Al_2O_3$, the following working examples 5–8 provide a mixed sintered body of Y($Cr_{0.5}Mn_{0.5}$)$O_3$.$Y_2O_3$.$Al_2O_3$. Note that regarding the application of a ball mill or media mixing mill in the mixing step and grinding step, working examples 5, 6, 7 and 8 correspond to working examples 1, 2, 3 and 4, respectively.

Working Example 5

Figure 8:
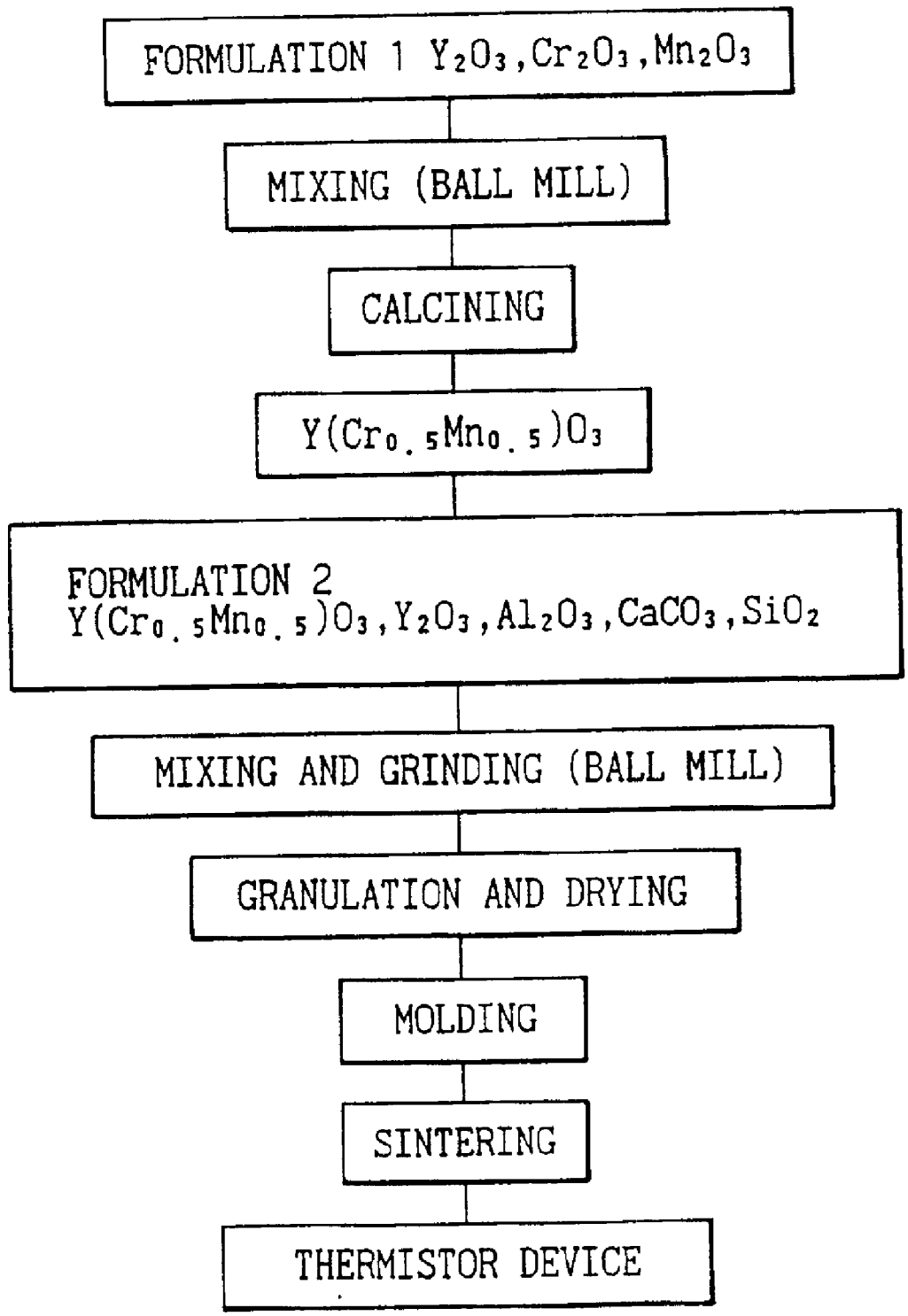
FIG. 8 is a diagram of the manufacturing process for the thermistor device of Working Example 5 of the present invention.

FIG. 8 shows the manufacturing process of the thermistor device of this working example 5. In the same manner as in working example 1, the first preparation step is performed (in FIG. 8, from formulation 1 until Y($Cr_{0.5}Mn_{0.5}$)$O_3$) to obtain a powder of Y($Cr_{0.5}Mn_{0.5}$)$O_3$, then $Y_2O_3$ and $Al_2O_3$ are also added and then the second preparation step is performed (in FIG. 8, from the formulation 2 on). A ball mill is used in both the mixing step and the grinding step.

In formulation 2, in order for the thermistor device to have the desired resistance value and resistance-temperature coefficient, the Y($Cr_{0.5}Mn_{0.5}$)$O_3$, $Al_2O_3$ and $Y_2O_3$ are weighed out such that the a and b of aY($Cr_{0.5}Mn_{0.5}$)$O_3$.b($Al_2O_3$+$Y_2O_3$) have the relationship a:b=40:60, while the ratio of $Al_2O_3$:$Y_2O_3$ becomes 50:10 and the total weight is 2000 g.

The Y($Cr_{0.5}Mn_{0.5}$)$O_3$, $Al_2O_3$ and $Y_2O_3$ thus weighed out are subjected to grinding in the same manner as in working example 1 (grinding step), the resulting raw material slurry was evaluated using a laser granulometer, and the results indicated that the average grain size was 2.3 μm (see Table 2). This is larger than the average grain size of 1 μm of the $Y_2O_3$ and also larger than the average grain size of 0.6 μm of the $Al_2O_3$ prior to grinding.

The ground slurry mixture of Y($Cr_{0.5}Mn_{0.5}$)$O_3$, $Al_2O_3$ and $Y_2O_3$ obtained after grinding was granulated in a spray dryer to obtain a powdered mixture of Y($Cr_{0.5}Mn_{0.5}$)$O_3$, $Al_2O_3$ and $Y_2O_3$.

Next, in the molding step, this thermistor raw material was used and lead wires of Pt 100 with dimensions (outside diameter×length) of 0.3 mm×10.5 mm were inserted into a male mold, the granules were placed in a female mold with an inside diameter of 1.89 mm and molding was performed at a pressure of approximately 1000 kgf/cm$^2$ to obtain a molded thermistor device with an outside diameter of 1.89 mm with lead wires attached.

Moreover, in the sintering step, this molded thermistor device was placed on a corrugated setter made of $Al_2O_3$ and sintered for 1–2 hours at 1400–1600° C. in air to obtain a thermistor device with an outside diameter of 1.60 mm. This thermistor device was assembled into a temperature sensor assembly in the same manner as in working example 1 to form a temperature sensor. The thermistor device and temperature sensor thus fabricated have the same structure as those shown in FIGS. 1–3.

Moreover, in the aforementioned second preparation step, the materials are also weighed out to give a aY($Cr_{0.5}Mn_{0.5}$)$O_3$.b($Al_2O_3$+$Y_2O_3$) formulation molar ratio of a:b where a:b=95:5 and 5:95 (here, the ratio of $Al_2O_3$:$Y_2O_3$ is 50:10), and thermistor devices are fabricated thereafter by the same procedure and assembled into temperature sensors. The individual devices of this working example in which the aforementioned formulation molar ratio a:b is 40:60, 95:5 and 5:95 are called device number 13, device number 14 and device number 15, respectively.

Temperature sensors assembled with devices numbered 13–15 were subjected to evaluation of the resistance value-temperature characteristic in the same manner as in working example 1. Table 4 shows the results of evaluation.

Here, Table 4 also shows the results of evaluation of the resistance value-temperature characteristics of the thermistor devices of working examples 6–8 presented below. If we may present the conclusions first, even though working examples 5–8 have the same mixed sintered body manufactured by different manufacturing methods, as is evident from Table 4, similar resistance value-temperature characteristics are obtained for each formulation molar ratio a:b.

As shown in Table 4, with the thermistor device of this working example 5, when the mole fractions (a+b=1) of aY($Cr_{0.5}Mn_{0.5}$)$O_3$.b($Al_2O_3$+$Y_2O_3$) lie in the ranges $0.05 \leq a < 1.0$ and $0 < b \leq 0.95$, the sensor has the required low resistance value of 50Ω to 100 kΩ and the temperature-resistance coefficient β exhibits the range 2000–4000K, so and therefore, the sensor is able to detect temperatures over the wide temperature range from room temperature to 1000° C.

In addition, from the results of the high-temperature endurance test (rate of change of resistance $\Delta R^1$) also, it was found that it is possible to provide a thermistor material that has stable characteristics where the change in the resistance value is small. Therefore, the thermistor device of this example achieves the object of the present invention.

In addition, the thermistor device of device number 13 (a:b=40:60) of this working example 5 exhibited a temperature accuracy of ±22° C. (see Table 2).

Working Example 6

Figure 9:
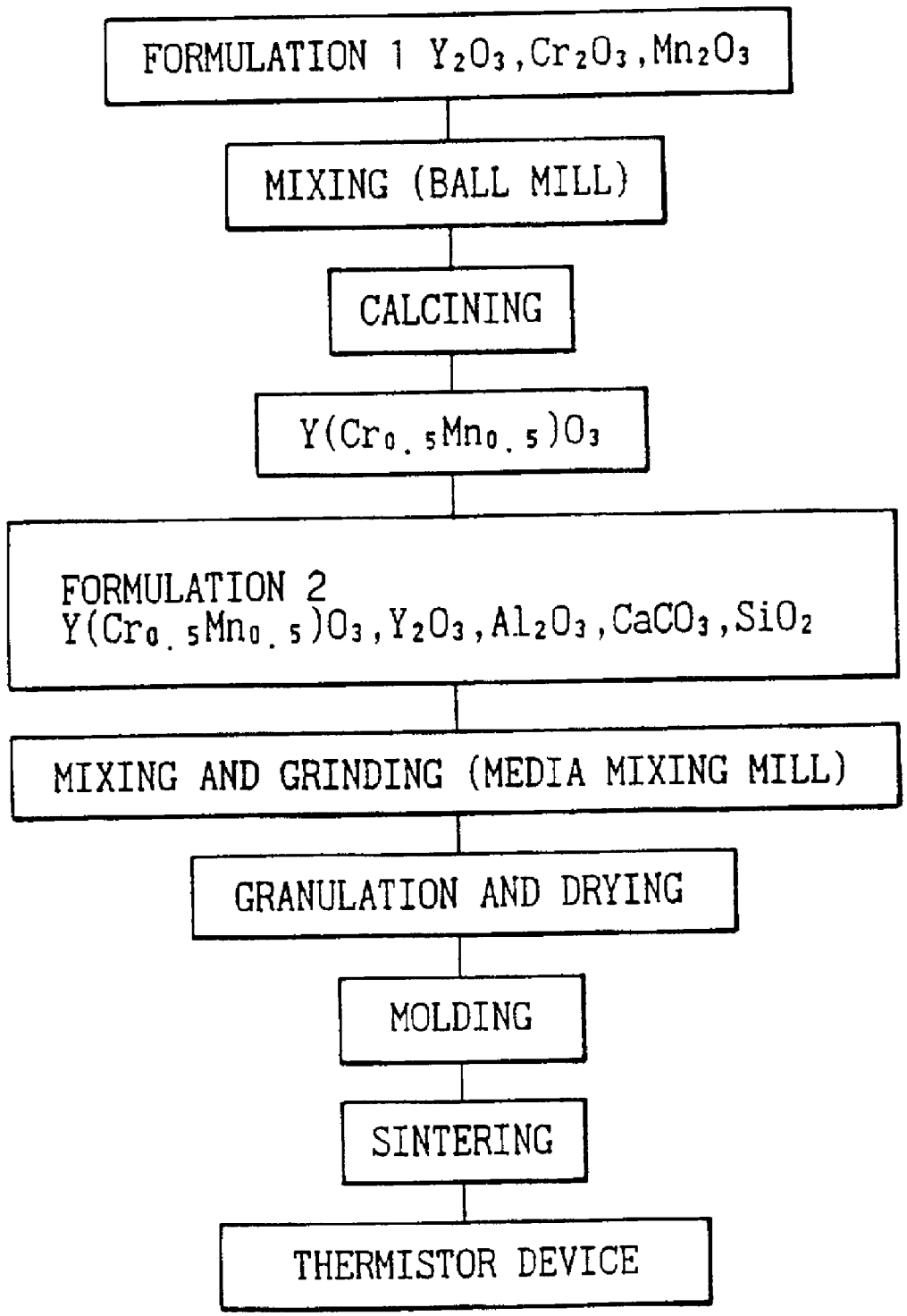
FIG. 9 is a diagram of the manufacturing process for the thermistor device of Working Example 6 of the present invention.

FIG. 9 shows the manufacturing process of the thermistor device of this working example 6. In the same manner as in working example 2, a powder of Y($Cr_{0.5}Mn_{0.5}$)$O_3$ is obtained, then $Y_2O_3$ and $Al_2O_3$ are also added and then the second preparation step is performed (in FIG. 9, from the formulation 2 on) using a medium mixing mill.

In formulation 2, in order for the thermistor device to have the desired resistance value and resistance-temperature coefficient, the Y($Cr_{0.5}Mn_{0.5}$)$O_3$, $Al_2O_3$ and $Y_2O_3$ are weighed out such that the a and b of aY($Cr_{0.5}Mn_{0.5}$)$O_3$.b($Al_2O_3$+$Y_2O_3$) have the relationship a:b=40:60 (here, the ratio of $Al_2O_3$:$Y_2O_3$ is 50:10) and the total weight is 2000 g.

The Y($Cr_{0.5}Mn_{0.5}$)$O_3$, $Al_2O_3$ and $Y_2O_3$ thus weighed out are subjected to grinding in the same manner as in working example 1 (grinding step), the resulting raw material slurry was evaluated using a laser granulometer, and the results indicated that the average grain size was 0.3 μm (see Table 2). This is smaller than the average grain size of 1 μm of the $Y_2O_3$ and also smaller than the average grain size of 0.6 μm of the $Al_2O_3$ prior to grinding.

The ground slurry mixture of Y($Cr_{0.5}Mn_{0.5}$)$O_3$, $Al_2O_3$ and $Y_2O_3$ obtained after grinding was treated in the same manner as in working example 5 above to obtain a mixture of powder granules.

Next, in the molding step, this mixture of powder granules was used and the molding process and sintering process were performed in the same manner as in working example 5 above to obtain a thermistor device with an outside diameter of 1.60 mm. This thermistor device was assembled into a temperature sensor assembly in the same manner as in working example 1 to form a temperature sensor. The thermistor device and temperature sensor thus fabricated have the same structure as those shown in FIGS. 1–3.

Moreover, in the aforementioned second preparation step, the materials are also weighed out to give a aY($Cr_{0.5}Mn_{0.5}$)$O_3$.b($Al_2O_3$+$Y_2O_3$) formulation molar ratio of a:b where a:b=95:5 and 5:95 (here, the ratio of $Al_2O_3$:$Y_2O_3$ is 50:10), and thermistor devices are fabricated thereafter by the same procedure and assembled into temperature sensors. The individual devices of this working example in which the aforementioned formulation molar ratio a:b is 40:60, 95:5 and 5:95 are called device number 16, device number 17 and device number 18, respectively.

Temperature sensors assembled with devices numbered 16–18 were subjected to evaluation of the resistance value-temperature characteristic in the same manner as in working example 1. Table 4 shows the results of evaluation. The thermistor device of this working example 6 also is able to provide a thermistor device that has meritorious effects similar to those of working example 5 with respect to the resistance value-temperature characteristics.

In addition, the thermistor device of device number 16 (a:b=40:60) of this working example 6 exhibited a temperature accuracy of ±9° C. (see Table 2), which was an excellent value compared to that (±22° C.) of working example 5 prepared by the conventional method.

Working Example 7

Figure 10:
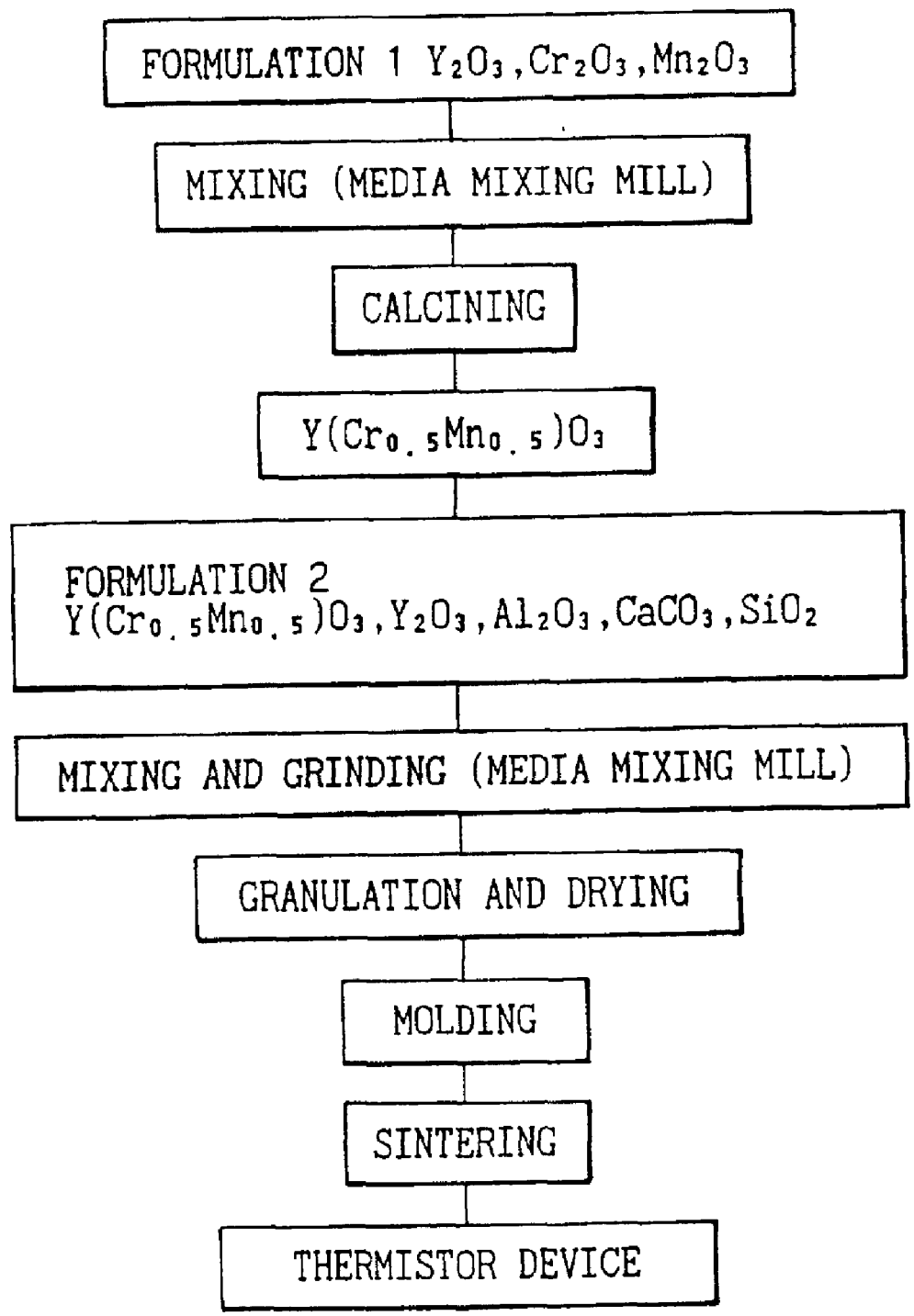
FIG. 10 is a diagram of the manufacturing process for the thermistor device of Working Example 7 of the present invention.

FIG. 10 shows the manufacturing process of the thermistor device of this working example 7. In the same manner as in working example 3, a powder of Y($Cr_{0.5}Mn_{0.5}$)$O_3$ is obtained using a media mixing mill in the first preparation step (in FIG. 10, from formulation 1 until Y($Cr_{0.5}Mn_{0.5}$)$O_3$), then $Y_2O_3$ and $Al_2O_3$ are also added and then the second preparation step is performed (in FIG. 10, from the formulation 2 on) using a medium mixing mill.

In formulation 2, in order for the thermistor device to have the desired resistance value and resistance-temperature coefficient, the Y($Cr_{0.5}Mn_{0.5}$)$O_3$, $Al_2O_3$ and $Y_2O_3$ are weighed out such that the a and b of aY($Cr_{0.5}Mn_{0.5}$)$O_3$.b($Al_2O_3$+$Y_2O_3$) have the relationship a:b=40:60 (here, the ratio of $Al_2O_3$:$Y_2O_3$ is 50:10) and the total weight is 2000 g.

The Y($Cr_{0.5}Mn_{0.5}$)$O_3$, $Al_2O_3$ and $Y_2O_3$ thus weighed out are subjected to grinding in the same manner as in working example 3 (grinding step), the resulting raw material slurry was evaluated using a laser granulometer, and the results indicated that the average grain size was 0.3 μm (see Table 2). This is smaller than the average grain size of 1 μm of the $Y_2O_3$ and also smaller than the average grain size of 0.6 μm of the $Al_2O_3$ prior to mixing.

The ground slurry mixture of Y($Cr_{0.5}Mn_{0.5}$)$O_3$, $Al_2O_3$ and $Y_2O_3$ obtained after grinding was treated in the same manner as in working example 5 above to obtain a mixture of powder granules.

Next, in the molding step, this mixture of powder granules was used and the molding process and sintering process were performed in the same manner as in working example 5 above to obtain a thermistor device with an outside diameter of 1.60 mm. This thermistor device was assembled into a temperature sensor assembly in the same manner as in working example 1 to form a temperature sensor. The thermistor device and temperature sensor thus fabricated have the same structure as those shown in FIGS. 1–3.

Moreover, in the aforementioned second preparation step, the materials are also weighed out to give a aY($Cr_{0.5}Mn_{0.5}$)$O_3$.b($Al_2O_3$+$Y_2O_3$) formulation molar ratio of a:b where a:b=95:5 and 5:95 (here, the ratio of $Al_2O_3$:$Y_2O_3$ is 50:10), and thermistor devices are fabricated thereafter by the same procedure and assembled into temperature sensors. The individual devices of this working example in which the aforementioned formulation molar ratio a:b is 40:60, 95:5 and 5:95 are called device number 19, device number 20 and device number 21, respectively.

Temperature sensors assembled with devices numbered 19–21 were subjected to evaluation of the resistance value-temperature characteristic in the same manner as in working example 1. Table 4 shows the results of evaluation. The thermistor device of this working example 7 also is able to provide a thermistor device that has meritorious effects similar to those of working example 5 with respect to the resistance value-temperature characteristics.

In addition, the thermistor device of device number 16 (a:b=40:60) of this working example 6 exhibited a temperature accuracy of ±5° C. (see Table 2), which was an excellent value compared to that (±22° C.) of working example 5 prepared by the conventional method.

Working Example 8

FIG. 11 shows the manufacturing process of the thermistor device of this working example 8. In the same manner as in working example 4, a powder of Y($Cr_{0.5}Mn_{0.5}$)$O_3$ is obtained in the first preparation step (in FIG. 11, from formulation 1 until Y($Cr_{0.5}Mn_{0.5}$)$O_3$), then $Y_2O_3$ and $Al_2O_3$ are also added and then the second preparation step is performed (in FIG. 11, from the formulation 2 on). A ball mill is used in the mixing step and a medium mixing mill is used in the grinding step.

In formulation 2, in order for the thermistor device to have the desired resistance value and resistance-temperature coefficient, the Y($Cr_{0.5}Mn_{0.5}$)$O_3$, $Al_2O_3$ and $Y_2O_3$ are weighed out such that the a and b of aY($Cr_{0.5}Mn_{0.5}$)$O_3$.b($Al_2O_3$$Y_2O_3$) have the relationship a:b=40:60 (here, the ratio of $Al_2O_3$:$Y_2O_3$ is 50:10) and the total weight is 2000 g.

The Y($Cr_{0.5}Mn_{0.5}$)$O_3$, $Al_2O_3$ and $Y_2O_3$ thus weighed out are subjected to grinding in the same manner as in working example 4 (grinding step), the resulting raw material slurry was evaluated using a laser granulometer, and the results indicated that the average grain size was 1.5 μm (see Table 2). This is larger than the average grain size of 1 μm of the $Y_2O_3$ and also larger than the average grain size of 0.6 μm of the $Al_2O_3$ prior to mixing.

The ground slurry mixture of Y($Cr_{0.5}Mn_{0.5}$)$O_3$, $Al_2O_3$ and $Y_2O_3$ obtained after grinding was treated in the same manner as in working example 5 above to obtain a mixture of powder granules.

Next, in the molding step, this mixture of powder granules was used and the molding process and sintering process were performed in the same manner as in working example 5 above to obtain a thermistor device with an outside diameter of 1.60 mm. This thermistor device was assembled into a temperature sensor assembly in the same manner as in working example 1 to form a temperature sensor. The thermistor device and temperature sensor thus fabricated have the same structure as those shown in FIGS. 1–3.

Moreover, in the aforementioned second preparation step, the materials are also weighed out to give a aY($Cr_{0.5}Mn_{0.5}$)$O_3$.b($Al_2O_3+Y_2O_3$) formulation molar ratio of a:b where a:b=95:5 and 5:95 (here, the ratio of $Al_2O_3$:$Y_2O_3$ is 50:10), and thermistor devices are fabricated thereafter by the same procedure and assembled into temperature sensors. The individual devices of this working example in which the aforementioned formulation molar ratio a:b is 40:60, 95:5 and 5:95 are called device number 22, device number 23 and device number 24, respectively.

Temperature sensors assembled with devices numbered 22–24 were subjected to evaluation of the resistance value-temperature characteristic in the same manner as in working example 1. Table 4 shows the results of evaluation. The thermistor device of this working example 7 also is able to provide a thermistor device that has meritorious effects similar to those of working example 5 with respect to the resistance value-temperature characteristics.

In addition, the thermistor device of device number 16 (a:b=40:60) of this working example 6 exhibited a temperature accuracy of ±9° C. (see Table 2), which was an excellent value compared to that (±22° C.) of working example 5 prepared by the conventional method.

composition, a binder is added in the mixing step, granulation is performed by a spray dryer, and the dried powder mixture is sintered to be able to provide a wide-range thermistor device.

In the same manner, in order to achieve uniformity of composition, the sintering in the thermistor device manufacturing step may be performed two or more times to provide a wide-range thermistor device.

In working examples 1–8 above, the diameter and length of the lead wires is given as 0.3 mm in diameter and 10.5 mm long, their material is given as Pt 100 (pure platinum), but the shape, diameter and length of the lead wires can be selected as desired depending on the shape and dimensions of the temperature sensor or the service environment conditions for the temperature sensor. The material for the lead wires need not be Pt 100 (pure platinum), but other high-melting point metals that have a melting point sufficient to withstand the temperature of sintering of the thermistor device and have sufficient conductivity as lead wires may be used, for example, Pt 80 Ir 20 (80% platinum, 20% iridium) may be used.

Moreover, for the purpose of preventing the lead wires from coming out, the cross section of the lead wires may be

TABLE 4

| Device number | Raw material composition (mole %) | | Resistance value (kΩ) | | Resistance-temperature coefficient | Resistance rate of change $\Delta R^1$ |
| --- | --- | --- | --- | --- | --- | --- |
| | Y($Cr_{0.5}Mn_{0.5}$)$O_3$ | $Al_2O_3 + Y_2O_3$ | Room temperature (27° C.) | 1000° C. | β (K) | (%) |
| 13, 16, 19, 22 | 40 | 60 | 50 | 0.08 | 2530 | −5.0 |
| 14, 17, 20, 23 | 95 | 5 | 30 | 0.05 | 2510 | −5.0 |
| 15, 18, 21, 24 | 5 | 95 | 100 | 0.17 | 2500 | −5.0 |

In passing, upon comparing working examples 5–8 above, all of the thermistor devices exhibited good resistance value-temperature characteristics, which is the object of the present invention. However, regarding the temperature accuracy of the sensor, working examples 6–8, or namely the manufacturing methods presented in Embodiments 2 and 3 above, can be said to be superior to the conventional manufacturing methods.

To wit, in the manufacturing methods taught in working examples 6–8, excellent resistance value-temperature characteristics were achieved through the uniform mixing of the composition by means of finely grinding the thermistor materials, so by reducing the fluctuation in the composition of the mixed sintered body (M1M2)$O_3$.$Y_2O_3$.$Al_2O_3$, the dispersion in the resistance value from sensor to sensor can be reduced.

Examples of Other Modifications of the First Aspect

Note that it need not be said that the wide-range thermistor device consisting of a mixed sintered body of Y(CrMn)$O_3$ and $Al_2O_3$ (or $Al_2O_3$ and $Y_2O_3$) such as in working examples 1–8 above is prepared from $Y_2O_3$ or other yttrium compounds, $Cr_2O_3$ or other chromium compounds, $Mn_2O_3$ or other manganese compounds or $Al_2O_3$ or other aluminum compounds.

In addition, in working examples 1–8 above, in the first preparation step, the drying prior to calcining is performed by hot-air drying, the solid mixture is given a rough grinding by a mixing and grinding machine, and then the calcining is performed, but in order to achieve uniformity of the a shape other than circular, as it may be rectangular, semi-circular or otherwise shaped. Moreover, the surface of the lead wires it may be given irregularities by knurling, and such lead wires may be used as the lead wires of the thermistor device.

In addition, in working examples 1–8 above, the method of molding the thermistor device was given as inserting lead wires and then performing molding. However, it is also possible to open holes for attaching the lead wires after the thermistor raw material (powder) is used to mold a cylindrical shape, and then insert the lead wires and sinter to obtain a thermistor device with lead wires attached.

In addition, it is also possible to sinter the above cylindrical body, thereafter attach the lead wires to obtain a thermistor device.

In addition, it is possible to add binders, resin materials or the like which are mixed into the raw material for the thermistor device, to adjust its viscosity or hardness to be suitable for extrusion molding, and thus use extrusion molding to obtain a molded thermistor device with holes formed for attaching lead wires, and then insert the lead wires and sinter to obtain a thermistor device with lead wires attached.

In addition, it is possible to add binders, resin materials or the like which are mixed into the raw material for the thermistor device, to adjust its viscosity or hardness to be suitable for sheet forming, and thus obtain a sheet-shaped thermistor sheet with a thickness of 200 μm. The thickness of five of these sheets laminated together becomes 1 mm, so a mold could be used to cut a hole 0.4 mm in diameter for attaching the lead wires with an outside diameter of 1.8 mm, to obtain a thermistor device form with this shape. Then, it is possible to insert the lead wires and sinter to obtain a thermistor device with lead wires attached.

Note that in working examples 1–8 above, it is possible to add an excess of $Y_2O_3$ in formulation 1 and perform calcining to form calcine $Y(Cr_{0.5}Mn_{0.5})O_3 \cdot Y_2O_3$ with excess $Y_2O_3$ and thereafter, add $Y_2O_3$ and $Al_2O_3$ in formulation 2 so that the mixed sinter body achieves the desired composition.

In the above description of the first aspect, the thermistor device of this aspect is made of a mixed sintered body of a material expressed by the generic formula $a(M1M2)O_3 \cdot bAl_2O_3$ or $a(M1M2)O_3 \cdot b(Al_2O_3+Y_2O_3)$, comprising $(M1M2)O_3$ which exhibits a low resistance value and low resistance-temperature coefficient (e.g., 1000–4000K) and $Al_2O_3$ (or $Al_2O_3$ and $Y_2O_3$) which is a material that stabilizes the resistance value of the thermistor device.

For this reason, by appropriately mixing and sintering the two together, the resistance value and resistance-temperature coefficient can be controlled variously over a wide range, so temperatures can be detected over a wide temperature range from room temperature to 1000° C. Moreover, from the standpoint of reliability in the heat history from room temperature to 1000° C. also, a thermistor material that has stable characteristics in that the resistance value does not change can be provided (working examples 1–8 above).

By means of the method of manufacturing the thermistor device of the first aspect, uniform mixing of the composition is achieved by means of finely grinding the thermistor materials so that, by reducing the fluctuation in the composition, dispersion in the resistance value from sensor to sensor can be reduced, and the temperature accuracy from room temperature to 1000° C. is increased to ±10° C. (compared to roughly ±23° C. by the conventional manufacturing method), so a thermistor device that can give a highly accurate temperature sensor can be provided (working examples 2–4 and 6–8 above).

Working Example 9

Working example 9 is an example whereby the powdered raw material for thermistor device 1 comprising a mixed sintered body of $38Y(Cr_{0.5}Mn_{0.5})O_3 \cdot 62Y_2O_3$ is synthesized by means of a liquid-phase method using metal alkoxides as the precursor compounds. FIG. 12 shows the manufacturing process of this working example 9. In FIG. 12, the portion from the formulation step to the calcining step is equivalent to the first step, and the portion from the granulation and drying step to the sintering step is equivalent to the second step.

In the first step, first, the metal alkoxides of triethoxy yttrium $(Y(OC_2H_5)_3)$, diethoxy manganese $(Mn(OC_2H_5)_2)$ and tris (2,4-pentadiono) chromium $(Cr[OC(CH_3)CHCOCH_3]_3)$, each with a purity of 99.9% or greater are prepared as the three precursor compounds which serve as the starting material.

Next, in the formulation step, the aforementioned three precursor compounds are weighed out so that the ultimate composition of the thermistor device 1 becomes $38Y(Cr_{0.5}Mn_{0.5})O_3 \cdot 62Y_2O_3$. Moreover, in order to add Ca as the sintering aid component to the aforementioned starting material, the metal alkoxide diethoxy calcium $(Ca(OC_2H_5)_2)$ is weighed out so that it comprises 5 wt. % of the $38Y(Cr_{0.5}Mn_{0.5})O_3 \cdot 62Y_2O_3$.

Next, in the dissolution and mixing step, the starting material and $Ca(OC_2H_5)_2$ thus weighed out is dissolved in a solvent mixture of ethanol and isopropyl alcohol 10 times the amount of starting material by weight, and in the stirring and reflux step, refluxing is performed for 10 hours at 40–80° C. to obtain the composite metal alkoxide solution that is referred to in the present invention as the liquid mixture.

Next, in the heating and polymerization step, the metal salt precipitating agent of deionized water is added in order to hydrolyze this composite metal alkoxide solution and then the solution is stirred and mixed. Moreover, in the reflux and precipitation step, refluxing is performed for 2 hours at 40–80° C. to obtain a gelatinous precipitate of metal salts containing the various metallic elements of the aforementioned precursor compounds. Then, in the separation into lots and drying step, this precipitate is separated by filtration and dried, and then in the calcining step, it is calcined to obtain a powdered raw material with the composition $38Y(Cr_{0.5}Mn_{0.5})O_3 \cdot 62Y_2O_3$, the same composition as that of the thermistor device 1.

Next, in the second step, in the granulation and drying step, to the powdered raw material thus obtained is added a dispersing agent, a binder and a mold release agent, and the mixture is granulated. The granulation is performed in a spray dryer to obtain granules of the composition $38Y(Cr_{0.5}Mn_{0.5})O_3 \cdot 62Y_2O_3$.

Next, in the molding step, these granules are used to form the shape of the thermistor device 1. Molding is performed by means of a mold molding method, where lead wires of Pt 100 with dimensions (outside diameter×length) of 0.3 mm×5 mm are inserted into a male mold, the granules are placed in a female mold with an inside diameter of 1.89 mm and molding is performed at a pressure of approximately 3500 kgf/cm² to obtain a molded thermistor device with lead wires 11 and 12 attached.

Next, in the sintering step, this molded thermistor device is placed on a corrugated setter made of $Al_2O_3$ and sintered for 1–2 hours at 1400–1600° C. in air. In this manner, the thermistor device 1 is obtained as a mixed sintered body (e.g., a cylinder 1.6 mm in diameter and 1.2 mm long) with lead wires 11 and 12 attached. Thereafter, this thermistor device 1 is assembled into a temperature sensor 100 in the configuration shown in FIG. 2.

This temperature sensor 100 is placed in a high-temperature furnace and the resistance characteristics of the thermistor device, namely the resistance value-temperature characteristics (resistance value, resistance-temperature coefficient β) and temperature accuracy ±A (° C.) are measured over the temperature range from room temperature (e.g., 27° C.) to 1000° C. in the same manner as in working example 1 above. Table 5 shows the results of evaluation presented together with the composition of the thermistor device (composition of the thermistor raw material). Note that Table 5 also shows the results of evaluation of working examples 10–17 below. The temperature sensor 100 according to this example exhibited a temperature accuracy of ±3° C., which is an excellent value.

In addition, an analytical electron microscope (AEM) was used to examine the crystal phases of the grains of crystal phases that mainly effect the resistance value, and an analysis of the composition of the crystal grains of $Y(Cr_{0.5}Mn_{0.5})O_3$ was performed. As a result, the composition of the crystal grains of $Y(Cr_{0.5}Mn_{0.5})O_3$ was found to range from Y:Cr:Mn=1:0.5:0.5 to Y:Cr:Mn=1:0.51:0.49, so almost none of the conventional dispersion in composition from the ideal composition was seen, and thus uniformity of composition on the atomic and molecular order was found.

In addition, upon using a transmission electron microscope (TEM) to observe the thermistor device 1, the various crystal grains (in this example, crystal grains of Y(Cr$_{0.5}$Mn$_{0.5}$)O$_3$ and Y$_2$O$_3$) were found to be very fine grains on the order of several nm (nanometers) to several hundred nm which were uniformly dispersed/mixed in the composition.

Working Example 10

Figure 13:
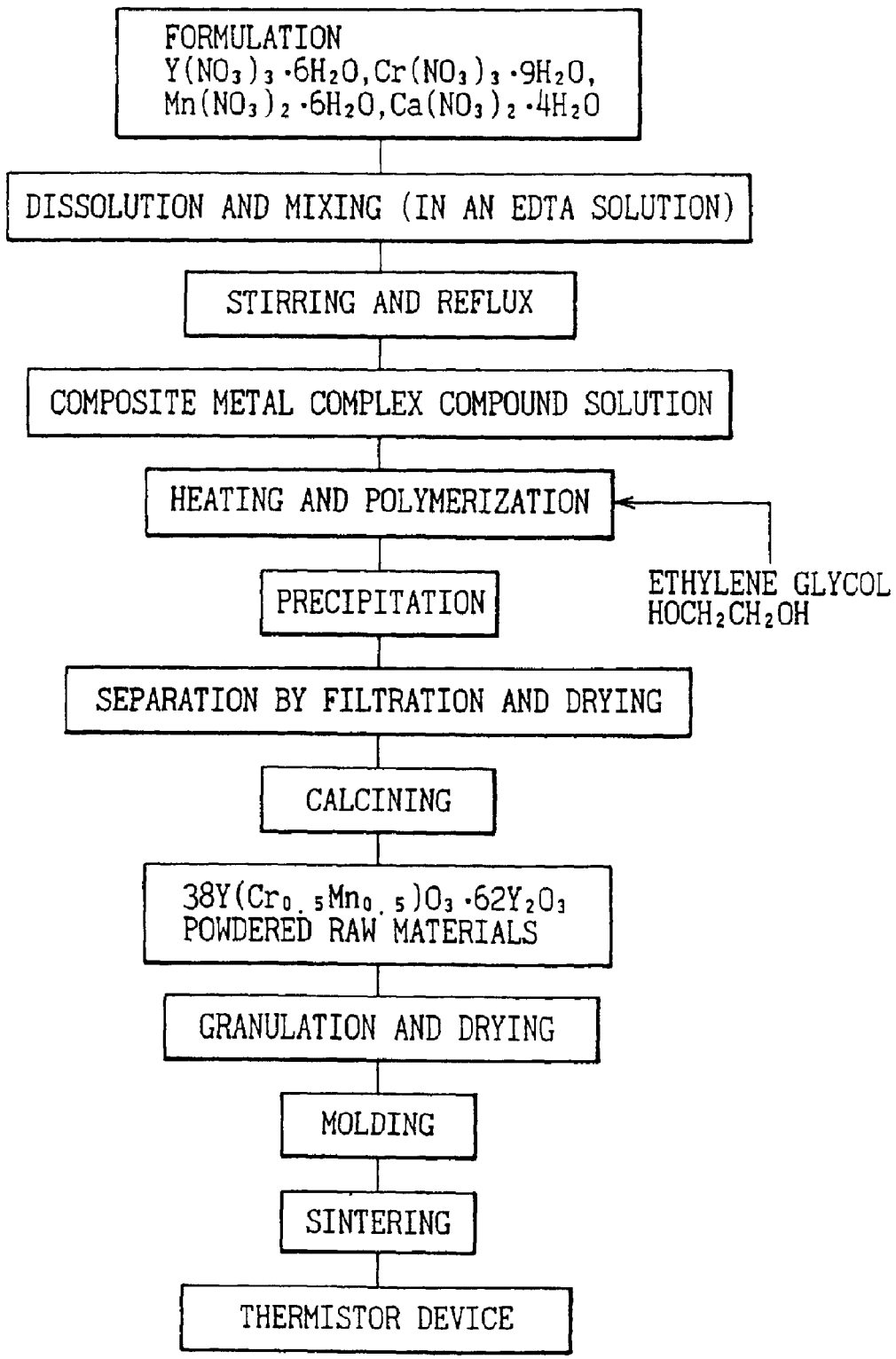
FIG. 13 is a diagram of the manufacturing process for the thermistor device of Working Example 10 of the present invention.

Working example 10 is an example whereby the powdered raw material for thermistor device 1 consisting of a mixed sintered body of 38Y(Cr$_{0.5}$Mn$_{0.5}$)O$_3$.62Y$_2$O$_3$ is obtained as in working example 9, but this is performed by means of a liquid-phase method whereby the precursor compounds are mixed in a solution in which the complexing compound ethylenediamenetetraacetic acid (EDTA) is dissolved. FIG. 13 shows the manufacturing process of this working example 10.

Here, in FIG. 13, the portion from the formulation step to the calcining step is equivalent to the first step, and the portion from the granulation and drying step to the sintering step is equivalent to the second step. In the first step, first, as the nitrates (inorganic metallic compounds) yttrium nitrate (Y(NO$_3$)$_3$.6H$_2$O), manganese nitrate (Mn(NO$_3$)$_3$.6H$_2$O) and chromium nitrate (Cr(NO$_3$)$_3$.9H$_2$O), each with a purity of 99.9% or greater are prepared as the three precursor compounds which serve as the starting material.

Next, in the formulation step, the aforementioned three precursor compounds are weighed out so that the ultimate composition of the thermistor device 1 becomes 38Y(Cr$_{0.5}$Mn$_{0.5}$)O$_3$.62Y$_2$O$_3$. Moreover, in order to add Ca as the sintering aid component to the aforementioned starting material, the inorganic metallic compound calcium nitrate (Ca(NO$_3$)$_2$.4H$_2$O) is weighed out so that it comprises 5 wt. % of the 38Y(Cr$_{0.5}$Mn$_{0.5}$)O$_3$.62Y$_2$O$_3$.

Next, in the dissolution and mixing step, EDTA in an amount 3 times by weight of that of the starting material is dissolved in an appropriate amount of deionized water. The starting material and Ca(NO$_3$)$_2$.4H$_2$O thus weighed out is dissolved in this EDTA solution. In this liquid mixture, the various metal ions (Y, Cr, Mn, Ca) react with the EDTA to prepare a composite metal complex compound in which these metal ions are coordinated and bound to the coordination sites of the EDTA.

Next, in the heating and polymerization step, in order to cause a polymerization reaction in this composite metal complex compound and obtain a precipitate of the metal salts, the metal salt precipitating agent of ethylene glycol is added in an amount greater than the minimum amount required to cause the polymerization reaction and then the solution is stirred and mixed. Thereafter, this liquid mixture is heated to 100–200° C. to advance the polymerization reaction and obtain a polymer formed of the polymerized composite metal complex compound.

Then, in the precipitation step, heating is halted at the point when the polymerization reaction has advanced sufficiently, and an appropriate amount of water is added to precipitate a gelatinous precipitate of the aforementioned polymer and composite metal complex compound (hereinafter referred to as the "polymer, etc."). Then, this precipitate is separated by filtration and dried, and then it is calcined to obtain a powdered raw material with the composition 38Y(Cr$_{0.5}$Mn$_{0.5}$)O$_3$.62Y$_2$O$_3$, the same composition as that of the thermistor device 1.

Next, in the second step, processing is performed in the same manner as in working example 9 above, so that the powdered raw material thus obtained is granulated. These granules are used in the molding and sintering steps to obtain the thermistor device 1 with lead wires 11 and 12 attached as a mixed sintered body. Thereafter, this thermistor device 1 assembled into a temperature sensor 100 in the same manner as in working example 9 above and was subjected to evaluation of its resistance value-temperature characteristics and temperature accuracy. Table 5 shows the results of evaluation. The temperature sensor 100 according to this example exhibited a temperature accuracy of ±3° C., which is an excellent value.

In addition, AEM composition analysis was performed as in the above, and as a result, the composition of the crystal grains of Y(Cr$_{0.5}$Mn$_{0.5}$)O$_3$, which is the resistance value dominating phase, was found to range from Y:Cr:Mn= 1:0.5:0.5 to Y:Cr:Mn=1:0.51:0.49, so almost none of the conventional dispersion in composition from the ideal composition was seen, and thus uniformity of composition on the atomic and molecular order was found. In addition, as a result of TEM observation as in the above, the various crystal grains of Y(Cr$_{0.5}$Mn$_{0.5}$)O$_3$ and Y$_2$O$_3$ were found to be very fine grains on the order of several nm (nanometers) to several hundred nm which were uniformly dispersed/ mixed in the composition.

Working Example 11

Figure 14:
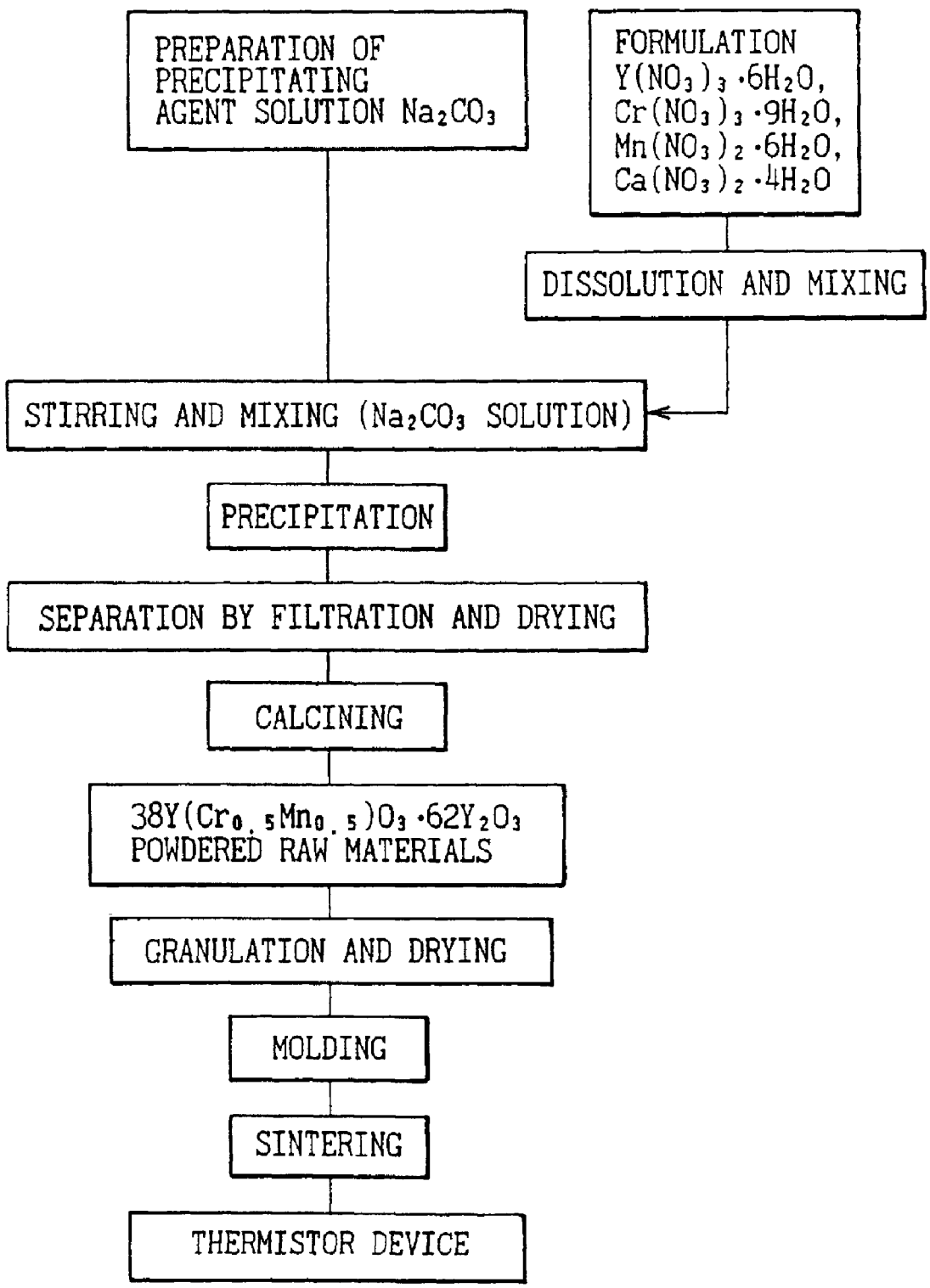
FIG. 14 is a diagram of the manufacturing process for the thermistor device of Working Example 11 of the present invention.

Working example 11 is an example whereby the powdered raw material for thermistor device 1 consisting of a mixed sintered body of 38Y(Cr$_{0.5}$Mn$_{0.5}$)O$_3$.62Y$_2$O$_3$ is synthesized by means of a liquid-phase method using nitrate inorganometallic compounds as the precursor compounds. FIG. 14 shows the manufacturing process of this working example 11. In FIG. 14, the portion from the formulation step to the calcining step is equivalent to the first step, and the portion from the granulation and drying step to the sintering step is equivalent to the second step.

In the first step, first, the nitrates yttrium nitrate, manganese nitrate and chromium nitrate, each with a purity of 99.99% (4N) or greater are prepared as the three precursor compounds which serve as the starting material. Next, in the formulation step, the aforementioned three precursor compounds are weighed out so that the ultimate composition of the thermistor device 1 becomes 38Y(Cr$_{0.5}$Mn$_{0.5}$) O$_3$.62Y$_2$O$_3$. Moreover, in order to add Ca as the sintering aid component to the aforementioned starting material, Ca(OC$_2$H$_5$)$_2$ is weighed out so that it comprises 5 wt. % of the 38Y(Cr$_{0.5}$Mn$_{0.5}$)O$_3$.62Y$_2$O$_3$.

Next, in the dissolution and mixing step, the starting material and Ca(NO$_3$)$_2$.4H$_2$O thus weighed out is dissolved in an appropriate amount of water. Also, in order to obtain a precipitate of metal salts from this liquid mixture of inorganic metal compounds, the metal salt precipitating agent of sodium bicarbonate (Na$_2$CO$_3$) is used. An amount of sodium bicarbonate two times by weight of that of the starting material is dissolved in an appropriate amount of deionized water to prepare a sodium bicarbonate solution (precipitating agent solution preparation step).

Continuing on, in the stirring and mixing step, in order to obtain a precipitate of metal salts from the co-precipitation reaction of the aforementioned liquid mixture of inorganic metal compounds and sodium bicarbonate solution, the aforementioned liquid mixture of inorganic metal compounds is added to the sodium bicarbonate solution and stirred and mixed to obtain a precipitate consisting of a composite carbonate. Then, this precipitate is separated by filtration, dried and then calcined to obtain a powdered raw material with the composition $38Y(Cr_{0.5}Mn_{0.5})O_3 \cdot 62Y_2O_3$, the same composition as that of the thermistor device 1.

Next, in the second step, processing is performed in the same manner as in working example 9 above, so that the powdered raw material thus obtained is granulated. These granules are used in the molding and sintering steps to obtain the thermistor device 1 with lead wires 11 and 12 attached as a mixed sintered body. Thereafter, this thermistor device 1 assembled into a temperature sensor 100 in the same manner as in working example 9 above and was subjected to evaluation of its resistance value-temperature characteristics and temperature accuracy. Table 5 shows the results of evaluation. The temperature sensor 100 according to this example exhibited a temperature accuracy of ±5° C., which is an excellent value.

In addition, AEM composition analysis was performed as in the above, and as a result, the composition of the crystal grains of $Y(Cr_{0.5}Mn_{0.5})O_3$, which is the resistance value dominating phase, was found to range from Y:Cr:Mn=1:0.48:0.52 to Y:Cr:Mn=1:0.51:0.49, so almost none of the conventional dispersion in composition from the ideal composition was seen, and thus uniformity of composition on the atomic and molecular order was found. In addition, as a result of TEM observation as in the above, the various crystal grains of $Y(Cr_{0.5}Mn_{0.5})O_3$ and $Y_2O_3$ were found to be very fine grains on the order of several nm to several hundred nm which were uniformly dispersed/mixed in the composition.

Comparative Example 3

Comparative example 3 is an example of a method of manufacturing the thermistor device composition of $38Y(Cr_{0.5}Mn_{0.5})O_3 \cdot 62Y_2O_3$, the same composition as in working examples 9–11 above, but the conventional solid-phase method is used. In the solid-phase method of this example, the oxides $Y_2O_3$, $Cr_2O_3$ and $Mn_2O_3$, and $CaCO_3$ as the sintering aid component are used as the raw materials. The mixing and grinding are performed with a conventional ball mill. FIG. 15 shows the manufacturing process of this comparative example 3.

First, $Y_2O_3$, $Cr_2O_3$, $Mn_2O_3$ and $CaCO_3$ each with a purity of 99.9% or greater are prepared. Next, in the formulation step, the aforementioned three precursor compounds are weighed out so that the ultimate composition of the thermistor device 1 becomes $38Y(Cr_{0.5}Mn_{0.5})O_3 \cdot 62Y_2O_3$. Moreover, in order to add Ca as the sintering aid component to the aforementioned starting material, $CaCO_3$ is weighed out so that it comprises 5 wt. % of the $38Y(Cr_{0.5}Mn_{0.5})O_3 \cdot 62Y_2O_3$.

The operation of the ball mill in the mixing step is performed as follows. A ball mill is prepared by placing 2.5 kg of 15-mm diameter balls and 2.5 kg of 20-mm diameter balls made of $Al_2O_3$ in a plastic pot (20-liter capacity). The weighed out $Y_2O_3$, $Cr_2O_3$, $Mn_2O_3$ and $CaCO_3$ is placed in this pot and 6,000 cc of deionized water is added and then mixing and grinding is performed at 60 rpm for 6 hours to obtain a raw material slurry. In the calcining process, this raw material slurry mixture is dried in a spray dryer and the dry powder thus obtained is placed in a crucible of 99.3% $Al_2O_3$ and calcined for 1–2 hours at 1100–1300° C. in a high-temperature furnace in air to a calcine with a composition $38Y(Cr_{0.5}Mn_{0.5})O_3 \cdot 62Y_2O_3$.

In the formulation 2 step, the desired amount of the aforementioned calcine that had become a clump-like solid in calcining is weighed out. Then, in the grinding step (shown as mixing and grinding in FIG. 15) it is given a rough grinding in a mixing and grinding machine and passed through a #30 mesh sieve. In order to grind this further, a ball mill similar to that in the mixing step is used. The ball mill grinding conditions were set to the same conditions as the conditions for the mixing step above. In addition, a dispersing agent, a binder and a mold release agent were added in this grinding step.

The raw material slurry of thermistor materials thus obtained was granulated, dried and molded in the same manner as in working example 9 above to obtain a molded thermistor device. This molded device is placed on a corrugated setter made of $Al_2O_3$ and sintered for 1–2 hours at 1500–1600° C. in air to obtain a thermistor device. The thermistor device of this example has the same structure as the thermistor device 1 of FIG. 1, and the thermistor device is assembled into a temperature sensor having the same structure as temperature sensor 100.

Thereafter, this thermistor device assembled into a temperature sensor in the same manner as in working example 9 above was subjected to evaluation of its resistance value-temperature characteristics and temperature accuracy. Table 6 shows the results of evaluation. Table 6 also shows the results of evaluation of comparative examples 4 to 6. The temperature sensor according to this comparative example 3 exhibited resistance value-temperature characteristics comparable to those of working examples 9–11 above, which are sintered bodies having the same composition, but its temperature accuracy was ±25° C., which is much worse.

In addition, AEM composition analysis was performed on the composition of the crystal grains of $Y(Cr_{0.5}Mn_{0.5})O_3$, which is the resistance value dominating phase, in the same manner as working example 9. And as a result, the composition of the crystal grains was found to range from Y:Cr:Mn=1:0.4:0.6 to Y:Cr:Mn=1:0.6:0.4, compared to the ideal composition of Y:Cr:Mn=1:0.5:0.5, so the dispersion in composition was large, and this was determined to be the cause of the degradation of the temperature accuracy.

The aforementioned working examples 9–11 are examples of a thermistor device 1 made of the mixed sintered body $38Y(Cr_{0.5}Mn_{0.5})O_3 \cdot 62Y_2O_3$, while the following working examples 12–17 apply the liquid-phase method of the present invention to thermistor compositions other than those in working examples 9–11. These are examples of the thermistor device 1 made of the mixed sintered bodies $40Y(Cr_{0.5}Mn_{0.5})O_3 \cdot 60Al_2O_3$ in working examples 12 and 13, $(Y_{0.9}Ca_{0.1})(Cr_{0.75}Fe_{0.2}Ti_{0.05})O_3$ in working examples 14 and 15 and $(Al_{0.7}Cr_{0.2}Fe_{0.1})_2O_3 \cdot MgO \cdot CaO$ in working examples 16 and 17.

Working Example 12

Figure 16A:
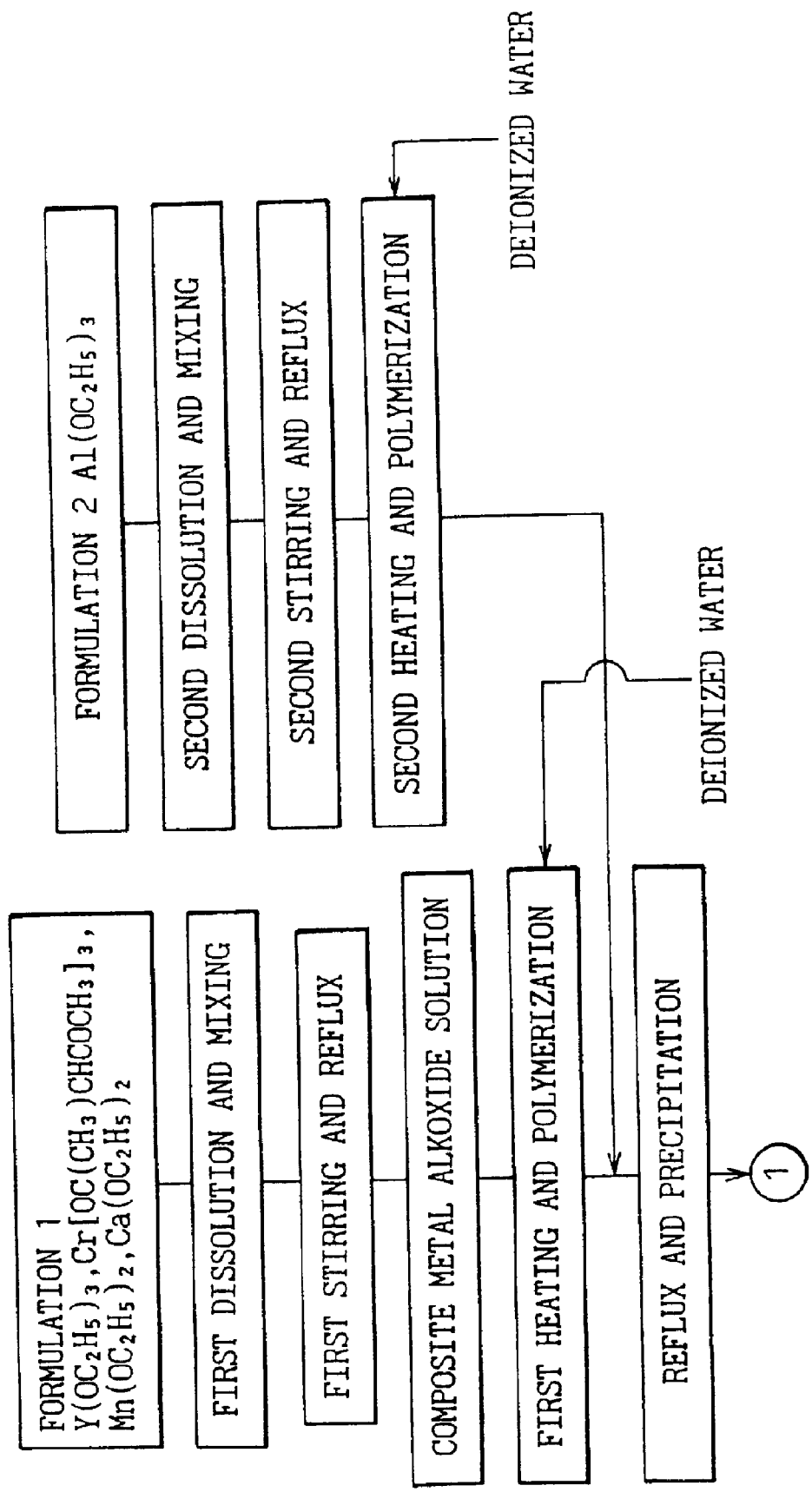
FIGS. 16A and B are a diagram of the manufacturing process for the thermistor device of Working Example 12 of the present invention.
Figure 16B:
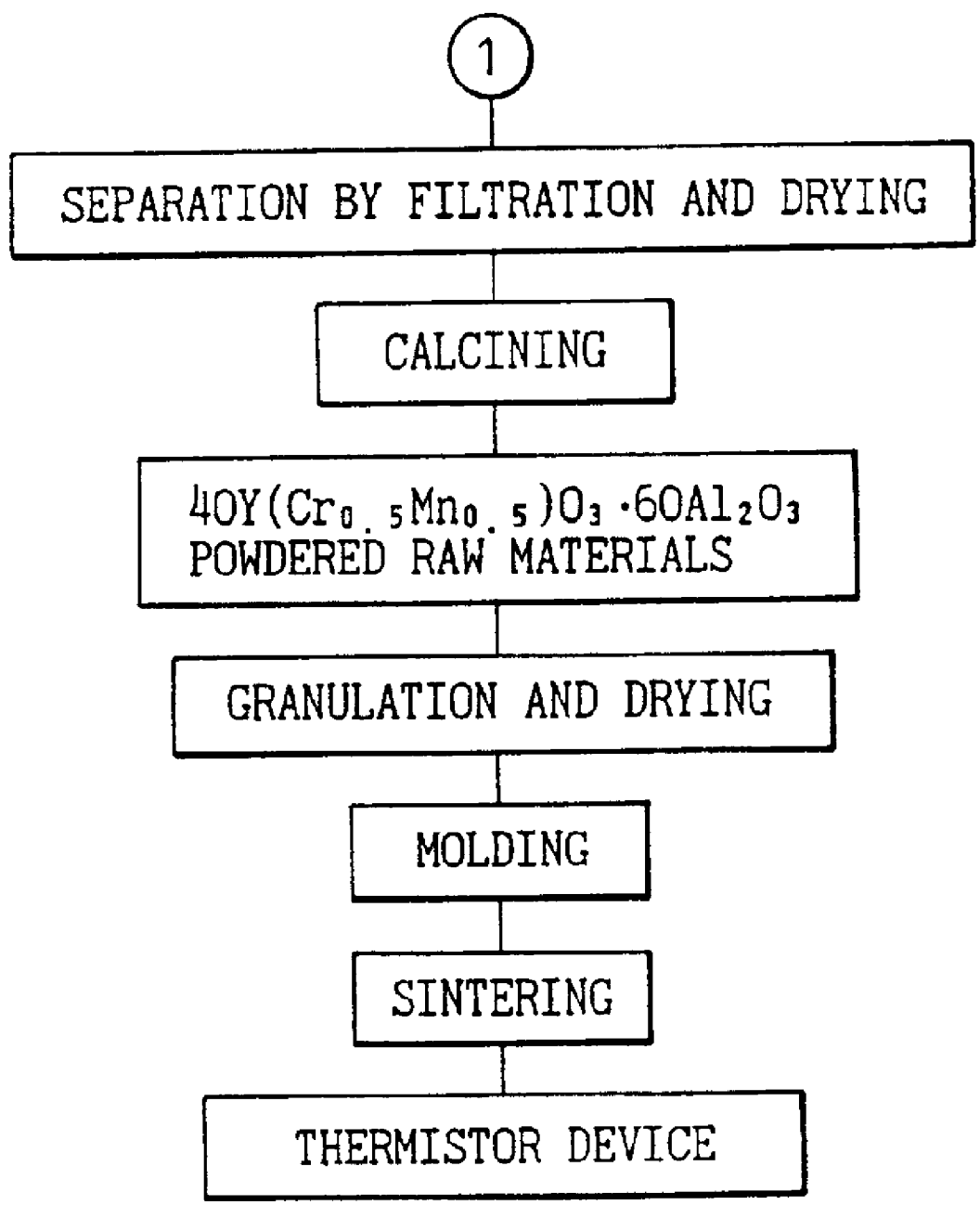

Working example 12 is an example whereby the powdered raw material for thermistor device 1 consisting of a mixed sintered body of $40Y(Cr_{0.5}Mn_{0.5})O_3 \cdot 60Al_2O_3$ is synthesized by means of a liquid-phase method using metal alkoxides as the precursor compounds. FIGS. 16A and 16B show the manufacturing process of this working example 12. In FIGS. 16A and 16B, the portion from the formulation step (formulation 1 and formulation 2) to the calcining step is equivalent to the first step, and the portion from the granulation and drying step to the sintering step is equivalent to the second step.

First, the metal alkoxides of triethoxy yttrium, diethoxy manganese and tris (2,4-pentadiono) chromium, each with a purity of 99.9% or greater are prepared as the three precursor compounds (the chemical formulae of each are the same as in working example 9 above) which serve as the starting material. Next, in the formulation 1 step, the aforementioned three precursor compounds are weighed out so that the ultimate composition of the thermistor device 1 becomes $40Y(Cr_{0.5}Mn_{0.5})O_3.60Al_2O_3$. Moreover, in order to add Ca as the sintering aid component to the aforementioned starting material, the metal alkoxide diethoxy calcium (Ca $(OC_2H_5)_2$) is weighed out so that it comprises 5 wt. % of the $40Y(Cr_{0.5}Mn_{0.5})O_3.60Al_2O_3$.

Next, in the first dissolution and mixing step, the starting material and $Ca(OC_2H_5)_2$ thus weighed out is dissolved in a solvent mixture of ethanol and isopropyl alcohol 10 times the amount of starting material by weight and, in the first stirring and reflux step, refluxing is performed for 10 hours at 40–80° C. to obtain a composite metal alkoxide solution (referred to in the present invention as the liquid mixture). Next, in the first heating and polymerization step, the metal salt precipitating agent of deionized water is added in order to hydrolyze this composite metal alkoxide solution and then the solution is stirred and mixed. This liquid mixture is called the composite metal polymer liquid.

Next, in the formulation 2 step, the precursor compound $Al(OC_2H_5)_3$ is weighed out so that the ultimate composition of the thermistor device 1 becomes $40Y(Cr_{0.5}Mn_{0.5})O_3.60Al_2O_3$. In the second dissolution and mixing step, this compound thus weighed out is dissolved in a solvent mixture of ethanol and isopropyl alcohol 10 times the amount of starting material by weight. In the second stirring and reflux step, refluxing is performed for 10 hours at 40–80° C. to obtain an Al alkoxide solution. Next, in the second heating and polymerization step, deionized water (the metal salt precipitating agent) is added in the same manner as in the composite metal alkoxide solution and then the solution is stirred and mixed. This liquid mixture is called the Al polymer liquid.

Moreover, in the reflux and precipitation step, the aforementioned composite metal polymer liquid and Al polymer liquid are mixed and this liquid mixture is mixed while refluxing is performed for 2 hours at 40–80° C. to obtain a gelatinous precipitate. Then, after this precipitate is separated by filtration and dried, it is calcined to obtain a powdered raw material with the composition $40Y(Cr_{0.5}Mn_{0.5})O_3.60Al_2O_3$, the same composition as that of the thermistor device 1.

Next, in the second step, in the same manner as in working example 9 above, the powdered raw material thus obtained is subjected to the granulation and drying, molding and sintering steps to obtain the thermistor device 1 with lead wires 11 and 12 attached as a mixed sintered body. Thereafter, this thermistor device 1 assembled into a temperature sensor 100 in the same manner as in working example 9 above and was subjected to evaluation of its resistance value-temperature characteristics and temperature accuracy. Table 5 shows the results of evaluation. The temperature sensor 100 according to this example exhibited a temperature accuracy of ±2° C., which is an excellent value.

In addition, AEM composition analysis was performed as in the above, and as a result, the composition of the crystal grains of $Y(Cr_{0.5}Mn_{0.5})O_3$, which is the resistance value dominating phase, was found to range from Y:Cr:Mn= 1:0.5:0.5 to Y:Cr:Mn=1:0.51:0.49, so almost none of the conventional dispersion in composition from the ideal composition was seen, and thus uniformity of composition on the atomic and molecular order was found. In addition, as a result of TEM observation as in the above, the various crystal grains of $Y(Cr_{0.5}Mn_{0.5})O_3$ and $Al_2O_3$ were found to be very fine grains on the order of several nm to several hundred nm which were uniformly dispersed/mixed in the composition.

Working Example 13

Figure 17A:
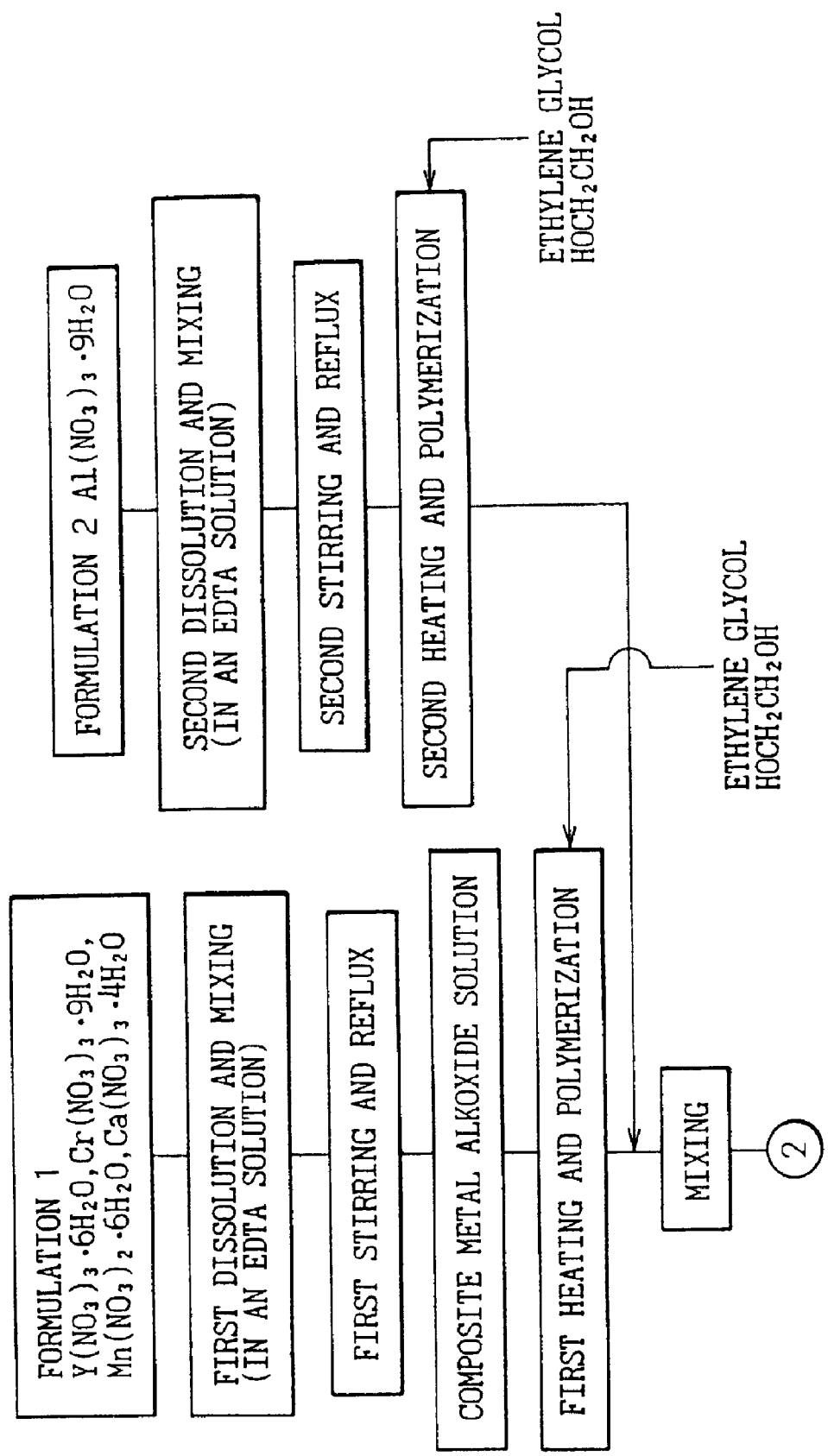
FIGS. 17A and B are a diagram of the manufacturing process for the thermistor device of Working Example 13 of the present invention.
Figure 17B:
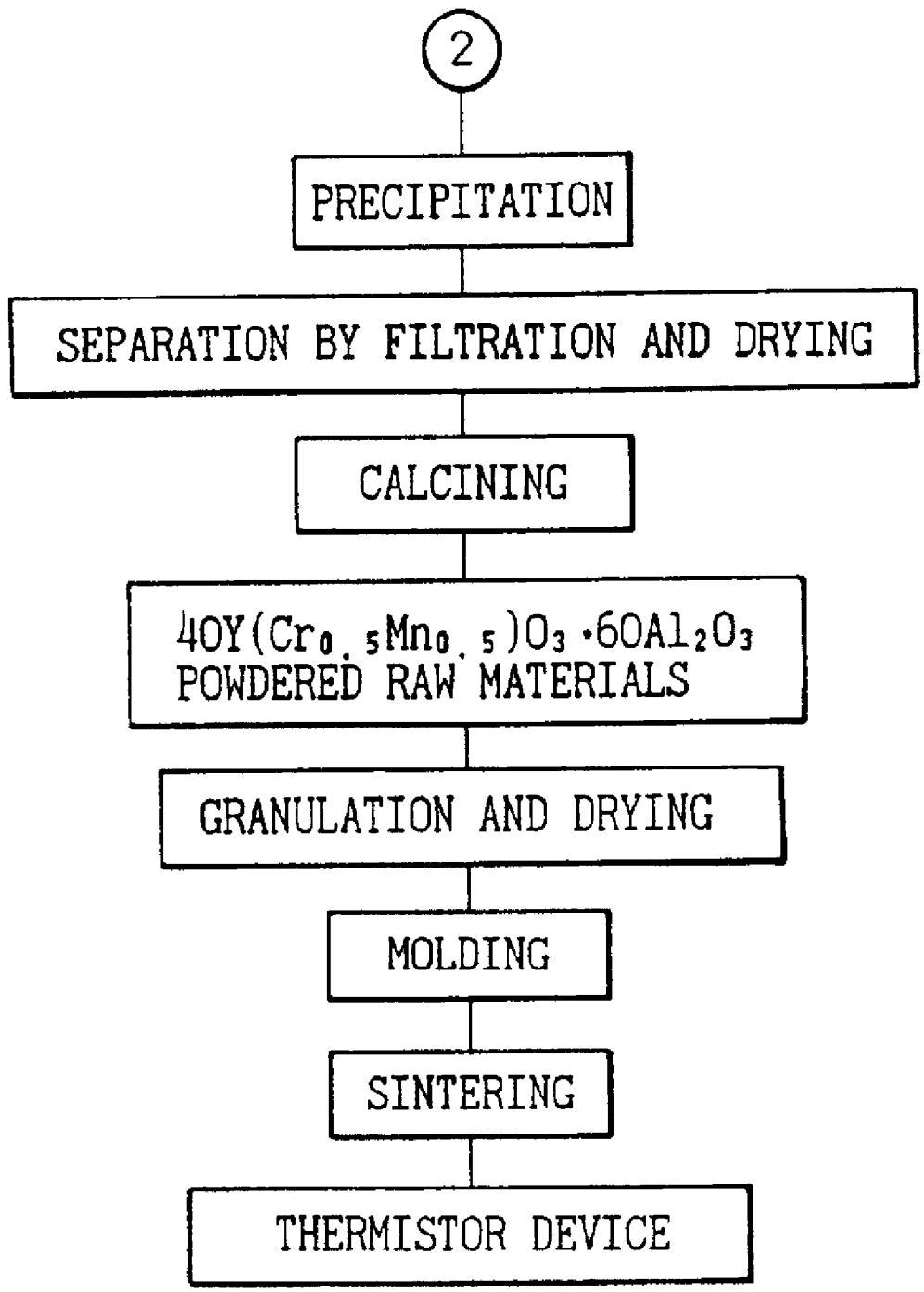

Working example 13 is an example whereby the powdered raw material for thermistor device 1 consisting of a mixed sintered body of $40Y(Cr_{0.5}Mn_{0.5})O_3.60Al_2O_3$ is synthesized as in the aforementioned working example 12, but this is performed by means of a liquid-phase method whereby the precursor compounds are mixed in a solution in which the complexing compound EDTA is dissolved. FIGS. 17A and 17B show the manufacturing process of this working example 13.

Here, in FIGS. 17A and 17B, the portion from the formulation step (formulation 1 and formulation 2) to the calcining step is equivalent to the first step, and the portion from the granulation and drying step to the sintering step is equivalent to the second step. First, the nitrates (inorganic metallic compounds) yttrium nitrate, manganese nitrate and chromium nitrate, each with a purity of 99.9% or greater are prepared as the three precursor compounds (the chemical formulae of each are the same as in working example 10 above) which serve as the starting material.

Next, in the formulation 1 step, the aforementioned three precursor compounds are weighed out so that the ultimate composition of the thermistor device 1 becomes $40Y (Cr_{0.5}Mn_{0.5})O_3.60Al_2O_3$. Moreover, in order to add Ca as the sintering aid component to the aforementioned starting material, the inorganic metallic compound $Ca(NO_3)_2.4H_2O$ is weighed out so that it comprises 5 wt. % of the $40Y(Cr_{0.5}Mn_{0.5})O_3.60Al_2O_3$.

Next, in the first dissolution and mixing step, EDTA in an amount 3 times by weight of that of the starting material is dissolved in an appropriate amount of deionized water. The starting material and $Ca(NO_3)_2.4H_2O$ thus weighed out is dissolved in this EDTA solution to form the liquid mixture as referred to in the present invention. Next, in the first mixing and reflux step, in this liquid mixture, the various metal ions (Y, Cr, Mn, Ca) react with the EDTA to prepare a composite metal complex compound in which these metal ions are coordinated and bound to the coordination sites of the EDTA.

Next, in the first heating and polymerization step, in order to cause a polymerization reaction in this composite metal complex compound and obtain a precipitate of the metal salts, the metal salt precipitating agent of ethylene glycol is added in an amount greater than the minimum amount required to cause the polymerization reaction and then the solution is stirred and mixed. Thereafter, this liquid mixture is heated to 100–200° C. to advance the polymerization reaction and obtain a polymer formed of the polymerized composite metal complex compound.

Next, in the formulation 2 step, $Al(NO_3)_3.9H_2O$ is weighed out so that the ultimate composition of the thermistor device 1 becomes $40Y(Cr_{0.5}Mn_{0.5})O_3.60Al_2O_3$. In the second dissolution and mixing step, this compound thus weighed out is dissolved and mixed in EDTA dissolved and mixed in deionized water in an amount 3 times by weight. In the second stirring and reflux step, refluxing is performed to react the $Al(NO_3)_3.9H_2O$ with EDTA and prepare an Al complex compound.

Next, in the second heating and polymerization step, in order to cause a polymerization reaction in this Al complex compound and obtain a precipitate of the metal salts, the metal salt precipitating agent of ethylene glycol is added in excess to cause the polymerization reaction and then the solution is stirred and mixed. Thereafter, this liquid mixture is heated to 100–200° C. to advance the polymerization reaction. This liquid mixture is called the Al polymer liquid.

Moreover, in the mixing and precipitation step, the aforementioned composite metal polymer liquid and Al polymer liquid are mixed and, while stirring this liquid mixture, heating is halted at the point when the polymerization reaction has advanced sufficiently, and an appropriate amount of deionized water (metal salt precipitating agent) is added to precipitate the polymer, etc. as a gelatinous precipitate of metal salts. Then, this precipitate is separated by filtration and dried, and then it is calcined to obtain a powdered raw material with the composition $38Y(Cr_{0.5}Mn_{0.5})O_3 \cdot 62Y_2O_3$, the same composition as that of the thermistor device 1.

Next, in the second step, in the same manner as in working example 9 above, the powdered raw material thus obtained is subjected to the granulation and drying, molding and sintering steps to obtain the thermistor device 1 with lead wires 11 and 12 attached as a mixed sintered body. Thereafter, this thermistor device 1 assembled into a temperature sensor 100 in the same manner as in working example 9 above and was subjected to evaluation of its resistance value-temperature characteristics and temperature accuracy. Table 5 shows the results of evaluation. The temperature sensor 100 according to this example exhibited a temperature accuracy of ±2° C., which is an excellent value.

In addition, AEM composition analysis was performed as in the above, and as a result, the composition of the crystal-grains of $Y(Cr_{0.5}Mn_{0.5})O_3$, which is the resistance value dominating phase, was found to range from Y:Cr:Mn=1:0.5:0.5 to Y:Cr:Mn=1:0.51:0.49, so almost none of the conventional dispersion in composition from the ideal composition was seen, and thus uniformity of composition on the atomic and molecular order was found. In addition, as a result of TEM observation as in the above, the various crystal grains of $Y(Cr_{0.5}Mn_{0.5})O_3$ and $Al_2O_3$ were found to be very fine grains on the order of several nm to several hundred nm which were uniformly dispersed/mixed in the composition.

Comparative Example 4

Figure 18:
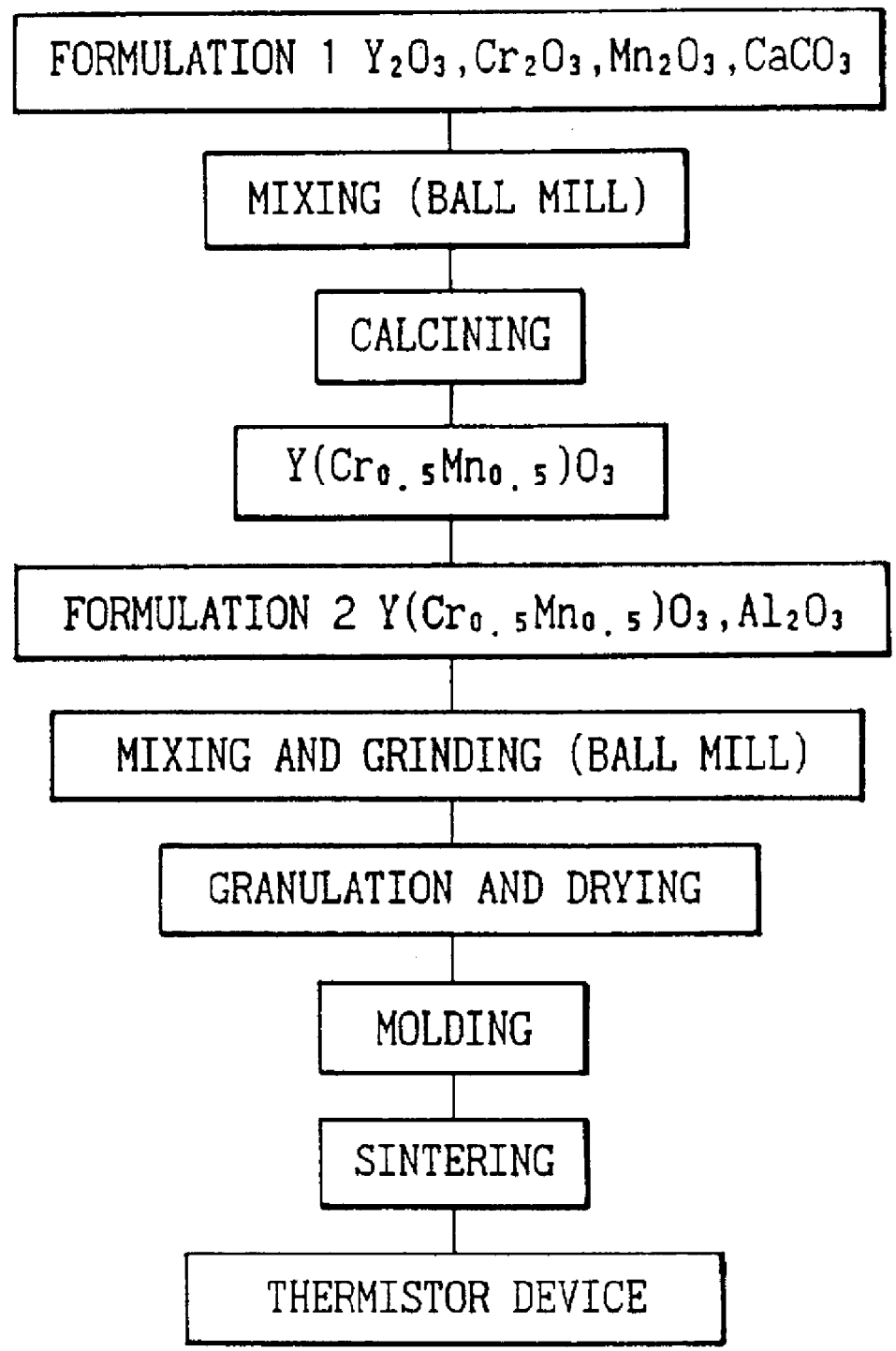
FIG. 18 is a diagram of the manufacturing process for the thermistor device of Comparative Example 4.

Comparative example 4 is an example of a method of manufacturing the thermistor device composition of $40Y(Cr_{0.5}Mn_{0.5})O_3 \cdot 60Al_2O_3$, the same composition as in working examples 12 and 13 above, but the conventional solid-phase method is used. In the solid-phase method of this example, the oxides $Y_2O_3$, $Cr_2O_3$, $Mn_2O_3$ and $Al_2O_3$, and $CaCO_3$ as the sintering aid component are used as the raw materials. The mixing and grinding are performed with a conventional ball mill. FIG. 18 shows the manufacturing process of comparative example 4.

First, $Y_2O_3$, $Cr_2O_3$, $Mn_2O_3$, $Al_2O_3$ and $CaCO_3$ each with a purity of 99.9% or greater are prepared. In formulation 1 step, the $Y_2O_3$, $Cr_2O_3$ and $Mn_2O_3$ are weighed out so that the composition of the calcine after the calcining step becomes $Y(Cr_{0.5}Mn_{0.5})O_3$. Moreover, in order to add Ca as the sintering aid component to the aforementioned starting material, $CaCO_3$ is weighed out so that it comprises 5 wt. % of the $40Y(Cr_{0.5}Mn_{0.5})O_3 \cdot 60Al_2O_3$. Then, in the same manner as comparative example 3 above, the mixing step and calcining step are performed to obtain a calcine with the composition $Y(Cr_{0.5}Mn_{0.5})O_3$.

In the formulation 2 step, $Al_2O_3$ is weighed out so that the composition becomes $40Y(Cr_{0.5}Mn_{0.5})O_3 \cdot 60Al_2O_3$. Then, in the grinding step, the calcine and the $Al_2O_3$ thus weighed out are mixed and grinding is performed with a ball mill with the grinding conditions set to the same conditions as those in comparative example 3. In addition, a dispersing agent, a binder and a mold release agent were added in this grinding step as in comparative example 3.

In the same manner as in comparative example 3 above, the raw material slurry thus obtained is granulated, dried, molded and sintered. The thermistor device thus obtained was assembled into a temperature sensor and its resistance value-temperature characteristics and temperature accuracy were evaluated. Table 6 shows the results of evaluation. The temperature sensor according to this comparative example 4 exhibited resistance value-temperature characteristics comparable to those of working examples 12 and 13 above, which are sintered bodies having the same composition, but its temperature accuracy was ±23° C., which is much worse.

In addition, AEM composition analysis was performed on the composition of the crystal grains of $Y(Cr_{0.5}Mn_{0.5})O_3$, which is the resistance value dominating phase, in the same manner as working example 9. As a result, the composition of the crystal grains $Y(Cr_{0.5}Mn_{0.5})O_3$ was found to range from Y:Cr:Mn=1:0.4:0.6 to Y:Cr:Mn=1:0.6:0.4, compared to the ideal composition of Y:Cr:Mn=1:0.5:0.5, so the dispersion in composition was large, and this was determined to be the cause of the degradation of the temperature accuracy.

Working Example 14

Figure 19:
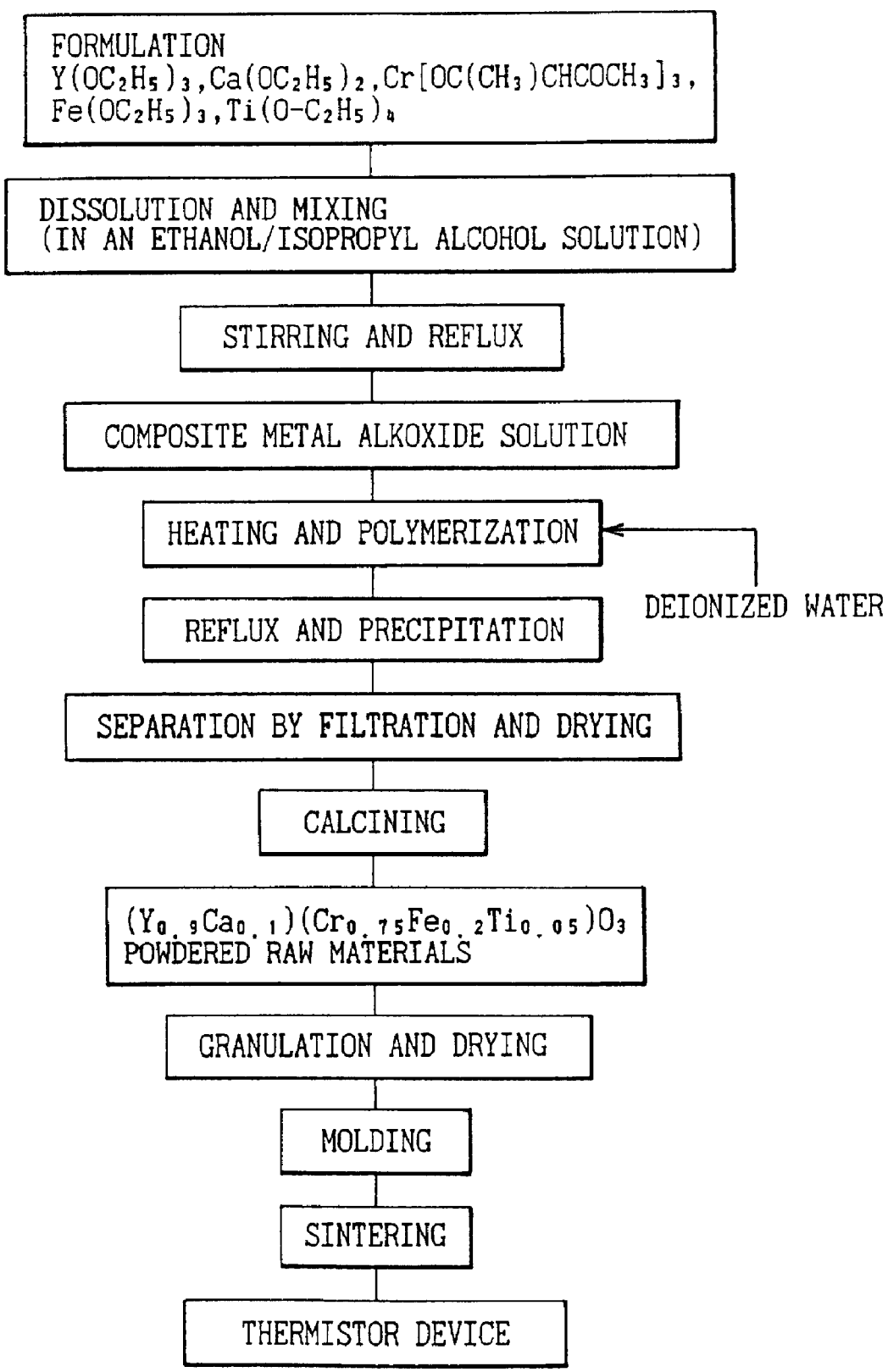
FIG. 19 is a diagram of the manufacturing process for the thermistor device of Working Example 14 of the present invention.

Working example 14 is an example whereby the powdered raw material for a thermistor device consisting of a mixed sintered body of the composition $(Y_{0.9}Ca_{0.1})(Cr_{0.75}Fe_{0.2}Ti_{0.05})O_3$ is synthesized by means of a liquid-phase method using organometallic compounds as the precursor compounds as in the aforementioned example 9. FIG. 19 shows the manufacturing process of this working example 14. In FIG. 19, the portion from the formulation step to the calcining step is equivalent to the first step, and the portion from the granulation and drying step to the sintering step is equivalent to the second step.

First, the metal alkoxides of triethoxy yttrium $(Y(OC_2H_5)_3)$, diethoxy manganese $(Mn(OC_2H_5)_2)$, tris (2,4-pentadiono) chromium $(Cr[OC(CH_3)CHCOCH_3]_3)$, triethoxy iron $(Fe(OC_2H_5)_3)$ and tetraethoxy titanium $(Ti(OC_2H_5)_3)$, each with a purity of 99.9% or greater are prepared as the five precursor compounds which serve as the starting material.

Next, in the formulation step, the aforementioned five precursor compounds are weighed out so that the ultimate composition of the thermistor device becomes $(Y_{0.9}Ca_{0.1})(Cr_{0.75}Fe_{0.2}Ti_{0.05})O_3$. Next, in the dissolution and mixing step, the starting material thus weighed out is dissolved and mixed in a solvent mixture of ethanol and isopropyl alcohol 10 times the amount of starting material by weight. In the stirring and reflux step, refluxing is performed for 10 hours at 40–60° C. to obtain a composite metal alkoxide solution (referred to in the present invention as the liquid mixture).

Next, in the heating and polymerization step, the metal salt precipitating agent of deionized water is added in order to hydrolyze this composite metal alkoxide solution and then the solution is stirred and mixed. Moreover, in the reflux and precipitation step, refluxing is performed for 2–4 hours at 40–60° C. to obtain a gelatinous precipitate of a composite of metallic salts. Then, after this precipitate is separated by filtration and dried, it is calcined to obtain a powdered raw material with the composition $(Y_{0.9}Ca_{0.1})(Cr_{0.75}Fe_{0.2}Ti_{0.05})O_3$, the same composition as that of the thermistor device 1.

Next, in the second step, in the same manner as in working example 9 above, the powdered raw material thus obtained is subjected to the granulation and drying, molding and sintering steps to obtain the thermistor device 1 with lead wires 11 and 12 attached as a mixed sintered body. Thereafter, this thermistor device 1 assembled into a temperature sensor 100 in the same manner as in working example 9 above and was subjected to evaluation of its resistance value-temperature characteristics and temperature accuracy. Table 5 shows the results of evaluation. The temperature sensor 100 according to this example exhibited a temperature accuracy of ±5° C., which is an excellent value.

In addition, AEM composition analysis was performed on the composition of the crystal grains of $(Y_{0.9}Ca_{0.1})(Cr_{0.75}Fe_{0.2}Ti_{0.05})O_3$, which is the resistance value dominating phase, in the same manner as above. As a result, the composition of the crystal grains was found to range from Y:Ca:Cr:Fe:Ti=0.9:0.1:0.75:0.2:0.05 to Y:Ca:Cr:Fe:Ti=0.9:0.1:0.74:0.21:0.05, so almost none of the conventional dispersion in composition from the ideal composition was seen, and thus uniformity of composition on the atomic and molecular order was found.

In addition, as a result of TEM observation as in the above, the various crystal grains of $(Y_{0.9}Ca_{0.1})(Cr_{0.75}Fe_{0.2}Ti_{0.05})O_3$ were found to be very fine grains on the order of several nm to several hundred rim which were uniformly dispersed/mixed in the composition.

Working Example 15

Figure 20:
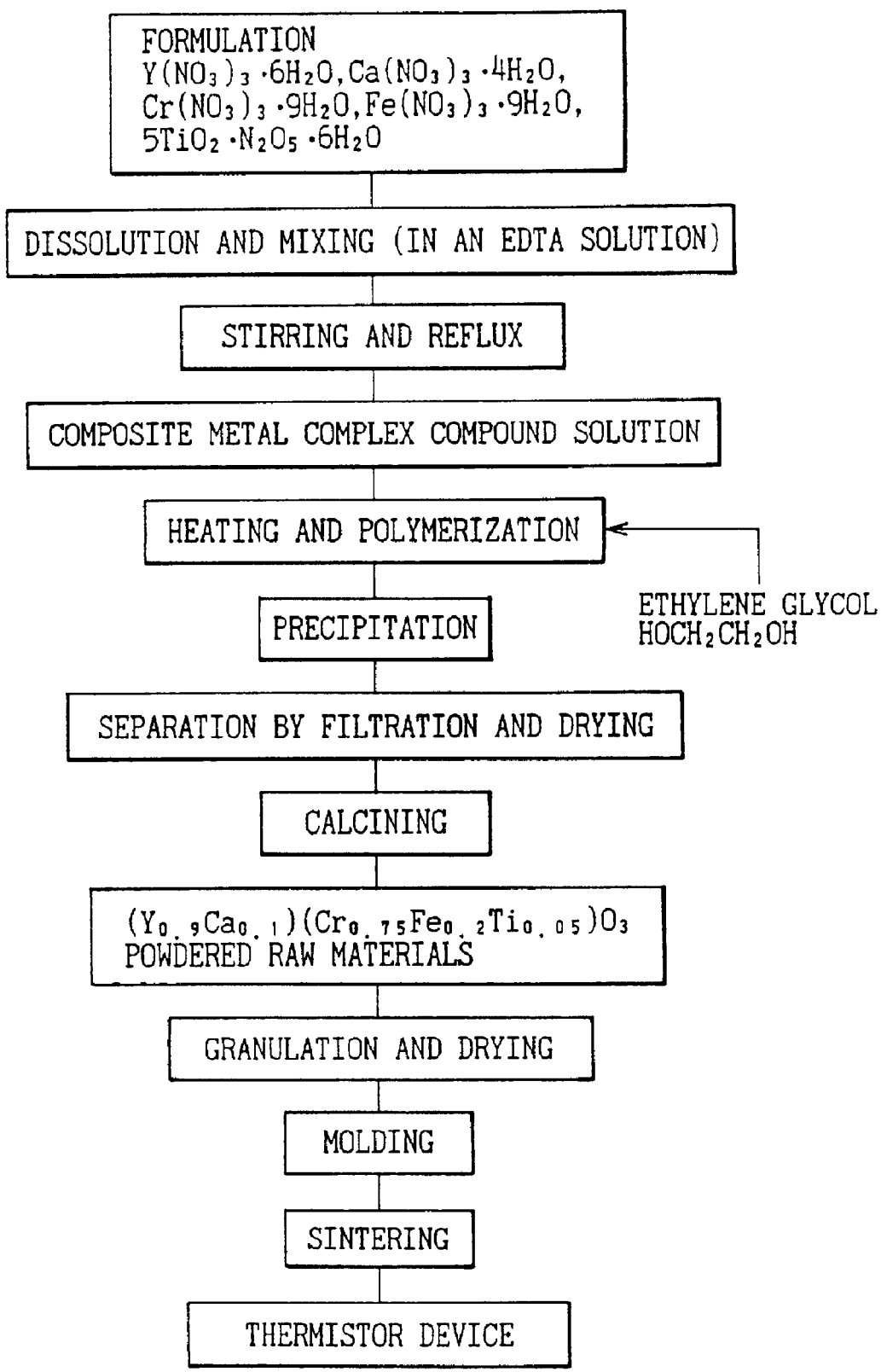
FIG. 20 is a diagram of the manufacturing process for the thermistor device of Working Example 15 of the present invention.

Working example 15 is an example whereby the powdered raw material for thermistor device 1 consisting of a mixed sintered body of the composition $(Y_{0.9}Ca_{0.1})(Cr_{0.75}Fe_{0.2}Ti_{0.05})O_3$ is synthesized as in the aforementioned working example 10, but this is performed by means of a liquid-phase method whereby the precursor compounds are mixed in a solution in which the complexing compound EDTA is dissolved. FIG. 20 shows the manufacturing process of this working example 15.

Here, in FIG. 20, the portion from the formulation step to the calcining step is equivalent to the first step, and the portion from the granulation and drying step to the sintering step is equivalent to the second step. First, the nitrates (inorganic metallic compounds) yttrium nitrate $(Y(NO_3)_3 \cdot 6H_2O)$, calcium nitrate $(Ca(NO_3)_2 \cdot 4H_2O)$, chromium nitrate $(Cr(NO_3)_3 \cdot 9H_2O)$, iron nitrate $(Fe(NO_3)_3 \cdot 9H_2O)$ and titanium oxynitrate $(Y(NO_3)_3 \cdot 6H_2O)$, each with a purity of 99.9% or greater are prepared as the five precursor compounds which serve as the starting material.

Next, in the formulation step, the aforementioned five precursor compounds are weighed out so that the ultimate composition of the thermistor device 1 becomes $(Y_{0.9}Ca_{0.1})(Cr_{0.75}Fe_{0.2}Ti_{0.05})O_3$. Next, in the first dissolution and mixing step, EDTA in an amount 4 times by weight of that of the starting material is dissolved in an appropriate amount of deionized water. The starting material thus weighed out is dissolved in this EDTA solution to form the liquid mixture as referred to in the present invention. Next, in the mixing and reflux step, in this liquid mixture, the various metal ions (Y, Ca, Cr, Fe, Ti) react with the EDTA to prepare a composite metal complex compound in which these metal ions are coordinated and bound to the coordination sites of the EDTA.

Next, in the first heating and polymerization step, in order to cause a polymerization reaction in this composite metal complex compound and obtain a precipitate of the metal salts, the metal salt precipitating agent of ethylene glycol is added in excess of the minimum amount required to cause the polymerization reaction and then the solution is stirred and mixed. Thereafter, this liquid mixture is heated to 80–120° C. to advance the polymerization reaction. Next, in the precipitation step, heating is halted at the point when the polymerization reaction has advanced sufficiently, and an appropriate amount of deionized water (metal salt precipitating agent) is added to precipitate the polymer, etc. as a gelatinous precipitate of metal salts.

Then, this precipitate is separated by filtration and dried, and then it is calcined to obtain a powdered raw material with the composition $(Y_{0.9}Ca_{0.1})(Cr_{0.75}Fe_{0.2}Ti_{0.05})O_3$, the same composition as that of the thermistor device 1.

Next, in the second step, in the same manner as in working example 9 above, the powdered raw material thus obtained is subjected to the granulation and drying, molding and sintering steps to obtain the thermistor device 1 with lead wires 11 and 12 attached as a mixed sintered body. Thereafter, this thermistor device 1 assembled into a temperature sensor 100 in the same manner as in working example 9 above and was subjected to evaluation of its resistance value-temperature characteristics and temperature accuracy. Table 5 shows the results of evaluation. The temperature sensor 100 according to this example exhibited a temperature accuracy of ±5° C., which is an excellent value.

In addition, the results of AEM composition analysis and TEM observation were similar to those of working example 14 above, in that the crystal grains of $(Y_{0.9}Ca_{0.1})(Cr_{0.75}Fe_{0.2}Ti_{0.05})O_3$, which is the resistance value dominating phase, were found to be very fine grains on the order of several nm to several hundred nm which were uniformly dispersed/mixed in the composition.

Comparative Example 5

Figure 21:
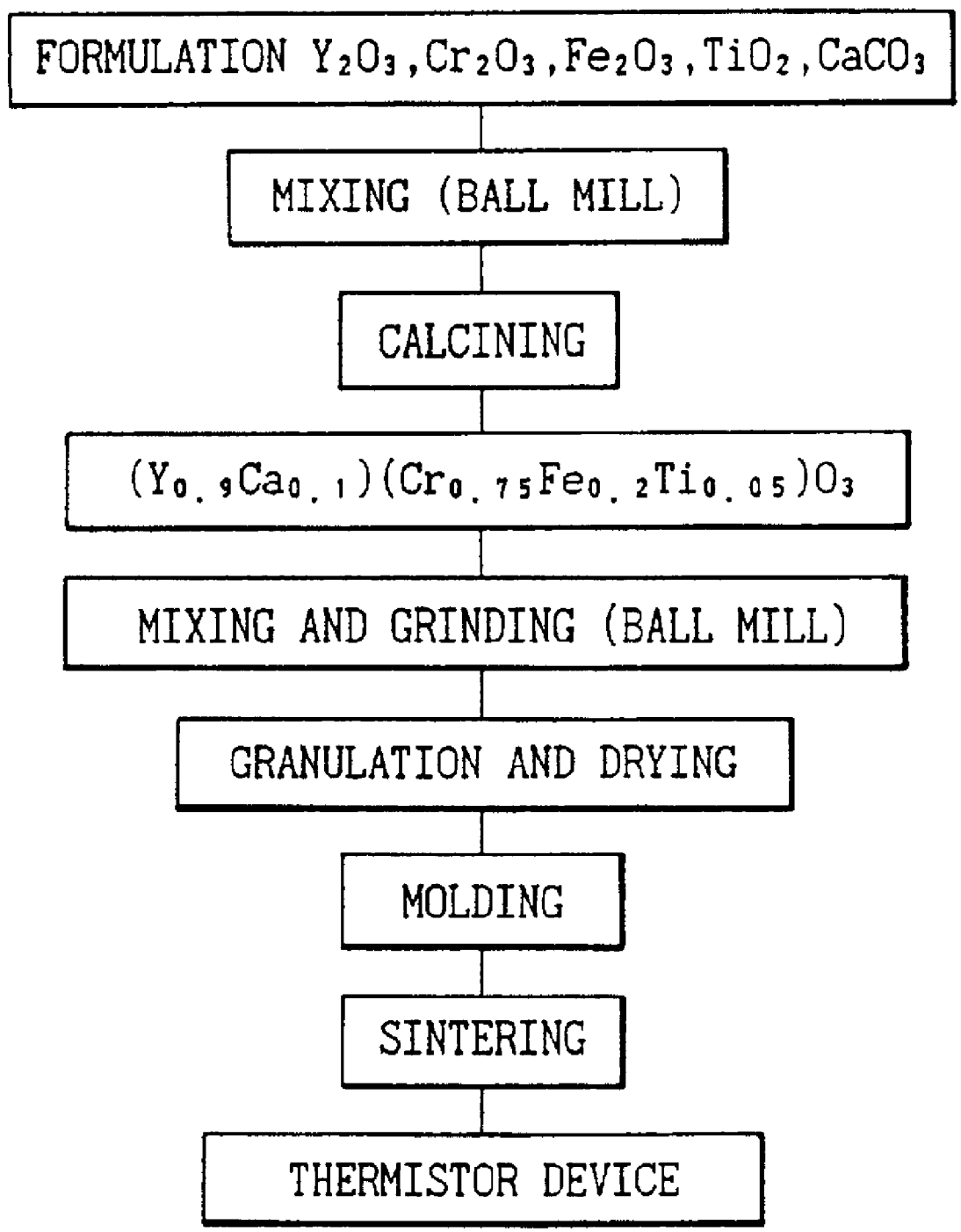
FIG. 21 is a diagram of the manufacturing process for the thermistor device of Comparative Example 5.

Comparative example 5 is an example of a method of manufacturing the thermistor device composition of $(Y_{0.9}Ca_{0.1})(Cr_{0.75}Fe_{0.2}Ti_{0.05})O_3$, the same composition as in working examples 14 and 15 above, but the conventional solid-phase method is used. In the solid-phase method of this example, the oxides $Y_2O_3$, $Cr_2O_3$, $Fe_2O_3$, $TiO_2$ and $CaCO_3$ are used as the raw materials. The mixing and grinding are performed with a conventional ball mill. FIG. 21 shows the manufacturing process of comparative example 5.

First, $Y_2O_3$, $Cr_2O_3$, $Fe_2O_3$, $TiO_2$ and $CaCO_3$ each with a purity of 99.9% or greater are prepared. In the formulation step, the materials are weighed out so that the composition of the calcine after the calcining step becomes $(Y_{0.9}Ca_{0.1})(Cr_{0.75}Fe_{0.2}Ti_{0.05})O_3$. Then, in the same manner as comparative example 3 above, the mixing step and calcining step are performed to obtain a calcine.

Next, in the same manner as in comparative example 3, the calcine thus obtained is subjected to mixing and grinding with a ball mill, and to the granulation, molding and sintering steps to obtain a thermistor device. The thermistor device thus obtained was assembled into a temperature sensor and its resistance value-temperature characteristics and temperature accuracy were evaluated. Table 6 shows the results of evaluation. The temperature sensor according to this comparative example 5 exhibited resistance value-temperature characteristics comparable to those of working examples 14 and 15 above, which are sintered bodies having the same composition, but its temperature accuracy was ±30° C., which is much worse.

In addition, AEM composition analysis was performed on the composition of the crystal grains of $(Y_{0.9}Ca_{0.1})$ $(Cr_{0.75}Fe_{0.2}Ti_{0.05})O_3$, which is the resistance value dominating phase, in the same manner as in the above. As a result, the composition was found to range from Y:Ca:Cr:Fe:Ti= 0.85:0.15:0.70:0.15:0.15 to Y:Ca:Cr:Fe:Ti= 0.93:0.07:0.78:0.21:0.01, compared to the ideal composition of Y:Ca:Cr:Fe:Ti=0.9:0.1:0.75:0.2:0.05, so the dispersion in composition was large, and this was determined to be the cause of the degradation of the temperature accuracy.

Working Example 16

Figure 22:
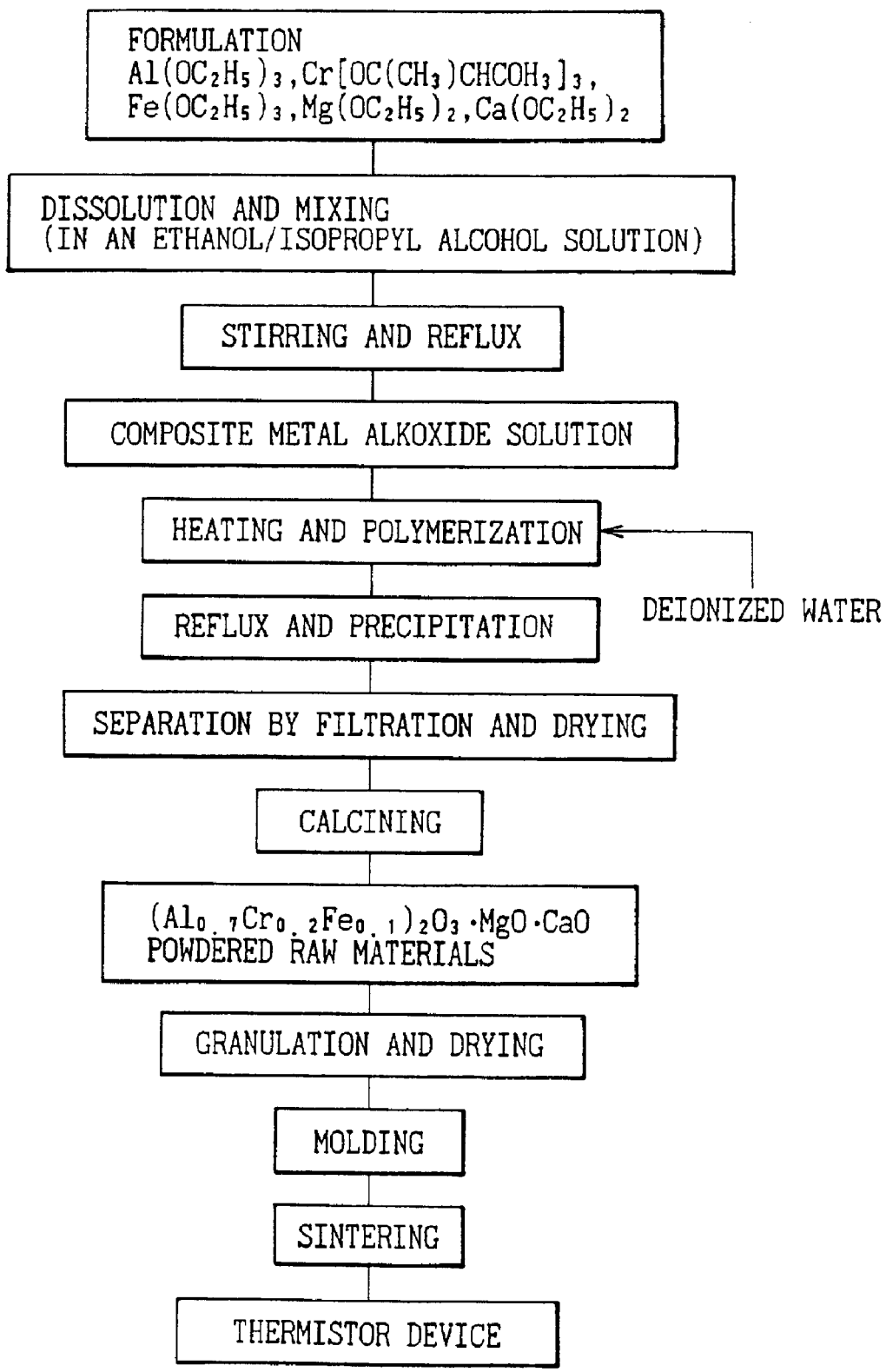
FIG. 22 is a diagram of the manufacturing process for the thermistor device of Working Example 16 of the present invention.

Working example 16 is an example whereby the powdered raw material for a thermistor device consisting of a mixed sintered body of the composition $(Al_{0.7}Cr_{0.2}Fe_{0.1})_2O_3 \cdot MgO \cdot CaO$ is synthesized in the first step by means of a liquid-phase method using organometallic compounds as the precursor compounds in the same manner as in working example 9 above. FIG. 22 shows the manufacturing process of this working example 16. In FIG. 22, the portion from the formulation step to the calcining step is equivalent to the first step, and the portion from the granulation and drying step to the sintering step is equivalent to the second step.

First, in the first step, the metal alkoxides of triethoxy aluminum $(Al(OC_2H_5)_3)$, tris (2,4-pentadiono) chromium $(Cr[OC(CH_3)CHCOCH_3]_3)$ and triethoxy iron $(Fe(OC_2H_5)_3)$, each with a purity of 99.9% or greater are prepared as the three precursor compounds which serve as the starting material. Next, in the formulation step, the aforementioned three precursor compounds are weighed out so that the ultimate composition of the thermistor device becomes $(Al_{0.7}Cr_{0.2}Fe_{0.1})O_3 \cdot MgO \cdot CaO$.

Moreover, in order to add the raw materials of Mg and Ca as sintering aid components in the form of organometallic compounds similar to those for the aforementioned starting material diethoxy magnesium $(Mg(OC_2H_5)_2)$ and diethoxy calcium $(Ca(OC_2H_5)_2)$ are weighed out so that each comprises 2 wt. % of the $(Al_{0.7}Cr_{0.2}Fe_{0.1})_2O_3$.

Next, in the dissolution and mixing step, the starting material thus weighed out is dissolved and mixed in a solvent mixture of ethanol and isopropyl alcohol 10 times the amount of starting material by weight. In the stirring and reflux step, refluxing is performed for 10 hours at 40–80° C. to obtain a composite metal alkoxide solution (referred to in the present invention as the liquid mixture).

Next, in the heating and polymerization step, the metal salt precipitating agent of deionized water is added in order to hydrolyze this composite metal alkoxide solution and then the solution is stirred and mixed. Moreover, in the reflux and precipitation step, refluxing is performed for 2–4 hours at 40–60° C. to obtain a gelatinous precipitate of a composite of metallic salts. Then, after this precipitate is separated by filtration and dried, it is calcined to obtain a powdered raw material with the composition $(Al_{0.7}Cr_{0.2}Fe_{0.1})_2O_3 \cdot MgO \cdot CaO$, the same composition as that of the thermistor device 1.

Next, in the second step, in the same manner as in working example 9 above, the powdered raw material thus obtained is subjected to the granulation and drying, molding and sintering steps to obtain the thermistor device 1 with lead wires 11 and 12 attached as a mixed sintered body. Thereafter, this thermistor device 1 assembled into a temperature sensor 100 in the same manner as in working example 9 above and was subjected to evaluation of its resistance value-temperature characteristics and temperature accuracy. Table 5 shows the results of evaluation. The temperature sensor 100 according to this example exhibited a temperature accuracy of ±5° C., which is an excellent value.

In addition, AEM composition analysis was performed on the composition of the crystal grains of $(Al_{0.7}Cr_{0.2}Fe_{0.1})_2O_3$, which is the resistance value dominating phase, in the same manner as above. As a result, the composition of the crystal grains was found to range from Al:Cr:Fe=0.7:0.2:0.1 to Al:Cr:Fe=0.69:0.21:0.1, so almost none of the conventional dispersion in composition from the ideal composition was seen, and thus uniformity of composition on the atomic and molecular order was found.

In addition, as a result of TEM observation as in the above, the various crystal grains of $(A_{0.7}Cr_{0.2}Fe_{0.1})_2O_3$, MgO and CaO were found to be very fine grains on the order of several nm to several hundred nm.

Working Example 17

Figure 23:
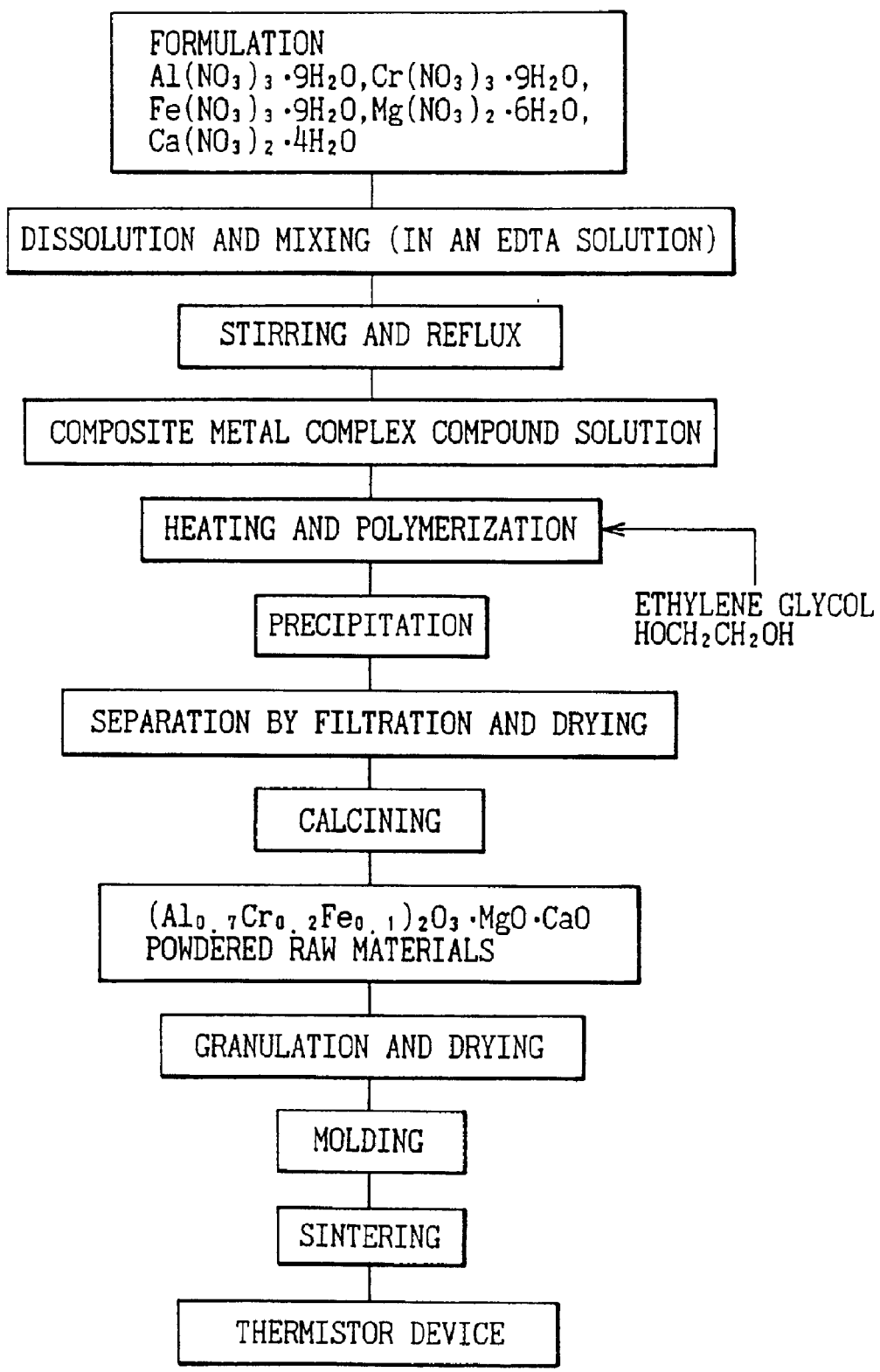
FIG. 23 is a diagram of the manufacturing process for the thermistor device of Working Example 17 of the present invention.

Working example 17 is an example whereby the powdered raw material for thermistor device 1 consisting of a mixed sintered body of the composition $(Al_{0.7}Cr_{0.2}Fe_{0.1})_2O_3 \cdot MgO \cdot CaO$ is synthesized as in the aforementioned working example 14, but this is performed by means of a liquid-phase method whereby the precursor compounds are mixed in a solution in which the complexing compound EDTA is dissolved. FIG. 23 shows the manufacturing process of this working example 17.

In FIG. 23, the portion from the formulation step to the calcining step is equivalent to the first step, and the portion from the granulation and drying step to the sintering step is equivalent to the second step. First, the nitrates (inorganic metallic compounds) aluminum nitrate $(Al(NO_3)_3 \cdot 9H_2O)$, chromium nitrate $(Cr(NO_3)_3 \cdot 9H_2O)$ and iron nitrate $(Fe(NO_3)_3 \cdot 9H_2O)$, each with a purity of 99.9% or greater are prepared as the three precursor compounds which serve as the starting material.

Next, in the formulation step, the aforementioned three precursor compounds are weighed out so that the ultimate composition of the thermistor device 1 becomes $(Al_{0.7}Cr_{0.2}Fe_{0.1})_2O_3 \cdot MgO \cdot CaO$. Moreover, in order to add the raw materials of Mg and Ca as sintering aid components in the form of inorganic metallic compounds similar to those for the aforementioned starting material, magnesium nitrate $(Mg(NO_3)_2 \cdot 6H_2O)$ and calcium nitrate $(Ca(NO_3)_2 \cdot 4H_2O)$ are weighed out so that they comprise 2 wt. % and 2 wt. %, respectively, of the $(Al_{0.7}Cr_{0.2}Fe_{0.1})_2O_3 \cdot MgO \cdot CaO$.

Next, in the dissolution and mixing step, EDTA in an amount three times by weight of that of the starting material is dissolved in an appropriate amount of deionized water. The aforementioned starting material is dissolved in this EDTA solution to form the liquid mixture as referred to in the present invention. Next, in the mixing and reflux step, in this liquid mixture, the various metal ions (Al, Cr, Fe, Mg, Ca) react with the EDTA to prepare a composite metal complex compound in which these metal ions are coordinated and bound to the coordination sites of the EDTA.

Next, in the heating and polymerization step, in order to cause a polymerization reaction in this composite metal complex compound and obtain a precipitate of the metal salts, the metal salt precipitating agent of ethylene glycol is added in excess of the minimum amount required to cause the polymerization reaction and then the solution is stirred and mixed. Thereafter, this liquid mixture is heated to 80–120° C. to advance the polymerization reaction. Next, in the precipitation step, heating is halted at the point when the polymerization reaction has advanced sufficiently, and an appropriate amount of deionized water (metal salt precipitating agent) is added to precipitate the polymer, etc. as a gelatinous precipitate of metal salts.

Then, this precipitate is separated by filtration and dried, and then it is calcined to obtain a powdered raw material with the composition $(Al_{0.7}Cr_{0.2}Fe_{0.1})_2O_3 \cdot MgO \cdot CaO$, the same composition as that of the thermistor device 1.

Next, in the second step, in the same manner as in working example 9 above, the powdered raw material thus obtained-is subjected to the granulation and drying, molding and sintering steps to obtain the thermistor device 1 with lead wires 11 and 12 attached as a mixed sintered body. Thereafter, this thermistor device 1 assembled into a temperature sensor 100 in the same manner as in working example 9 above and was subjected to evaluation of its resistance value-temperature characteristics and temperature accuracy. Table 5 shows the results of evaluation. The temperature sensor 100 according to this example exhibited a temperature accuracy of ±5° C., which is an excellent value.

In addition, the results of AEM composition analysis and TEM observation were similar to those of working example 14 above, in that the crystal grains of $(Al_{0.7}Cr_{0.2}Fe_{0.1})_2O_3$, which is the resistance value dominating phase, were found to have a uniform composition on the molecular and atomic order. In addition, the crystal grains of $(Al_{0.7}Cr_{0.2}Fe_{0.1})_2O_3$, MgO, and CaO were found to be very fine crystal grains on the order of several nm to several hundred nm.

Comparative Example 6

Figure 24:
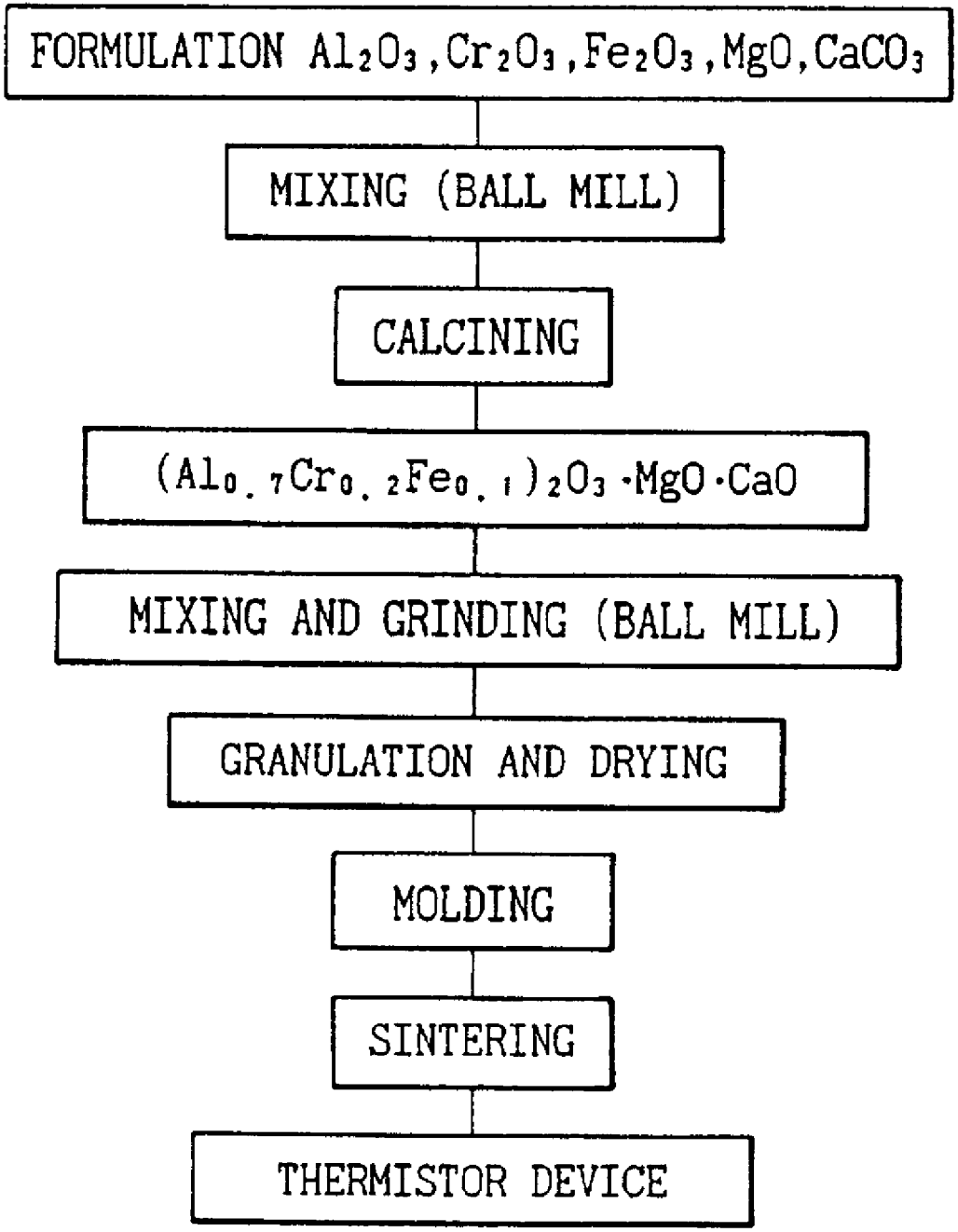
FIG. 24 is a diagram of the manufacturing process for the thermistor device of Comparative Example 6.

Comparative example 6 is an example of a method of manufacturing the thermistor device composition of $(Al_{0.7}Cr_{0.2}Fe_{0.1})_2O_3 \cdot MgO \cdot CaO$, the same composition as in working examples 16 and 17 above, but the conventional solid-phase method is used. In the solid-phase method of this example, the oxides $Al_2O_3$, $Cr_2O_3$, $Fe_2O_3$, MgO and $CaCO_3$ are used as the raw materials. The mixing and grinding are performed with a conventional ball mill. FIG. 24 shows the manufacturing process of comparative example 6.

First, $Al_2O_3$, $Cr_2O_3$, $Fe_2O_3$, MgO and $CaCO_3$ each with a purity of 99.9% or greater are prepared. In the formulation step, the materials are weighed out so that the composition of the calcine after the calcining step becomes $(Al_{0.7}Cr_{0.2}Fe_{0.1})_2O_3 \cdot MgO \cdot CaO$. Then, in the same manner as comparative example 3 above, the mixing step and calcining step are performed to obtain a calcine.

Next, in the same manner as in comparative example 3, the calcine thus obtained is subjected to mixing and grinding with a ball mill, and to the granulation, molding and sintering steps to obtain a thermistor device. The thermistor device thus obtained was assembled into a temperature sensor and its resistance value-temperature characteristics and temperature accuracy were evaluated. Table 6 shows the results of evaluation. The temperature sensor according to this comparative example 6 exhibited resistance value-temperature characteristics comparable to those of working examples 16 and 17 above, which are sintered bodies having the same composition, but its temperature accuracy was ±30° C., which is much worse.

In addition, AEM composition analysis was performed on the composition of the crystal grains of $(Al_{0.7}Cr_{0.2}Fe_{0.1})_2O_3$, which is the resistance value dominating phase, in the same manner as in the above. As a result, the composition was found to range from Al:Cr:Fe=0.78:0.17:0.05 to Al:Cr:Fe= 0.65:0.23:0.12, compared to the ideal composition of Al:Cr:Fe=0.7:0.2:0.1, so the dispersion in composition was large, and this was determined to be the cause of the degradation of the temperature accuracy.

TABLE 5

| | | Resistance value (kΩ) | | Resistance- | |
|---|---|---|---|---|---|
| | Thermistor raw material composition | Room temperature (27° C.) | 1000° C. | temperature coefficient β (K) | Temperature accuracy A (° C.) |
| Working 9 example | $38Y(Cr_{0.5}Mn_{0.5})O_3 \cdot 62Y_2O_3$ | 50 | 0.07 | 2580 | ±3 |
| Working 10 example | $38Y(Cr_{0.5}Mn_{0.5})O_3 \cdot 62Y_2O_3$ | 50 | 0.07 | 2580 | ±3 |
| Working 11 example | $38Y(Cr_{0.5}Mn_{0.5})O_3 \cdot 62Y_2O_3$ | 50 | 0.07 | 2580 | ±5 |
| Working 12 example | $40Y(Cr_{0.5}Mn_{0.5})O_3 \cdot 60Al_2O_3$ | 50 | 0.07 | 2580 | ±2 |
| Working 13 example | $40Y(Cr_{0.5}Mn_{0.5})O_3 \cdot 60Al_2O_3$ | 50 | 0.07 | 2580 | ±2 |
| Working 14 example | $(Y_{0.9}Ca_{0.1})(Cr_{0.75}Fe_{0.2}Ti_{0.05})O_3$ | 300 | 0.1 | 3140 | ±5 |
| Working 15 example | $(Y_{0.9}Ca_{0.1})(Cr_{0.75}Fe_{0.2}Ti_{0.05})O_3$ | 300 | 0.1 | 3140 | ±5 |
| Working 16 example | $(Al_{0.7}Cr_{0.2}Fe_{0.1})_2O_3 \cdot MgO \cdot CaO$ | 600 | 0.3 | 2980 | ±5 |
| Working 17 example | $(Al_{0.7}Cr_{0.2}Fe_{0.1})_2O_3 \cdot MgO \cdot CaO$ | 600 | 0.3 | 2980 | ±5 |

TABLE 6

| Thermistor raw material composition | Resistance value (kΩ) Room temperature (27° C.) | 1000° C. | Resistance-temperature coefficient $\beta$ (K) | Temperature accuracy A (° C.) |
|---|---|---|---|---|
| Comparative example 3 | $38Y(Cr_{0.5}Mn_{0.5})O_3.62Y_2O_3$ | 50 | 0.07 | 2580 | ±25.0 |
| Comparative example 4 | $40Y(Cr_{0.5}Mn_{0.5})O_3.60Al_2O_3$ | 50 | 0.07 | 2580 | ±23.0 |
| Comparative example 5 | $(Y_{0.9}Ca_{0.1})(Cr_{0.75}Fe_{0.2}Ti_{0.05})O_3$ | 300 | 0.1 | 3140 | ±30.0 |
| Comparative example 6 | $(Al_{0.7}Cr_{0.2}Fe_{0.1})_2O_3.MgO.CaO$ | 600 | 0.3 | 2980 | ±30.0 |

Working Example 18

Working example 18 is an example whereby the powdered raw material for thermistor device 1 consisting of a mixed sintered body of $38Y(Cr_{0.5}Mn_{0.5})O_3.62Y_2O_3$ is obtained, but this is performed by means of a liquid-phase method wherein the complex-forming agent citric acid is used as the composite complexing compound and ethylene glycol is used as the polymerizing agent. FIG. 18 shows the manufacturing process of this working example 18. In FIG. 18, the portion from the formulation step to the calcining step is equivalent to the first step, and the portion from the granulation and drying step to the sintering step is equivalent to the second step.

In the first step, first, the nitrates (inorganic metallic compounds) yttrium nitrate ($Y(NO_3)_3.6H_2O$), manganese nitrate ($Mn(NO_3)_2.6H_2O$) and chromium nitrate ($Cr(NO_3)_3.9H_2O$), each with a purity of 99.9% or greater are prepared as the three precursor compounds which serve as the starting material.

Next, in the formulation step, the aforementioned three precursor compounds are weighed out so that the ultimate composition of the thermistor device 1 becomes $38Y(Cr_{0.5}Mn_{0.5})O_3.62Y_2O_3$. Moreover, in order to add Ca as the sintering aid component to the aforementioned starting material, the inorganic metallic compound calcium nitrate ($Ca(NO_3)_2.4H_2O$) is weighed out so that it comprises 5 wt. % of the $38Y(Cr_{0.5}Mn_{0.5})O_3.62Y_2O_3$.

Next, in the dissolution and mixing step, first, 60 g of citric acid is dissolved in 2 liters of deionized water to obtain a citric acid solution wherein, if e is the number of moles of citric acid and f is the total number of moles of all of the constituent elements Y, Cr and Mn of the composition, then the citric acid concentration is e/f=1 (this is defined to be one times by mole).

Next, in the stirring and reflux step, the aforementioned starting material and calcium nitrate are added to this citric acid solution, where the various metal ions (Y, Cr, Mn, Ca) react with the citric acid to form a composite metal complex compound in which these metal ions are coordinated and bound to the coordination sites of the citric acid.

Next, in the heating and polymerization step, in order to cause a polymerization reaction in this composite metal complex compound and obtain a precipitate of the metal salts, 100 ml of the polymerizing agent of ethylene glycol is added. Thereafter, this liquid mixture is heated to 80–200° C. to advance the polymerization reaction. Then, heating is halted at the point when the polymerization reaction has advanced sufficiently, to obtain a gelatinous viscous liquid.

Then, in the drying step, this polymer is placed in a crucible of 99.7% $Al_2O_3$ and dried, and in the heat treatment step, it is heat treated at 600–1000° C. to obtain a composition with a composition $38Y(Cr_{0.5}Mn_{0.5})O_3.62Y_2O_3$, the same as that of the thermistor device 1.

Next, in the second step, processing is performed in the same manner as in working example 9 above, so that the powdered raw material thus obtained is granulated. These granules are used in the molding and sintering steps to obtain the thermistor device 1 with lead wires 11 and 12 attached as a mixed sintered body.

Thereafter, this thermistor device 1 assembled into a temperature sensor 100 in the same manner as in working example 9 above and was subjected to evaluation of its resistance value-temperature characteristics (resistance value and resistance-temperature coefficient β) and temperature accuracy (±A° C.). Table 7 shows the results of evaluation together with the citric acid concentration. Note that Table 7 also shows the results of evaluation of working examples 19–23 below. The temperature sensor 100 according to this example exhibited a temperature accuracy of ±5° C., which is an excellent value.

In addition, the thermistor device 1 of this example was subjected to quantitative analysis of the various constituent elements of Y, Cr and Mn by means of electron probe mass analysis (EPMA). The results are given in Table 8. Note that Table 8 also shows the results of analysis of working examples 19–23 below, along with the results of analysis of the aforementioned comparative example 3.

As is evident from Table 8, the dispersion in composition of the various constituent elements (standard deviation σ; units of at %) was found to be decreased to roughly ½ that of the conventional solid-phase method. In addition, in the conventional solid-phase method (comparative example 3), the dispersion in composition was larger than in the liquid-phase method, so this increase in dispersion in composition was confirmed to cause the degradation of temperature accuracy.

Working Example 19

Figure 25:
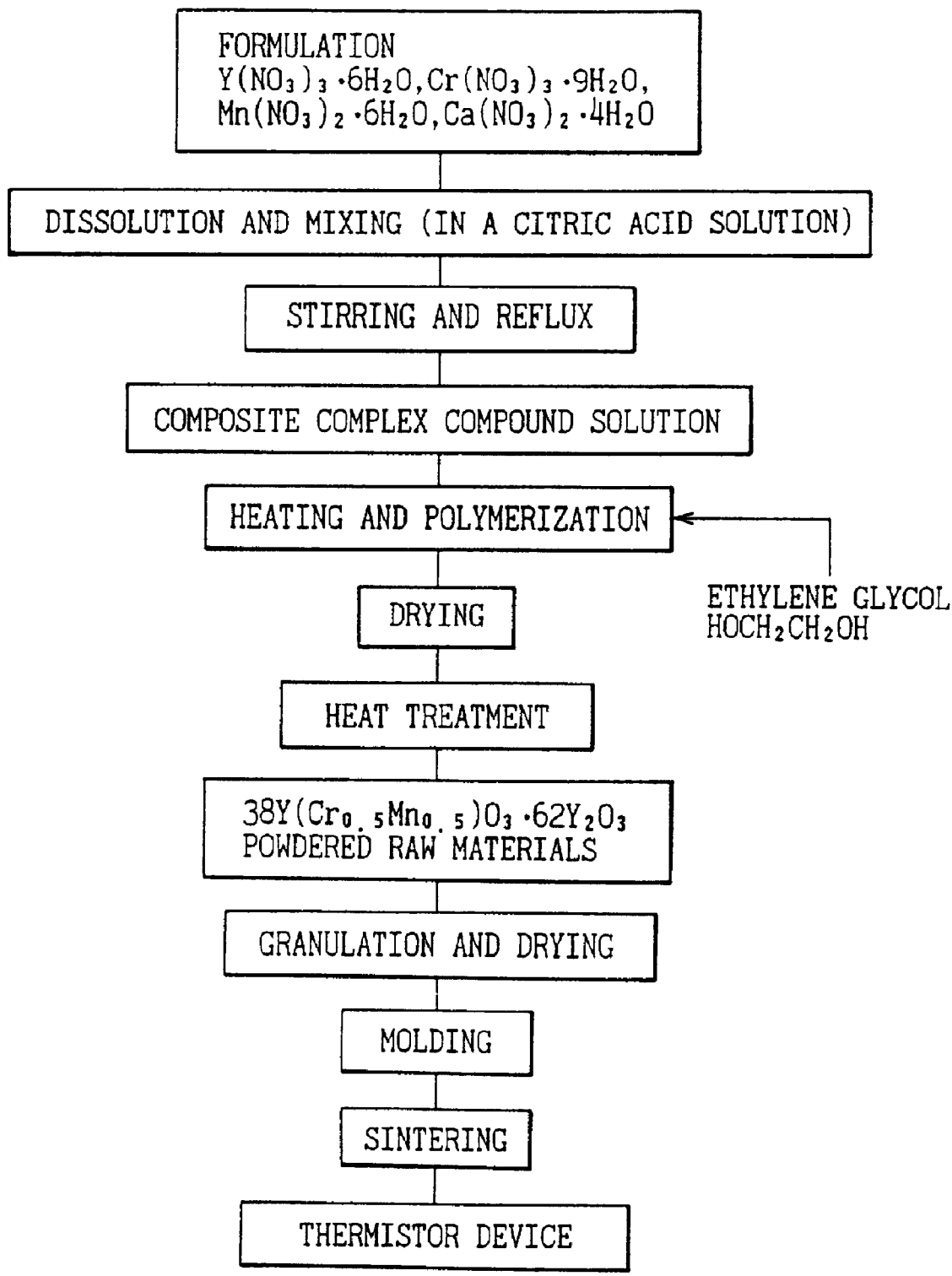
FIG. 25 is a diagram of the manufacturing process for the thermistor device of Working Examples 18–23 of the present invention.

Working example 19 is an example whereby the powdered raw material for thermistor device 1 consisting of a mixed sintered body of $38Y(Cr_{0.5}Mn_{0.5})O_3.62Y_2O_3$ is obtained by the same manufacturing process as in working example 18 above shown in FIG. 25, except that the concentration of the complex-forming agent citric acid is changed to two times by mole. The precursors of the constituent elements are reacted with this citric acid to obtain the powdered raw material.

The powdered raw material thus obtained is used in the aforementioned second step to obtain the thermistor device 1 with lead wires 11 and 12 attached as a mixed sintered body of $38Y(Cr_{0.5}Mn_{0.5})O_3 \cdot 62Y_2O_3$. This thermistor device 1 assembled into a temperature sensor 100 was subjected to evaluation of its resistance value-temperature characteristics (resistance value and resistance-temperature coefficient β) and temperature accuracy (±A° C.) in the same manner as in working example 9 above (see Table 7).

The temperature sensor 100 according to this example in which the citric acid concentration was set to 2 times by mole exhibited a temperature accuracy of ±4° C., which was an excellent value. In addition, in this example also, the results of EPMA analysis (see Table 8) confirmed that the dispersion in the composition of constituent elements was reduced to roughly ⅓ of that according to the conventional solid-phase method.

Working Example 20

Working example 20 is an example whereby the powdered raw material for thermistor device 1 consisting of a mixed sintered body of $38Y(Cr_{0.5}Mn_{0.5})O_3 \cdot 62Y_2O_3$ is obtained by the same manufacturing process as in working example 18 above shown in FIG. 25, except that the concentration of the complex-forming agent citric acid is changed to four times by mole. The precursors of the constituent elements are reacted with this citric acid to obtain the powdered raw material.

The powdered raw material thus obtained is used in the aforementioned second step to obtain the thermistor device 1 with lead wires 11 and 12 attached as a mixed sintered body of $38Y(Cr_{0.5}\ Mn_{0.5})O_3 \cdot 62Y_2O_3$. This thermistor device 1 assembled into a temperature sensor 100 was subjected to evaluation of its resistance value-temperature characteristics and temperature accuracy (±A° C.) in the same manner as in working example 9 above (see Table 7).

The temperature sensor 100 according to this example in which the citric acid concentration was set to four times by mole exhibited a temperature accuracy of ±3° C., which was an excellent value. In addition, in this example also, the results of EPMA analysis (see Table 8) confirmed that the dispersion in the composition of constituent elements was reduced to roughly ⅓ to ¼ of that according to the conventional solid-phase method.

Working Example 21

Working example 21 is an example whereby the powdered raw material for thermistor device 1 consisting of a mixed sintered body of $38Y(Cr_{0.5}Mn_{0.5})O_3 \cdot 62Y_2O_3$ is obtained by the same manufacturing process as in working example 18 above shown in FIG. 25, except that the concentration of the complex-forming agent citric acid is changed to ten times by mole. The precursors of the constituent elements are reacted with this citric acid to obtain the powdered raw material.

The powdered raw material thus obtained is used in the aforementioned second step to obtain the thermistor device 1 with lead wires 11 and 12 attached as a mixed sintered body of $38Y(Cr_{0.5}Mn_{0.5})O_3 \cdot 62Y_2O_3$. This thermistor device 1 assembled into a temperature sensor 100 was subjected to evaluation of its resistance value-temperature characteristics and temperature accuracy (±A° C.) in the same manner as in working example 9 above (see Table 7).

The temperature sensor 100 according to this example in which the citric acid concentration was set to ten times by weight exhibited a temperature accuracy of ±1.5° C., which was an excellent value. In addition, in this example also, the results of EPMA analysis (see Table 8) confirmed that the dispersion in the composition of constituent elements was reduced to roughly ¼ of that according to the conventional solid-phase method.

Working Example 22

Working example 22 is an example whereby the powdered raw material for thermistor device 1 consisting of a mixed sintered body of $38Y(Cr_{0.5}Mn_{0.5})O_3 \cdot 62Y_2O_3$ is obtained by the same manufacturing process as in working example 18 above shown in FIG. 25, except that the concentration of the complex-forming agent citric acid is changed to twenty times by mole. The precursors of the constituent elements are reacted with this citric acid to obtain the powdered raw material.

The powdered raw material thus obtained is used in the aforementioned second step to obtain the thermistor device 1 with lead wires 11 and 12 attached as a mixed sintered body of $38Y(Cr_{0.5}Mn_{0.5})O_3 \cdot 62Y_2O_3$. This thermistor device 1 assembled into a temperature sensor 100 was subjected to evaluation of its resistance value-temperature characteristics and temperature accuracy (±A° C.) in the same manner as in working example 9 above (see Table 7).

The temperature sensor 100 according to this example in which the citric acid concentration was set to twenty times by mole exhibited a temperature accuracy of ±1.5° C., which was an excellent value. In addition, in this example also, the results of EPMA analysis (see Table 8) confirmed that the dispersion in the composition of constituent elements was reduced to roughly ¼ of that according to the conventional solid-phase method.

Working Example 23

Working example 23 is an example whereby the powdered raw material for thermistor device 1 consisting of a mixed sintered body of $38Y(Cr_{0.5}Mn_{0.5})O_3 \cdot 62Y_2O_3$ is obtained by the same manufacturing process as in working example 18 above shown in FIG. 25, except that the concentration of the complex-forming agent citric acid is changed to thirty times by mole. The precursors of the constituent elements are reacted with this citric acid to obtain the powdered raw material.

Note that when the citric acid concentration is up to twenty times by mole as in the aforementioned working examples 18–23, the polymer thus obtained was a gelatinous viscous liquid, but when the citric acid concentration becomes 30 times by weight as in this example, the polymer does not become a gelatinous viscous liquid, but rather a portion becomes a fixed colloidal sol dispersed within the liquid.

Therefore, in order to prevent dispersion from the ideal thermistor composition in the aforementioned drying step, the entire amount of the fixed sol and liquid was placed in the aforementioned alumina crucible and dried. Thus, through the heat treatment process, the powdered raw material with a composition of $38Y(Cr_{0.5}Mn_{0.5})O_3 \cdot 62Y_2O_3$, the same as that of the thermistor device 1, is obtained.

The powdered raw material thus obtained is used in the aforementioned second step to obtain the thermistor device 1 with lead wires 11 and 12 attached as a mixed sintered body of $38Y(Cr_{0.5}Mn_{0.5})O_3 \cdot 62Y_2O_3$. This thermistor device 1 assembled into a temperature sensor 100 was subjected to evaluation of its resistance value-temperature characteristics and temperature accuracy (±A° C.) in the same manner as in working example 9 above (see Table 7).

The temperature sensor 100 according to this example in which the citric acid concentration was set to thirty times by mole exhibited a temperature accuracy of ±8° C., which was an excellent value. In addition, in this example also, the results of EPMA analysis (see Table 8) confirmed that the dispersion in the composition of constituent elements was reduced to roughly ½ of that according to the conventional solid-phase method.

TABLE 7

|  | Citric acid concentration | Resistance value (kΩ) | | Resistance-temperature coefficient β (K) | Temperature accuracy A (° C.) |
| --- | --- | --- | --- | --- | --- |
|  |  | Room temperature (27° C.) | 1000° C. |  |  |
| Working example 18 | 1 time by mole | 50 | 0.07 | 2580 | ±5 |
| Working example 19 | 2 times by mole | 50 | 0.07 | 2580 | ±4 |
| Working example 20 | 4 times by mole | 50 | 0.07 | 2580 | ±3 |
| Working example 21 | 10 times by mole | 50 | 0.07 | 2580 | ±1.5 |
| Working example 22 | 20 times by mole | 50 | 0.07 | 2580 | ±1.5 |
| Working example 23 | 30 times by mole | 100 | 0.20 | 2440 | ±8 |

TABLE 8

|  | Citric acid concentration | Composition dispersion σ (at %) | | |
| --- | --- | --- | --- | --- |
|  |  | Y | Cr | Mn |
| Working example 18 | 1 time by mole | 0.64 | 0.31 | 0.19 |
| Working example 19 | 2 times by mole | 0.46 | 0.29 | 0.14 |
| Working example 20 | 4 times by mole | 0.36 | 0.25 | 0.10 |
| Working example 21 | 10 times by mole | 0.32 | 0.23 | 0.10 |
| Working example 22 | 20 times by mole | 0.31 | 0.23 | 0.10 |
| Working example 23 | 30 times by mole | 0.60 | 0.32 | 0.21 |
| Comparative example 3 | — | 1.22 | 0.68 | 0.39 |

Examples of Other Modifications of the Second Aspect

Here follows a description of other embodiments and other working examples of the second aspect.

In the aforementioned working examples 9 and the like, organometallic compounds of metal alkoxides are used as the precursor substances, and an alcohol-containing liquid is used as the solvent, but it is also possible to use other organometallic compounds that are stable when present in benzene, xylene or other aromatic solvents, for example, SYM-Y01 (trademark, made by Symetrix Corp.) or the like can be used for the Y (yttrium) compound. Moreover, it is also possible to use inorganic metallic compounds that are stable when present in organic ester solvents, for example, Y-03 (trademark, made by Kojundo Chemical Laboratory Co., Ltd.) or the like can be used for the Y compound.

Moreover, in the aforementioned working examples 9 and the like, organometallic compounds of metal alkoxides of single metals are used as the precursor substances, but it is also possible to use metal alkoxides of multiple metallic elements such as a metal alkoxide containing Y, Cr and Mn (a composite alkoxide), or a composite alkoxide containing Y, Ca, Cr, Fe and Ti, or a composite alkoxide containing Al, Cr and Fe and a composite alkoxide containing Mg and Ca to prepare the powdered thermistor raw material in the same manner as in the aforementioned working example 9.

In addition, in the aforementioned working examples 10, 13, 15 and 17, EDTA is used as the complexing compound, but other complexing compounds that are able to coordinate metal ions may be used, for example, citric acid, acetate, oxalate, stearate or the like can be used to prepare the powdered thermistor raw material in the same manner as in the aforementioned working example 10.

In addition, in the aforementioned working examples 9–23, a cylindrical, compact bulk-type thermistor device 1 with dimensions of 1.6 mm in diameter and 1.2 mm long, for example, is obtained, but in the present invention, the shape of the thermistor device 1 does not matter. For example, it is possible to add binders, resin materials or the like which are mixed into the raw material for the thermistor device, to adjust its viscosity or hardness to be suitable for sheet forming, and thus obtain a sheet-shaped thermistor sheet with a thickness of 200 μm. The thickness of five of these sheets laminated together becomes 1 mm, so the same meritorious effects of the aforementioned working examples can be obtained with a laminated sheet type thermistor device with lead wires attached.

In addition, it is possible to add binders, resin materials or the like which are mixed into the raw material for the thermistor device, to adjust its viscosity or hardness to be suitable for extrusion molding, and thus use extrusion molding to obtain a molded thermistor device with holes formed for attaching lead wires, and then insert the lead wires and sinter to obtain a thermistor device with lead wires attached, so the same performance as in the aforementioned working examples can be obtained.

In addition, in the aforementioned working examples 9–17, only single types of compounds were used as the precursor substances, namely organometallic compounds, complexing compounds, or inorganic metallic compounds, but as long as raw materials of a uniform composition can be obtained, it is possible to use a combination of precursors, such as a combination of inorganic metallic compounds and organometallic compounds as the precursor compounds in the starting material, or a combination of organometallic compounds and complexing compounds as the precursor compounds in the starting material.

In addition, in the aforementioned working examples 9–17, the precursor compounds are mixed and dissolved in alcohol, deionized water or various other solvents, but in order to achieve the uniform mixing of the liquid mixture of precursor compounds to be prepared, other dispersion media or dispersing agents, or acids or bases to adjust the pH (hydrogen ion concentration) may be added and obtain the raw material for the thermistor device.

In addition, in the aforementioned working examples 9–11, the $Y(Cr_{0.5}Mn_{0.5})O_3$, which is the resistance value dominating phase, and the $Y_2O_3$, which is the high-resistance phase, are mixed and dissolved together by means of the precursor compounds to obtain the powdered raw material that has the ideal composition of the thermistor device, but it is also possible to prepare only the resistance value dominating phase by means of the liquid-phase method to obtain at powdered raw material and mix this powdered raw material with other compositions by means of a ball mill or other solid-phase method. Even in this case, the temperature accuracy can be improved in comparison with a thermistor device obtained by means of the conventional solid-phase method.

In addition, in the aforementioned embodiments, the powdered raw material is prepared by means of a chemical liquid-phase method whereby a metal salt precipitating agent is added to a liquid mixture of the precursor compounds, but mist pyrolysis methods, pyrolysis methods, freeze-drying methods, solvent combustion methods or other physical liquid-phase methods can also be used to prepare the thermistor powdered raw materials. Even in this case, the dispersion in composition can be suppressed and the temperature accuracy can be improved in comparison with a thermistor device obtained by means of the conventional solid-phase method. This method should be said to be the third aspect, rather than the second aspect.

Working Example 24

Working example 24 is an example of using $Y_2O_3$ (raw material for M1) and $Cr_2O_3$ and $Mn_2O_3$ (both raw materials for M2) as the raw materials used to obtain the thermistor portion 13 consisting of a mixed sintered body of $38Y(Cr_{0.5}Mn_{0.5})O_3 \cdot 62Y_2O_3$ (a=0.38, b=0.62), and forming an anti-reducing coating 14 of $Y_2O_3$ (anti-reducing material) on the surface of this thermistor portion 13 (see FIG. 26).

Figure 29:
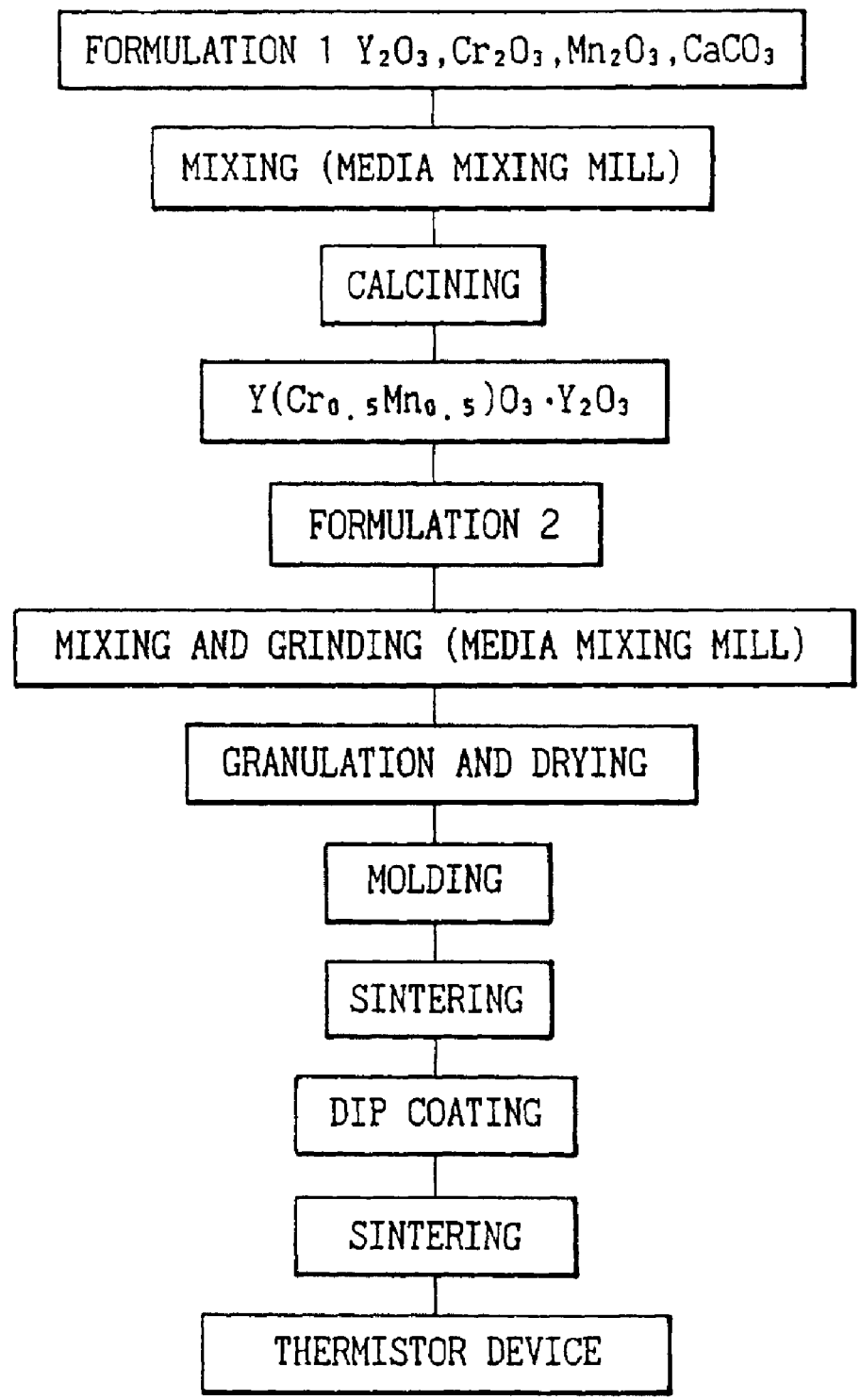
FIG. 29 is a diagram of the manufacturing process for the thermistor device of Working Examples 24–25 of the present invention.

FIG. 29 shows the manufacturing process for the thermistor device of this working example 24. Note that FIG. 29 also shows the manufacturing process of working examples 25–28.

The materials $Y_2O_3$, $Cr_2O_3$, $Mn_2O_3$ and $CaCO_3$, each with a purity of 99.9% or greater, are prepared. In formulation 1, in order to obtain the desired resistance value and resistance-temperature coefficient in the thermistor device 1, the $Y_2O_3$, $Cr_2O_3$ and $Mn_2O_3$ are weighed out so that the a and b of $aY(Cr_{0.5}Mn_{0.5})O_3 \cdot bY_2O_3$ have the relationship a:b=38:62 and the total weight is 2000 g. Moreover, 36 g of $CaCO_3$ is added to give a raw material mixture of $Y_2O_3$, $Cr_2O_3$, $Mn_2O_3$ and $CaCO_3$ with a total weight of 2036 g.

Next, in the mixing step, in order to perform fine grinding of the thermistor raw materials, a media mixing mill is used. The media mixing mill in this example is a pearl mill (manufactured by Ashizawa Co., Ltd., model RV1V, effective capacity: 1.0 liter, actual capacity: 0.5 liter). The grinding conditions for this pearl mill require the use of 3.0 kg of zirconia balls 0.5 mm in diameter as the grinding media, and that 80% of the volume of the mixing chamber be filled with zirconia balls.

The operating conditions are set to a peripheral speed of 12 m/sec and a rotation speed of 3110 rpm. Note that 4.5 liters of distilled water were used as the dispersion agent for the 2036 g of raw material to be mixed, and the binder and dispersion agent were added simultaneously and then mixing and grinding were performed for 10 hours. A binder of polyvinyl alcohol (PVA) was added in the amount of 20 g per 2036 g of raw material to be mixed. The raw material slurry after the mixing and grinding process was evaluated using a laser granulometer, and the results indicated that the average grain size was 0.4 μm (micrometer).

The raw material slurry thus obtained is dried in a spray dryer under conditions of a drying chamber inlet temperature of 200° C. and an outlet temperature of 120° C. (drying step). The granules of thermistor raw material powder thus obtained were spherical with an average grain size of 30 μm, and this raw material powder is placed in a crucible of 99.3% $Al_2O_3$ and calcined for 1–2 hours at 1100–1300° C. in a high-temperature furnace in air to obtain a calcine of $Y(Cr_{0.5}Mn_{0.5})O_3 \cdot Y_2O_3$ (calcining step).

The aforementioned calcine that had become a clump-like solid in calcining was given a rough grinding in a mixing and grinding machine and passed through a #30 mesh sieve to obtain a powder of $Y(Cr_{0.5}Mn_{0.5})O_3 \cdot Y_2O_3$ (formulation 2).

Next, in the grinding step ("Mixing and grinding" in FIG. 29), in order to perform fine grinding of the $Y(Cr_{0.5}Mn_{0.5})O_3 \cdot Y_2O_3$, a pearl mill similar to that used in the aforementioned mixing step was used. The operating conditions for the pearl mill are the same as those in the mixing step. In addition, in the grinding step, a dispersion agent, a binder and a mold release agent were added and ground at the same time to obtain a slurry. The raw material slurry of thermistor materials thus ground was evaluated using a laser granulometer, and the results indicated that the average grain size was 0.3 μm.

The slurry of $Y(Cr_{0.5}Mn_{0.5})O_3 \cdot Y_2O_3$ obtained after grinding is dried and granulated in a spray dryer under the same conditions as in the drying step to obtain granules of $Y(Cr_{0.5}Mn_{0.5})O_3 \cdot Y_2O_3$. These granules are used to mold the thermistor portion 13 of FIG. 26.

The molding step was performed by a mold molding method, wherein lead wires of Pt 100 with dimensions (outside diameter×length) of 0.3 mm×10.5 mm were inserted into a male mold, and the granules were placed in a female mold with an inside diameter of 1.89 mm. Molding was performed at a pressure of approximately 1000 kgf/cm² to obtain a thermistor portion 13 with lead wires 11 and 12 attached.

In the sintering step, this molded thermistor device is placed on a corrugated setter made of $Al_2O_3$ and sintered for 1–2 hours at 1400–1600° C. in air to obtain a cylindrical, compact bulk-type thermistor portion 13 with dimensions of 1.6 mm in diameter and 1.2 mm long consisting of a mixed sintered body of $38Y(Cr_{0.5}Mn_{0.5})O_3 \cdot 62Y_2O_3$.

Next, an anti-reducing material is formed over the surface of this thermistor portion 13 with lead wires 11 and 12 attached. First, in the dip-coating step, an organometallic compound of yttrium, which is the precursor to the anti-reducing material $Y_2O_3$, is applied to the surface of this thermistor portion 13.

The application of the organometallic compound of yttrium to the surface of the thermistor portion 13 is performed using a liquid solution of organometallic compound of yttrium (SYM-Y01, made by Symetrix Corp. of the US). The dip coating is performed by dipping the thermistor portion 13 into this liquid and bringing the thermistor portion 13 back up. In this manner, this organometallic compound of yttrium, which is the precursor to the anti-reducing material $Y_2O_3$, is applied to the surface of the thermistor portion 13.

Thereafter, the solvent contained in the aforementioned liquid organometallic compound of yttrium is allowed to vaporize in the atmosphere at room temperature to 40° C. By firing the thermistor portion 13 with the aforementioned precursor on its surface at a temperature of 1200° C. or greater, a thermistor device 1 is obtained with a 0.5–5.0 μm thick film of the anti-reducing material formed on the surface of the thermistor portion 13 as an anti-reducing coating 14 (FIG. 26) (coating forming step).

The thermistor device with lead wires 11 and 12 attached was assembled as shown in FIG. 27 to obtain a temperature sensor 100. This temperature sensor 100 was placed in a high-temperature furnace and its resistance characteristics (resistance value, β, $\Delta R^2$) were evaluated over the temperature range from room temperature (e.g., 27° C.) to 1000° C. Table 9 presents the results of evaluation. Note that in the formula $\Delta R^2(\%)=(R_{max}/R_t) \times 100-100$, the stipulated temperature t is 600° C.

The temperature sensor 100 of this working example 24 exhibited a resistance value in the range 50Ω to 100 kΩ in the temperature range from room temperature to 1000° C., and thus has an excellent resistance value-temperature characteristics. Thus, a thermistor device that is able to detect temperatures in the wide range from room temperature to 1000° C. can be provided.

In addition, with the temperature sensor 100 of this working example 24, the maximum rate of change of resistance $\Delta R^2$ for the thermistor device 1 inside the metal cap was found to exhibit a stable level of roughly 3%.

For this reason, there is no need to perform the thermal aging treatment at high temperature (roughly 900° C.) required to stabilize the resistance of conventional device, and there is no need to use a cap made of expensive special materials, so it is possible to provide a temperature sensor that has a stable resistance value even when the thermistor device 1 itself is subjected to a reducing environment.

Working Example 25

Working example 25 is an example wherein, after obtaining a thermistor portion 13 in the same manner as in working example 24, a coating of $Al_2O_3$ is formed on the surface of this thermistor portion 13 as an anti-reducing material. The same procedure as in working example 24 is performed up until the sintering step to obtain a thermistor portion 13 with lead wires 11 and 12 attached. The thermistor portion 13 similarly consists of a mixed sintered body of $38Y(Cr_{0.5}Mn_{0.5})O_3 \cdot 62Y_2O_3$.

Next, in the dip-coating step, an organometallic compound of aluminum (aluminum alkoxide in this example) which is the precursor to the anti-reducing material $Al_2O_3$ is applied to the surface of this thermistor portion 13. A liquid solution of an organometallic compound of aluminum (SYM-AL04, made by Symetrix Corp. of the US) was used as the precursor to $Al_2O_3$. In the same manner as in working example 24, dip coating was used to form the precursor for the anti-reducing material $Al_2O_3$.

Thereafter, in the coating formation step, in the same manner as in working example 24, the solvent is vaporized and firing is performed to obtain a thermistor device 1 with a 0.5–5.0 μm thick film of the anti-reducing material formed on the surface of the thermistor portion 13 as an anti-reducing coating 14. The thermistor device 1 was used to fabricate a temperature sensor 100 and its resistance value-temperature characteristics were evaluated in the same manner. Table 9 presents the results of evaluation.

The temperature sensor 100 of this working example 25 exhibited good resistance value-temperature characteristics in the same manner as in working example 24. In addition, the maximum rate of change of resistance $\Delta R^2$ for the thermistor device 1 inside the metal cap was found to exhibit a stable level of roughly 2%. Therefore, it is possible to provide a thermistor having a similar performance as that of the above example 24.

Working Example 26

Working example 26 is an example wherein, after obtaining a thermistor portion 13 in the same manner as in working example 24, a coating of $3Al_2O_3 \cdot 2SiO_2$ (mullite) is formed on the surface of this thermistor portion 13 as an anti-reducing material. The same procedure as in working example 24 is performed up until the sintering step to obtain a thermistor portion 13 with lead wires 11 and 12 attached. The thermistor portion 13 similarly consists of a mixed sintered body of $38Y(Cr_{0.5}Mn_{0.5})O_3 \cdot 62Y_2O_3$.

Next, in the dip-coating step, an organometallic compound of aluminum and an organometallic compound of silicon (both alkoxides in this example), which are the precursors to the anti-reducing material mullite, are applied to the surface of this thermistor portion 13.

A liquid solution of an organometallic compound of aluminum (SYM-AL04, made by Symetrix Corp. of the US) and a liquid solution of an organometallic compound of silicon (SYM-SI04, made by Symetrix Corp. of the US) are used as the precursors to mullite. The liquid solution of an organometallic compound of aluminum and liquid solution of an organometallic compound of silicon were each measured out in such a formulation that $3Al_2O_3 \cdot 2SiO_2$ is formed after firing, and a liquid mixture of the liquid solution of an organometallic compound of aluminum and liquid solution of an organometallic compound of silicon was prepared.

The application of the anti-reducing material to the surface of the thermistor portion 13 is performed by dip coating in the same manner as in working example 24 wherein the thermistor portion 13 is dipped into this liquid mixture and brought back up. In this manner, the precursor to the anti-reducing material of mullite is formed.

Thereafter, in the coating formation step, in the same manner as in working example 24, the solvent contained in the liquid mixture is vaporized and firing is performed to obtain a thermistor device 1 with a 0.5–5.0 μm thick film of the anti-reducing material formed on the surface of the thermistor portion 13 as an anti-reducing coating 14. The thermistor device 1 was used to fabricate a temperature sensor 100 and its resistance value-temperature characteristics were evaluated in the same manner. Table 9 presents the results of evaluation.

The temperature sensor 100 of this working example 26 exhibited good resistance value-temperature characteristics in the same manner as in working example 24. In addition, the maximum rate of change of resistance $\Delta R^2$ for the thermistor device 1 inside the metal cap was found to exhibit a stable level of roughly 1.5%. Therefore, it is possible to provide a thermistor having a similar performance as that of example 24.

Working Example 27

Working example 27 is an example wherein, after obtaining a thermistor portion 13 in the same manner as in working example 24, a coating of $Y_3Al_5O_{12}$ is formed on the surface of this thermistor portion 13 as an anti-reducing material. The same procedure as in working example 24 is performed up until the sintering step to obtain a thermistor portion 13 with lead wires 11 and 12 attached. The thermistor portion 13 similarly consists of a mixed sintered body of $38Y(Cr_{0.5}Mn_{0.5})O_3 \cdot 62Y_2O_3$.

Next, in the dip-coating step, an organometallic compound of yttrium and an organometallic compound of aluminum (both alkoxides in this example), which are the precursors to the anti-reducing material $Y_3Al_5O_{12}$, are applied to the surface of this thermistor portion 13.

A liquid solution of an organometallic compound of yttrium (SYM-Y01, made by Symetrix Corp. of the US) and a liquid solution of an organometallic compound of aluminum (SYM-AL04, made by Symetrix Corp. of the US) were used as the precursors. The liquid solution of an organometallic compound of yttrium and the liquid solution of an organometallic compound of aluminum were measured out in such a formulation that $Y_3Al_5O_{12}$ is formed after firing, and a liquid mixture of the liquid solution of an organometallic compound of yttrium and the liquid solution of an organometallic compound of aluminum was prepared.

The application of the anti-reducing material to the surface of the thermistor portion 13 is performed by dip coating in the same manner as in working example 24 wherein the thermistor portion 13 is dipped into this liquid mixture and brought back up. In this manner, the precursor to the anti-reducing material of mullite is formed.

Thereafter, in the coating formation step, in the same manner as in working example 24, the solvent contained in the liquid mixture is vaporized and firing is performed to obtain a thermistor device 1 with a 0.5–5.0 μm thick film of the anti-reducing material formed on the surface of the thermistor portion 13 as an anti-reducing coating 14. The thermistor device 1 was used to fabricate a temperature sensor 100 and its resistance value-temperature characteristics were evaluated in the same manner. Table 9 presents the results of evaluation.

The temperature sensor 100 of this working example 27 exhibited good resistance value-temperature characteristics in the same manner as in working example 24. In addition, the maximum rate of change of resistance $\Delta R^2$ for the thermistor device 1 inside the metal cap was found to exhibit a stable level of roughly 2.0%. Therefore, it is possible to provide a temperature sensor that has a stable resistance value even when the thermistor device 1 itself is subjected to a reducing environment.

Working Example 28

Working example 28 is an example wherein, after obtaining a thermistor portion 13 in the same manner as in working the anti-reducing material $Y_3SiO_5$, are applied to the surface of this thermistor portion 13.

A liquid solution of an organometallic compound of yttrium (SYM-Y01, made by Symetrix Corp. of the US) and a liquid solution of an organometallic compound of silicon (SYM-SI05, made by Symetrix Corp. of the US) were used as the precursors. The liquid solution of an organometallic compound of yttrium and liquid solution of an organometallic compound of silicon were measured out in such a formulation that $Y_3Al_5O_{12}$ is formed after firing, and a liquid mixture of the liquid solution of an organometallic compound of yttrium and liquid solution of an organometallic compound of silicon was prepared.

The application of the anti-reducing material to the surface of the thermistor portion 13 is performed by dip coating in the same manner as in working example 24 wherein the thermistor portion 13 is dipped into this liquid mixture and brought back up. In this manner, the precursor to the anti-reducing material of mullite is formed.

Thereafter, in the coating formation step, in the same manner as in working example 24, the solvent contained in the liquid mixture is vaporized and firing is performed to obtain a thermistor device 1 with a 0.5–5.0 μm thick film of the anti-reducing material formed on the surface of the thermistor portion 13 as an anti-reducing coating 14. The thermistor device 1 was used to fabricate a temperature sensor 100 and its resistance value-temperature characteristics were evaluated in the same manner. Table 9 presents the results of evaluation.

The temperature sensor 100 of this working example 28 exhibited good resistance value-temperature characteristics in the same manner as in working example 24. In addition, the maximum rate of change of resistance $\Delta R^2$ for the thermistor device 1 inside the metal cap was found to exhibit a stable level of roughly 3.0%. Therefore, it is possible to provide a temperature sensor that has a stable resistance value even when the thermistor device 1 itself is subjected to a reducing environment.

TABLE 9

| | Composition of thermistor portion | Anti-reducing composition | Resistance value (kΩ) R.T. (27° C.) | Resistance value (kΩ) 1000° C. | Resistance-temperature coefficient β (K) | Maximum rate of change of resistance inside metal cap $\Delta R^2$ (%, 600° C.) |
|---|---|---|---|---|---|---|
| Working example 24 | $38Y(Cr_{0.5}Mn_{0.5})O_3 \cdot 62Y_2O_3$ | $Y_2O_3$ | 50 | 0.14 | 2450 | +3.0 |
| Working example 25 | $38Y(Cr_{0.5}Mn_{0.5})O_3 \cdot 62Y_2O_3$ | $Al_2O_3$ | " | " | " | +2.0 |
| Working example 26 | $38Y(Cr_{0.5}Mn_{0.5})O_3 \cdot 62Y_2O_3$ | $3Al_2O_3 \cdot 2SiO_2$ | " | " | " | +1.5 |
| Working example 27 | $38Y(Cr_{0.5}Mn_{0.5})O_3 \cdot 62Y_2O_3$ | $Y_3Al_5O_{12}$ | " | " | " | +2.0 |
| Working example 28 | $38Y(Cr_{0.5}Mn_{0.5})O_3 \cdot 62Y_2O_3$ | $Y_2SiO_5$ | " | " | " | +3.0 | example 24, a coating of $Y_3SiO_5$ is formed on the surface of this thermistor portion 13 as an anti-reducing material. The same procedure as in working example 24 is performed up until the sintering step to obtain a thermistor portion 13 with lead wires 11 and 12 attached. The thermistor portion 13 similarly consists of a mixed sintered body of $38Y(Cr_{0.5}Mn_{0.5})O_3 \cdot 62Y_2O_3$.

Next, in the dip-coating step, an organometallic compound of yttrium and an organometallic compound of silicon (both alkoxides in this example), which are the precursors to Working Example 29

Working example 29 is an example of obtaining the thermistor portion 13 consisting of a mixed sintered body of $40Y(Cr_{0.5}Mn_{0.5})O_3 \cdot 60Al_2O_3$ (a=0.40, b=0.60), and forming an anti-reducing coating 14 of $Y_2O_3$ (anti-reducing material) on the surface of this thermistor portion 13.

Figure 30:
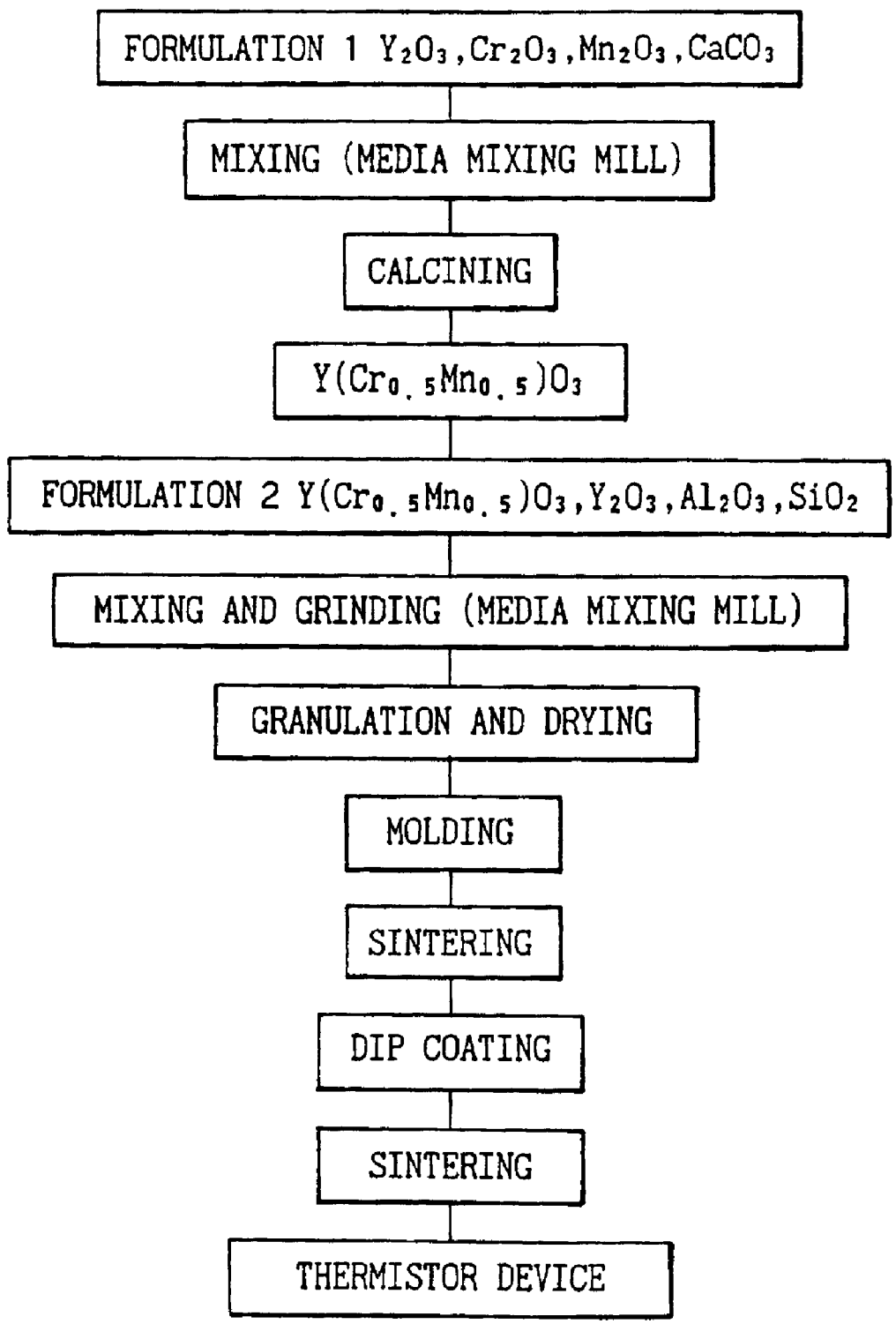
FIG. 30 is a diagram of the manufacturing process for the thermistor device of Working Examples 26–30 of the present invention.

FIG. 30 shows the manufacturing process for the thermistor device of this working example 29. Note that FIG. 30 also shows the manufacturing process of working examples 30–33.

The materials $Y_2O_3$, $Cr_2O_3$, $Mn_2O_3$ and $CaCO_3$, each with a purity of 99.9% or greater, are prepared. In formulation 1, in order for the composition of $Y(Cr_{0.5}Mn_{0.5})O_3$ to be obtained after calcining, the $Y_2O_3$, $Cr_2O_3$ and $Mn_2O_3$ are weighed out so that the molar ratio of Y:Cr:Mn becomes 2:1:1 and the total weight is 2000 g. Moreover, 36 g of $CaCO_3$ is added to give a raw material mixture of $Y_2O_3$, $Cr_2O_3$, $Mn_2O_3$ and $CaCO_3$ with a total weight of 2036 g.

Next, in the mixing step, in order to perform fine grinding of this raw material mixture, a media mixing mill is used. The media mixing mill in this example is the same pearl mill as in working example 24. The mixing conditions, operating conditions and the amount of dispersion agent and binder added were the same as in working example 24.

The raw material slurry after the mixing and grinding process was evaluated using a laser granulometer, and the results indicated that the average grain size was 0.3 μm.

The raw material slurry thus obtained is dried in a spray dryer under the same conditions as in working example 24 (drying step). The thermistor raw material powder thus obtained is placed in a crucible of 99.3% $Al_2O_3$ and calcined for 1–2 hours at 1100–1300° C. in a high-temperature furnace in air to obtain a calcine of $Y(Cr_{0.5}Mn_{0.5})O_3$ (calcining step).

Next, in formulation 2, the aforementioned calcine that had become a clump-like solid in calcining was given a rough grinding in a mixing and grinding machine and passed through a #30 mesh sieve to obtain a powder of $Y(Cr_{0.5}Mn_{0.5})O_3$. Moreover, this powder of $Y(Cr_{0.5}Mn_{0.5})O_3$ and $Al_2O_3$ with a purity of 99.9% or greater are prepared. Both are weighed out so that the formulation molar ratio of the two (a:b) $Y(Cr_{0.5}Mn_{0.5})O_3:Al_2O_3$ becomes 40:60 and the total weight is 2000 g.

Next, in the grinding step ("Mixing and grinding" in FIG. 30) the weighed mixture was mixed and ground using a pearl mill in the same manner as in the aforementioned mixing step. The operating conditions for the pearl mill are the same as those in the mixing step. In addition, in this grinding step, a dispersion agent, binder and mold release agent were added and ground at the same time to obtain a slurry. The raw material slurry after the grinding process was evaluated using a laser granulometer, and the results indicated that the average grain size was 0.3 μm.

The raw material slurry of $Y(Cr_{0.5}Mn_{0.5})O_3$ and $Al_2O_3$ obtained after grinding is dried and granulated in a spray dryer under the same conditions as in the drying step to obtain mixed granules of $Y(Cr_{0.5}Mn_{0.5})O_3$ and $Al_2O_3$ (granulation and drying step). These granules are used to mold the thermistor device.

The molding step was performed by a mold molding method in the same manner as in working example 24, wherein lead wires of Pt 100 were inserted into a male mold, and the granules were placed in a female mold. Molding was performed at the same pressure to obtain a molded thermistor portion 13 with lead wires 11 and 12 attached. This molded thermistor portion 13 was subjected to the sintering step in the same manner as in working example 24 to obtain a thermistor portion 13 with lead wires 11 and 12 attached.

Next, dip coating is performed in the same manner as in working example 24, wherein an organometallic compound of yttrium, which is the precursor to the anti-reducing material $Y_2O_3$, is applied to the surface of this thermistor portion 13. Then, in the coating formation step, a thermistor device 1 with a 0.5–5.0 μm thick film of an anti-reducing coating 14 of $Y_2O_3$ formed on the surface of the thermistor portion 13 is obtained.

This thermistor device 1 was used to fabricate a temperature sensor 100 in the same manner as working example 24, and its resistance value-temperature characteristics (resistance value, β, $ΔR^2$) were evaluated in the same manner as in working example 24. Table 10 presents the results of evaluation.

The temperature sensor 100 of this working example 24 exhibited good resistance value-temperature characteristics as in working example 24. In addition, the maximum rate of change of resistance $ΔR^2$ for the thermistor device 1 inside the metal cap was found to exhibit a stable level of roughly 3%. Therefore, it is possible to provide a temperature sensor that has the same meritorious effects as in working example 24.

Working Example 30

Working example 30 is an example of obtaining the same thermistor portion 13 as in working example 29, and forming an anti-reducing material of $Al_2O_3$ on the surface of the thermistor portion 13. The steps up to the firing step are performed in the same manner as in working example 29 to obtain a thermistor portion 13 with lead wires 11 and 12 attached. The thermistor portion 13 consists of a mixed sintered body of $40Y(Cr_{0.5}Mn_{0.5})O_3 \cdot 60Al_2O_3$, the same as in working example 29.

Next, the formation of the anti-reducing coating 14 of the anti-reducing material $Al_2O_3$ on the thermistor portion 13 is performed in the same manner as in working example 25. Thus, a thermistor device 1 with a 0.5–5.0 μm thick film of an anti-reducing coating 14 formed on the surface of the thermistor portion 13 is obtained. This thermistor device 1 was used to fabricate a temperature sensor 100 in the same manner as in working example 24, and its resistance characteristics were evaluated in the same manner. Table 10 presents the results of evaluation.

The temperature sensor 100 of this working example 24 exhibited good resistance value-temperature characteristics as in working example 24. In addition, the maximum rate of change of resistance $ΔR^2$ for the thermistor device 1 inside the metal cap was found to exhibit a stable level of 2.0%. Therefore, it is possible to provide a temperature sensor that has the same meritorious effects as in working example 24.

Working Example 31

Working example 31 is an example of obtaining the same thermistor portion 13 as in working example 29, and forming an anti-reducing material of $3Al_2O_3 \cdot 2SiO_2$ (mullite) on the surface of the thermistor portion 13. The steps up to the firing step are performed in the same manner as in working example 29 to obtain a thermistor portion 13 with lead wires 11 and 12 attached. The thermistor portion 13 consists of a mixed sintered body of $40Y(Cr_{0.5}Mn_{0.5})O_3 \cdot 60Al_2O_3$, the same as in working example 29.

Next, the formation of the anti-reducing coating 14 of the anti-reducing material $3Al_2O_3 \cdot 2SiO_2$ (mullite) on the thermistor portion 13 is performed in the same manner as in working example 26. Thus, a thermistor device 1 with a 0.5–5.0 μm thick film of an anti-reducing coating 14 formed on the surface of the thermistor portion 13 is obtained. This thermistor device 1 was used to fabricate a temperature sensor 100 in the same manner as in working example 24, and its resistance characteristics were evaluated in the same manner. Table 10 presents the results of evaluation.

The temperature sensor 100 of this working example 24 exhibited good resistance value-temperature characteristics as in working example 24. In addition, the maximum rate of change of resistance $\Delta R^2$ for the thermistor device 1 inside the metal cap was found to exhibit a stable level of 1.5%. Therefore, it is possible to provide a temperature sensor that has the same meritorious effects as in working example 24.

Working Example 32

Working example 32 is an example of obtaining the same thermistor portion 13 as in working example 29, and forming an anti-reducing material of $Y_3Al_5O_{12}$ on the surface of the thermistor portion 13. The steps up to the firing step are performed in the same manner as in working example 29 to obtain a thermistor portion 13 with lead wires 11 and 12 attached. The thermistor portion 13 consists of a mixed sintered body of $40Y(Cr_{0.5}Mn_{0.5})O_3.60Al_2O_3$, the same as in working example 29.

Next, the formation of the anti-reducing coating 14 of the anti-reducing material $Y_3Al_5O_{12}$ on the thermistor portion 13 is performed in the same manner as in working example 27. Thus, a thermistor device 1 with a 0.5–5.0 μm thick film of an anti-reducing coating 14 formed on the surface of the thermistor portion 13 is obtained. This thermistor device 1 was used to fabricate a temperature sensor 100 in the same manner as in working example 24, and its resistance characteristics were evaluated in the same manner. Table 10 presents the results of evaluation.

The temperature sensor 100 of this working example 24 exhibited good resistance value-temperature characteristics as in working example 24. In addition, the maximum rate of change of resistance $\Delta R^2$ for the thermistor device 1 inside the metal cap was found to exhibit a stable level of 2.0%. Therefore, it is possible to provide a temperature sensor that has the same meritorious effects as in working example 24.

Working Example 33

Working example 33 is an example of obtaining the same thermistor portion 13 as in working example 29, and forming an anti-reducing material of $Y_2SiO_5$ on the surface of the thermistor portion 13. The steps up to the firing step are performed in the same manner as in working example 29 to obtain a thermistor portion 13 with lead wires 11 and 12 attached. The thermistor portion 13 consists of a mixed sintered body of $40Y(Cr_{0.5}Mn_{0.5})O_3.60Al_2O_3$, the same as in working example 29.

Next, the formation of the anti-reducing coating 14 of the anti-reducing material $Y_2SiO_5$ on the thermistor portion 13 is performed in the same manner as in working example 28. Thus, a thermistor device 1 with a 0.5–5.0 μm thick film of an anti-reducing coating 14 formed on the surface of the thermistor portion 13 is obtained. This thermistor device 1 was used to fabricate a temperature sensor 100 in the same manner as in working example 24, and its resistance characteristics were evaluated in the same manner. Table 10 presents the results of evaluation.

The temperature sensor 100 of this working example 24 exhibited good resistance value-temperature characteristics as in working example 24. In addition, the maximum rate of change of resistance $\Delta R^2$ for the thermistor device 1 inside the metal cap was found to exhibit a stable level of 3.0%. Therefore, it is possible to provide a temperature sensor that has the same meritorious effects as in working example 24.

TABLE 10

| | Composition of thermistor portion | Anti-reducing composition | Resistance value (kΩ) R.T. (27° C.) | Resistance value (kΩ) 1000° C. | Resistance-temperature coefficient β (K) | Maximum rate of change of resistance inside metal cap $\Delta R^2$ (%, 600° C.) |
|---|---|---|---|---|---|---|
| Working example 29 | $40Y(Cr_{0.5}Mn_{0.5})O_3.62Y_2O_3$ | $Y_2O_3$ | 50 | 0.07 | 2580 | +3.0 |
| Working example 30 | $40Y(Cr_{0.5}Mn_{0.5})O_3.62Y_2O_3$ | $Al_2O_3$ | " | " | " | +2.0 |
| Working example 31 | $40Y(Cr_{0.5}Mn_{0.5})O_3.62Y_2O_3$ | $3Al_2O_3.2SiO_2$ | " | " | " | +1.5 |
| Working example 32 | $40Y(Cr_{0.5}Mn_{0.5})O_3.62Y_2O_3$ | $Y_3Al_5O_{12}$ | " | " | " | +2.0 |
| Working example 33 | $40Y(Cr_{0.5}Mn_{0.5})O_3.62Y_2O_3$ | $Y_2SiO_5$ | " | " | " | +3.0 |

Comparative Example 7

Comparative example 7 is an example of using $Y_2O_3$, $Cr_2O_3$ and $Mn_2O_3$ as the raw materials used to obtain the thermistor portion 13 consisting of a mixed sintered body of $38Y(Cr_{0.5}Mn_{0.5})O_3.62Y_2O_3$ in the same manner as in working example 24 and not forming an anti-reducing material on its surface. To wit, the device has the composition of the thermistor device 1 of FIG. 26 with no anti-reducing coating 14.

The thermistor device of this comparative example 7 was assembled as shown in FIG. 26 above to obtain a temperature sensor 100 and its resistance characteristics were evaluated in the same manner as in working example 24. The results are shown in Table 11. The temperature sensor 100 of this example exhibited a resistance value in the range 50Ω to 100 kΩ in the temperature range from room temperature to 1000° C., and thus has an excellent resistance value-temperature characteristics. However, the maximum rate of change of resistance $\Delta R^2$ for the thermistor device 1 inside the metal cap was found to exhibit a level of 30%, so its resistance value stability when the thermistor device itself is subjected to a reducing atmosphere is poor in comparison to the working examples above.

Note that when the temperature sensor of this example was subjected to thermal aging of 900° C.×100 Hr, the rate of change of resistance $\Delta R^2$ dropped to a level of 5% and stabilized. Therefore, thermal aging of 900° C.×100 Hr is required in order to stabilize the resistance of the thermistor device of this example.

Comparative Example 8

Comparative example 8 is an example of using $Y_2O_3$, $Cr_2O_3$, $Mn_2O_3$, $CaCO_3$ and $Al_2O_3$ as the raw materials used to obtain the thermistor portion 13 consisting of a mixed sintered body of $40Y(Cr_{0.5}Mn_{0.5})O_3 \cdot 62Y_2O_3$ in the same manner as in working example 29 and not forming an anti-reducing material on its surface. To wit, the device has the composition of the thermistor device 1 of FIG. 26 with no anti-reducing coating 14, in the same manner as in comparative example 7.

The thermistor device of this comparative example 8 was assembled as shown in comparative example 7 above to obtain a temperature sensor 100 and its resistance characteristics were evaluated.

The temperature sensor of this example also has excellent resistance value-temperature characteristics. However, the maximum rate of change of resistance $\Delta R^2$ for the thermistor device 1 inside the metal cap was found to exhibit a level of 25%, so its resistance value stability when the thermistor device itself is subjected to a reducing atmosphere is poor in comparison to the working examples above.

Note that when the temperature sensor of this example was subjected to thermal aging of 900° C.×100 Hr, the rate of change of resistance $\Delta R^2$ dropped to a level of 5% and stabilized. Therefore, thermal aging of 900° C.×100 Hr is required in order to stabilize the resistance of the thermistor device of this example.

thermistor device, to adjust its viscosity or hardness to be suitable for sheet forming, and thus obtain a sheet-shaped thermistor sheet with a thickness of 200 μm. The thickness of five of these sheets laminated together becomes 1 mm, so the same meritorious effects of the aforementioned working examples can be obtained with a laminated sheet type thermistor device with lead wires attached.

In addition, it is possible to add binders, resin materials or the like which are mixed into the raw material for the thermistor device, to adjust its viscosity or hardness to be suitable for extrusion molding, and thus use extrusion molding to obtain a molded thermistor device with holes formed for attaching lead wires, and then insert the lead wires and sinter to obtain a thermistor device with lead wires attached, so the same performance as in the aforementioned working examples can be obtained.

In addition, in the aforementioned working examples 24–33, the precursors of the anti-reducing material used were the organometallic compounds alcoholates (metal alkoxide) containing only single metallic elements, but alcoholate liquids that contain more than one of the elements selected from the group of Y, Al and Si, can be used. For example, liquids of yttrium-aluminum organometallic compounds, yttrium-silicon organometallic compounds can be used to apply the precursors of the anti-reducing material.

TABLE 11

| | | Resistance value (kΩ) | | Resistance-temperature coefficient β (K) | Maximum rate of change of resistance inside metal cap $\Delta R^2$ (%, 600° C.) |
|---|---|---|---|---|---|
| | Composition of thermistor device | R.T. (27° C.) | 1000° C. | | |
| Comparative example 7 | $38Y(Cr_{0.5}Mn_{0.5})O_3 \cdot 62Y_2O_3$ | 50 | 0.14 | 2450 | +30.0 |
| Comparative example 8 | $40Y(Cr_{0.5}Mn_{0.5})O_3 \cdot 60Y_2O_3$ | 50 | 0.07 | 2580 | +25.0 |

Examples of Other Modifications of the Fourth Aspect

In addition to working examples 24–33 above, by forming the anti-reducing material according to this aspect of the invention on the surface of conventional thermistor devices such as high-temperature thermistor devices made primarily of $Cr_2O_3$, thermistor devices with a corundum-type composition of $(Al, Cr, Fe)_2O_3$, thermistor devices with a single perovskite composition of $(Cr, Ti, Fe)O_3$, it is possible to provide a thermistor device that has stable characteristics with no fluctuation in resistance in the reducing atmosphere within the metal cap, so thermal aging of the temperature sensor is unnecessary.

In addition, in the working examples above, the materials of $Y_2O_3$, $Al_2O_3$, $SiO_2$, $Y_3Al_5O_{12}$, $3Al_2O_3 \cdot 2SiO_2$ (mullite) and $Y_2SiO_5$ may be combined freely as the anti-reducing material to form a anti-reducing coating consisting of a plurality of layers of anti-reducing material on the surface of the thermistor device, and the same meritorious effects described above can be obtained.

In addition, in the aforementioned working examples 24–33, a cylindrical, compact bulk-type thermistor device 1 with dimensions of 1.6 mm in diameter and 1.2 mm long, for example, is obtained, but in the present invention, the shape of the thermistor device 1 does not matter.

For example, it is possible to add binders, resin materials or the like which are mixed into the raw material for the In addition, in the aforementioned working examples 24–33, organometallic compounds are used as the precursors of the anti-reducing material, but nitrates, chloride salts, acetates, oxalates or the like can be used as the precursors of the anti-reducing material, and liquid solutions thereof can be used to apply the precursors of the anti-reducing material.

In addition, in the aforementioned working examples 24–33, the method of forming the anti-reducing material is given as dip coating, the representative wet manufacturing process, but other methods of forming the anti-reducing material can be used in order to obtain a thermistor device with an anti-reducing material formed on the surface of the thermistor portion. Other wet manufacturing processes include: spray coating, flame spraying, application, printing, electroplating, electrophoresis and other methods of forming the anti-reducing material. In addition, the thermistor device may also be obtained by molding and firing the precursors to the anti-reducing material to form the anti-reducing material.

In addition, dry manufacturing processes include electron-beam deposition, sputtering and other physical vapor deposition (PVD) methods, chemical vapor deposition (CVD) methods, which can be used to form the anti-reducing material. In addition, the thermistor device may also be obtained by molding and firing the precursors to the anti-reducing material to form the anti-reducing material.

The thickness of the film of anti-reducing material may be set freely depending on the operating conditions of the various manufacturing processes.

In addition, in the aforementioned working examples 24–33, the anti-reducing material is formed on the surface of the thermistor portion after the sintering step, but by applying the precursors of the anti-reducing material to the molded thermistor portion after molding (molding step) in the manufacturing process shown in FIGS. 29 and 30, it is possible to obtain a thermistor device with an anti-reducing material formed on its surface, where they are sintered simultaneously.

Moreover, in the manufacturing process shown in FIGS. 29 and 30, after the molding step, the thermistor portion is fired at 1200–1400° C. to obtain a fired thermistor portion, so by applying the precursors of the anti-reducing material to this fired thermistor portion and firing, it is also possible to obtain a thermistor device with a anti-reducing material formed on its surface.

In addition, in order to increase the strength by which the anti-reducing material adheres to the thermistor device, it is possible to form a primary layer (primer layer) by means of a wet process method or dry process method and then form a secondary layer of the anti-reducing material over the entire surface of said first layer by means of said wet process method or dry process method, and thereby obtain a thermistor device to achieve the same meritorious effects.

This primary layer may be selected freely from the anti-reducing material materials of $Y_2O_3$, $Al_2O_3$, $SiO_2$, $Y_3Al_5O_{12}$, $3Al_2O_3.2SiO_2$ (mullite) and $Y_2SiO_5$, and the composition ratio, concentration of the precursor liquids, wetting characteristics of the thermistor portion, and the operating conditions of the various manufacturing processes may be controlled freely.

Moreover, in order to add or apply functions related to the thermal coefficient of expansion, heat conductivity, heat resistance or the like, it is possible to add other materials to said primary layer and secondary layer, or composite additives can be used to obtain a more complex thermistor device, but the same meritorious effects described above are still obtained.

Note that in the temperature sensor 100 of FIG. 27 where the thermistor device of the various examples above is used, a structure with no metal cap 2 may also be used.

As described above, the thermistor device of this aspect of the invention is intended to suppress the movement of oxygen atoms from the device to outside the device in a reducing environment, and thus a device structure is adopted whereby an anti-reducing material is formed on the surface of the thermistor portion. Thereby, reduction of the thermistor device itself is suppressed and resistance value stability is achieved.

Therefore, in the thermistor device of the fourth aspect of the present invention, there is no need to perform thermal aging to stabilize the resistance, and there is no need to use a cap made of expensive special materials, so it is possible to provide a temperature sensor that has a stable rate of change of resistance $\Delta R^2$.

What is claimed is:

1. A thermistor device comprising a mixed sintered body of $(M1M2)O_3.Al_2O_3.Y_2O_3$ consisting of $(M1M2)O_3$, $Al_2O_3$ and $Y_2O_3$, wherein M1 is at least one or more elements selected from the elements of Group 2A or Group 3A of the periodic table excluding La, and M2 is at least one or more elements selected from the elements of Group 2B, Group 3B, Group 4A, Group 5A, Group 6A, Group 7A or Group 8 of the periodic table.

2. The thermistor device according to claim 1 characterized in that, when taking the mole fraction of said (M1M2)O₃ to be a and the sum of the mole fraction of said $Y_2O_3$ and $Al_2O_3$ to be b, these mole fractions a and b satisfy the relationships $0.05 \leq a < 1.0$, $0 < b \leq 0.95$ and $a+b=1$.

3. The thermistor device according to claim 1 characterized in that, M1 is one or more elements selected from the group Y, Ce, Pr, Nd, Sm, Eu, Gd, Dy, Ho, Er, Yb, Mg, Ca, Sr, Ba and Sc, while M2 is one or more elements selected from the group Ti, V, Cr, Mn, Fe, Co, Ni, Zn, Al, Ga, Zr, Nd, Mo, Hf, Ta and W.

4. The thermistor device according to claim 3 characterized in that said M1 is Y, said M2 is Cr and Mn and said $(M1M2)O_3$ is $Y(CrMn)O_3$.

5. The thermistor device according to claim 1 characterized in that it contains a sintering aid comprising $SiO_2$ and at least one member of the group CaO, $CaCO_3$ and $CaSiO_3$.

6. A temperature sensor characterized in that it contains the thermistor device according to claim 1.

7. A method for manufacturing a thermistor device according to claim 1, comprising the steps of:
performing a calcining step to obtain said $(M1M2)O_3$, which has an average grain size greater than that of said $Al_2O_3$,
mixing and grinding said $(M1M2)O_3$, $Y_2O_3$ and $Al_2O_3$ so that the average grain size of this mixture after grinding is no greater than the average grain size of said $Y_2O_3$ and $Al_2O_3$ prior to mixing, and then performing the steps of molding into a prescribed shape and sintering.

8. A method for manufacturing a thermistor device according to claim 1, comprising the steps of:
mixing and grinding the material for said M1 together with the material for said M2 so that the average grain size of this mixed ground product after grinding is no greater than the average grain size of the material for M1 prior to mixing and also no greater than 0.5 μm, and then performing a calcining step to obtain said $(M1M2)O_3$, and
mixing said $(M1M2)O_3$ obtained by said calcining step with said $Y_2O_3$ and $Al_2O_3$, and then molding into a prescribed shape and sintering.

9. The method according to claim 8 comprising the steps of: mixing and grinding said $(M1M2)O_3$ obtained by said calcining step with said $Y_2O_3$ and $Al_2O_3$ so that the average grain size of this mixture after grinding is no greater than the average grain size of said $Y_2O_3$ and $Al_2O_3$ prior to mixing, and then performing the steps of molding into a prescribed shape and sintering.

10. A method for manufacturing a thermistor device according to claim 1, comprising the steps of:
using a raw material for said M1 that contains at least $Y_2O_3$,
performing a calcining step to obtain $(M1M2)O_3.Y_2O_3$ which has an average grain size greater than that of said $Al_2O_3$,
mixing and grinding said $(M1M2)O_3.Y_2O_3$ and said $Al_2O_3$ or said $Y_2O_3$ and $Al_2O_3$ so that the average grain size of this mixture after grinding is no greater than the average grain size of said $Y_2O_3$ and $Al_2O_3$ prior to mixing, and then performing the steps of molding into a prescribed shape and sintering.

11. A method for manufacturing a thermistor device according to claim 1, comprising the steps of:
using a raw material for said M1 that contains at least $Y_2O_3$,
mixing and grinding the material for said M1 together with the material for said M2 so that the average grain size of this mixed ground product after grinding is no greater than the average grain size of the material for M1 prior to mixing and also no greater than 0.5 μm, and then performing a calcining step to obtain $(M1M2)O_3 \cdot Y_2O_3$, and mixing this $(M1M2)O_3 \cdot Y_2O_3$ with said $Al_2O_3$ or said $Y_2O_3$ and $Al_2O_3$, and then molding into a prescribed shape and sintering.

12. The method according to claim 11 comprising the steps of: mixing and grinding said $(M1M2)O_3 Y_2O_3$ obtained by said calcining step with said $Al_2O_3$ or said $Y_2O_3$ and $Al_2O_3$ so that the average grain size of this mixture after grinding is no greater than the average grain size of said $Y_2O_3$ and $Al_2O_3$ prior to mixing, and then performing the steps of molding into a prescribed shape and sintering.

13. A temperature sensor characterized in that it contains a thermistor device that is manufactured by one of the manufacturing methods according to claims 7–12 and in that the grain size of said sintered body is smaller than 1 μm.

* * * * *